US006665405B1

(12) United States Patent
Lenstra

(10) Patent No.: US 6,665,405 B1
(45) Date of Patent: Dec. 16, 2003

(54) CYCLOTOMIC POLYNOMIAL CONSTRUCTION OF DISCRETE LOGARITHM CRYPTOSYSTEMS OVER FINITE FIELDS

(75) Inventor: Arjen K. Lenstra, Basking Ridge, NJ (US)

(73) Assignee: Citibank, N.A., New York, NY (US)

( * ) Notice: Subject to any disclaimer, the term of this patent is extended or adjusted under 35 U.S.C. 154(b) by 559 days.

(21) Appl. No.: 09/704,722

(22) Filed: Oct. 19, 2000

Related U.S. Application Data

(63) Continuation-in-part of application No. 08/800,669, filed on Feb. 14, 1997, now abandoned.

(51) Int. Cl.[7] .................................................. H04L 9/30

(52) U.S. Cl. ............................ 380/28; 380/30; 708/492

(58) Field of Search ...................... 380/28, 30; 708/492

(56) References Cited

FOREIGN PATENT DOCUMENTS

| | | | |
|---|---|---|---|
| CA | 2176866 | * 11/1996 | ............. H04L/9/28 |
| GB | 1490964 | * 4/1977 | ........... G07C/15/00 |
| US | WO 9836526 | * 8/1998 | ............. H04L/9/30 |

OTHER PUBLICATIONS

Apostol, The Resultant of the Cyclotomic Polynomials fm(ax) and Fn(bx), Mathematics of computation 29(129) Jan. 1975.*

Lenstra, Using Cyclotomic Polynomials to construct Efficient Discrete Logarithm Cryptosystems over Finite Fields, Jul. 97 ACISP 1997, 127–138.*

Duhamel et al. A Decomposition of Arithmetic for NTT's with 2 as a Root of Unity IEEE 1984.*

Pieprzyk, On Public–Key Cryptosystem Built Using Polynomial Rings, EUROCRYPT 1985, 73–78.*

Williams, An M3 Public–Key Encryption Scheme.*

Taber ElGamal, On Computing Logarithms Over Finite Field, CRYPTO 1985, 396–402.*

Bach, Intractable Problems in Number Theory, CRYPTO 1988, 77–93.*

Hellman et. al. Fast Computation of Discrete Logarithms in GF(g).*

International Search Report PCT/US 97/17304 Lenstra, Cyclotomic Polynomial construction of Discrete Logarithms Cryptosystems over Finite Field Mar. 3, 1998.*

Lenstra, "Using Cyclotomic Polynomials to Construct Efficient Discrete Logarithm Cryptosystems Over Finite Fields", ACISP '97 proceedings, Australia, (7/97), pp 126–138.

* cited by examiner

*Primary Examiner*—Albert Decady
*Assistant Examiner*—James Seal
(74) *Attorney, Agent, or Firm*—Morgan & Finnegan, LLP

(57) ABSTRACT

Cyclotomic polynomials are used to construct subgroups of multiplicative groups of finite fields that allow very efficient implementation of discrete logarithm based public key cryptosystems, including public key encryption schemes and digital signature schemes. A field is represented with an optimal normal basis, and a generator of a subgroup of the multiplicative group of the field is used to form a public key.

26 Claims, 38 Drawing Sheets

ElGamal 'A'

PUBLIC KEY p 8956998098730181050262939134150024928113902798928796344472458
876068925331548077927410702899045645855648875091104224936171
2130538700767802107917491606664443
g 4524701450443845795597504280604126503788582264059046660626283
185097225381941404527921605565186221221607105481947872822042 6
591556460532950266829642209272 2
y 2655816727935601162612051231441545832021624279211448100028466
718040733373973843816700359822288925781912324143345185864961 3
817484037626968066777208552271 12
PRIVATE KEY a 3894680985596024031744151756904630057653362992756344528159760
152287394024073516018395820269868353446045979290475386514824 4
716783972569478474060999664020 68

SIGNATURE r 2519268875249063609767344472004379133254595959182916865871439
206465351662947182472091485137996576883305459960578580694872 8
523250747713537928680741326991 42
s 2333299709790430777418130849689148704472668913155967772335365
671205819263784584980094287709420092864310995227315395834283 3
942913544869493290300283833059 84

SIGNATURE GENERATION k 2443981382482176515866797737060220222538382477994791509097779
605015233312271424613989966472188894370757514661092321788929 5
470971359654086208000046807380 62

SCHNORR "A"

PUBLIC KEY p 7935651211197202969361614422581450553970587781363349628283135
280328114832723537863865262621861848125863119535288853608869 4
575153675013452138879619529463 69
q 1332780240563273974930936350924125472596524707541
g 5842166934744712616319119681981318148669597404501276873585777
434717937388795467379439078834903055047974193270855953130411 3
263797706182459574211033792474 58
y 5255471655240255470113854826125016749958011175987359605613594
689024790605169245296932491195697194333782807839432011808751 7
104340954148856419766265542215 88
PRIVATE KEY a 818452200913391908613812010840741837049484407914

SIGNATURE s 610270350752449610944186786644223965113983572056
e 379381401657544817034629086836831539641278974322

SIGNATURE GENERATION k 537966419530534540811672527666746388369051992650

DSA "A"

PUBLIC KEY p 7935651211197202969361614422581450553970587781363349628283135
280328114832723537863865262621861848125863119535288853608869 4
575153675013452138879619529463 69
q 1332780240563273974930936350924125472596524707541
g 5842166934744712616319119681981318148669597404501276873585777
434717937388795467379439078834903055047974193270855953130411 3
263797706182459574211033792474 58
y 5255471655240255470113854826125016749958011175987359605613594
689024790605169245296932491195697194333782807839432011808751 7
104340954148856419766265542215 88
PRIVATE KEY a 818452200913391908613812010840741837049484407914

SIGNATURE r 108685055884050104668381667356141700315479698222 4
s 472743705230363878814556325198223720208391376119

SIGNATURE GENERATION k 537966419530534540811672527666746388369051992650

CYCLOTOMIC "A"

PUBLIC KEY p 372110759
t 18
q 245134764447737323227273740096024891298754301136 1
g [320068406, 059681530, 127157284, 344891590, 332305067, 355491113, 353578447, 065194905, 017431174, 368789435, 347458991, 143048438, 355577792, 039116853, 285835834, 351580393, 073601702, 180230471]
y [174222830, 003553144, 034346253, 157377243, 120335155, 157091420, 285906740, 333217905, 055536231, 304677627, 030945025, 329670667, 204606820, 180039201, 350865103, 076355065, 131490446, 283067096]
PRIVATE KEY a 134260562371069680980269679406818635772309361073 4

SIGNATURE r 130355515309800602918060046715189516973469680659 4
s 104009219422014303992937735982986111862915991645 3

SIGNATURE GENERATION k 128753368016267852128501394987033320900864375388 8

FIG.4D

| n | COEFFICIENTS |
|---|---|
| 1 | [-1 1] |
| 2 | [1 1] |
| 3 | [1 1 1] |
| 4 | [1 0 1] |
| 5 | [1 1 1 1 1] |
| 6 | [1 -1 1] |
| 7 | [1 1 1 1 1 1 1] |
| 8 | [1 0 0 0 1] |
| 9 | [1 0 0 1 0 0 1] |
| 10 | [1 -1 1 -1 1] |
| 11 | [1 1 1 1 1 1 1 1 1 1 1] |
| 12 | [1 0 -1 0 1] |
| 13 | [1 1 1 1 1 1 1 1 1 1 1 1 1] |
| 14 | [1 -1 1 -1 1 -1 1] |
| 15 | [1 -1 0 1 -1 1 0 -1 1] |
| 16 | [1 0 0 0 0 0 0 0 1] |
| 17 | [1 1 1 1 1 1 1 1 1 1 1 1 1 1 1 1 1] |
| 18 | [1 0 0 -1 0 0 1] |
| 19 | [1 1 1 1 1 1 1 1 1 1 1 1 1 1 1 1 1 1 1] |
| 20 | [1 0 -1 0 1 0 -1 0 1] |
| 21 | [1 -1 0 1 -1 0 1 0 -1 1 0 -1 1] |
| 22 | [1 -1 1 -1 1 -1 1 -1 1 -1 1] |
| 23 | [1 1 1 1 1 1 1 1 1 1 1 1 1 1 1 1 1 1 1 1 1 1 1] |
| 24 | [1 0 0 0 -1 0 0 0 1] |
| 25 | [1 0 0 0 0 1 0 0 0 0 1 0 0 0 0 1 0 0 0 0 1] |
| 26 | [1 -1 1 -1 1 -1 1 -1 1 -1 1 -1 1] |
| 27 | [1 0 0 0 0 0 0 0 0 1 0 0 0 0 0 0 0 0 1] |
| 28 | [1 0 -1 0 1 0 -1 0 1 0 -1 0 1] |
| 29 | [1 1 1 1 1 1 1 1 1 1 1 1 1 1 1 1 1 1 1 1 1 1 1 1 1 1 1 1 1] |
| 30 | [1 1 0 -1 -1 -1 0 1 1] |
| 31 | [1 1 1 1 1 1 1 1 1 1 1 1 1 1 1 1 1 1 1 1 1 1 1 1 1 1 1 1 1 1 1] |
| 32 | [1 0 0 0 0 0 0 0 0 0 0 0 0 0 0 0 1] |
| 33 | [1 -1 0 1 -1 0 1 -1 0 1 -1 1 0 -1 1 0 -1 1 0 -1 1] |
| 34 | [1 -1 1 -1 1 -1 1 -1 1 -1 1 -1 1 -1 1 -1 1] |
| 35 | [1 -1 0 0 0 1 -1 1 -1 0 1 -1 1 -1 1 0 -1 1 -1 1 0 0 0 -1 1] |
| 36 | [1 0 0 0 0 0 -1 0 0 0 0 0 1] |
| 37 | [1 1 1 1 1 1 1 1 1 1 1 1 1 1 1 1 1 1 1 1 1 1 1 1 1 1 1 1 1 1 1 1 1 1 1 1 1] |
| 38 | [1 -1 1 -1 1 -1 1 -1 1 -1 1 -1 1 -1 1 -1 1 -1 1] |
| 39 | [1 -1 0 1 -1 0 1 -1 0 1 -1 0 1 0 -1 1 0 -1 1 0 -1 1 0 -1 1] |
| 40 | [1 0 0 0 -1 0 0 0 1 0 0 0 -1 0 0 0 1] |
| 41 | [1 1 1 1 1 1 1 1 1 1 1 1 1 1 1 1 1 1 1 1 1 1 1 1 1 1 1 1 1 1 1 1 1 1 1 1 1 1 1 1 1] |
| 42 | [1 1 0 -1 -1 0 1 0 -1 -1 0 1 1] |
| 43 | [1 1 1 1 1 1 1 1 1 1 1 1 1 1 1 1 1 1 1 1 1 1 1 1 1 1 1 1 1 1 1 1 1 1 1 1 1 1 1 1 1 1 1] |
| 44 | [1 0 -1 0 1 0 -1 0 1 0 -1 0 1 0 -1 0 1 0 -1 0 1] |
| 45 | [1 0 0 -1 0 0 0 0 0 1 0 0 -1 0 0 1 0 0 0 0 0 -1 0 0 1] |
| 46 | [1 -1 1 -1 1 -1 1 -1 1 -1 1 -1 1 -1 1 -1 1 -1 1 -1 1 -1 1] |
| 47 | [1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1] |
| 48 | [1 0 0 0 0 0 0 0 -1 0 0 0 0 0 0 0 1] |
| 49 | [1 0 0 0 0 0 0 1 0 0 0 0 0 0 1 0 0 0 0 0 0 1 0 0 0 0 0 0 1 0 0 0 0 0 0 1 0 0 0 0 0 0 1] |
| 50 | [1 0 0 0 0 -1 0 0 0 0 1 0 0 0 0 -1 0 0 0 0 1] |
| 51 | [1 -1 0 1 -1 0 1 -1 0 1 -1 0 1 -1 0 1 -1 1 0 -1 1 0 -1 1 0 -1 1 0 -1 1 0 -1 1] |
| 52 | [1 0 -1 0 1 0 -1 0 1 0 -1 0 1 0 -1 0 1 0 -1 0 1 0 -1 0 1] |
| 53 | [1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1] |
| 54 | [1 0 0 0 0 0 0 0 0 -1 0 0 0 0 0 0 0 0 1] |

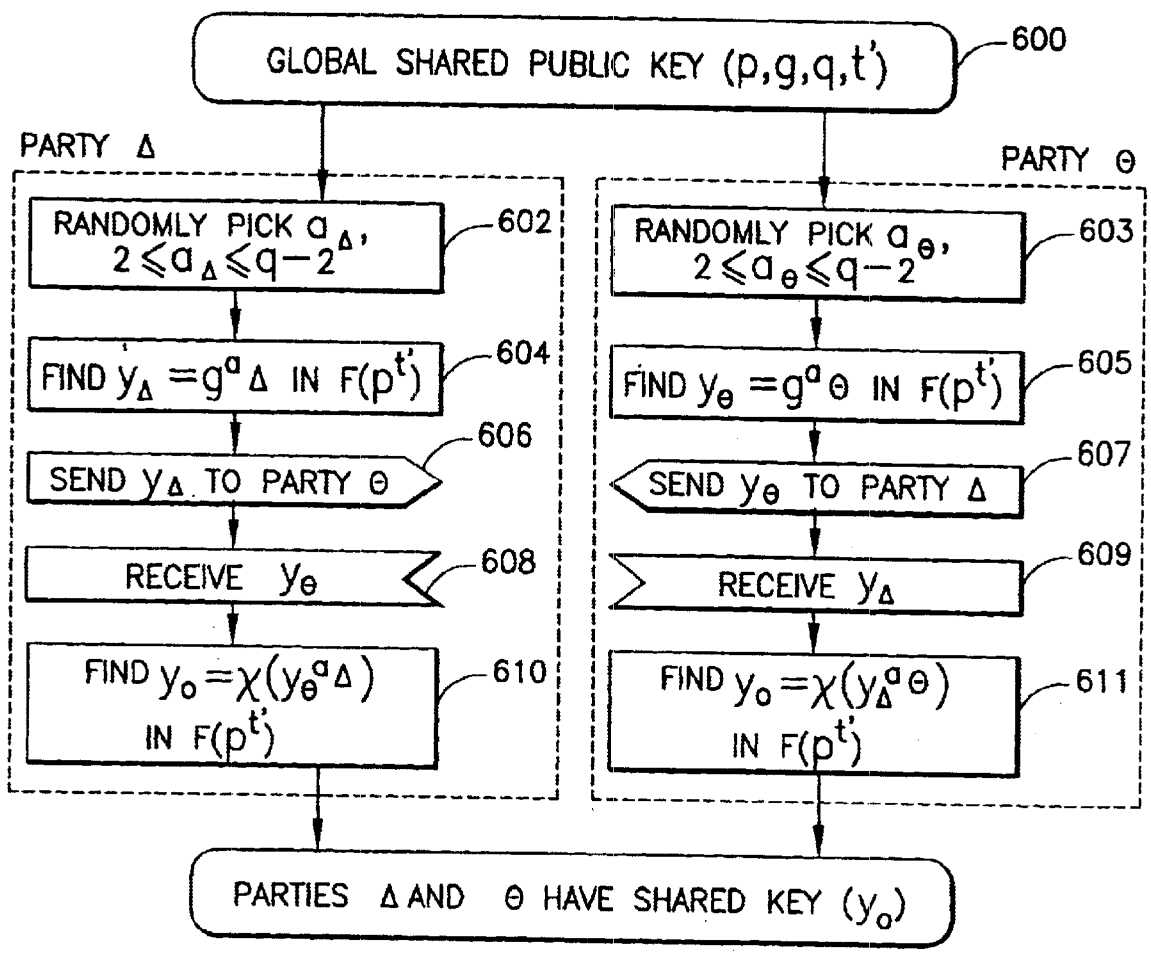
FIG.4E
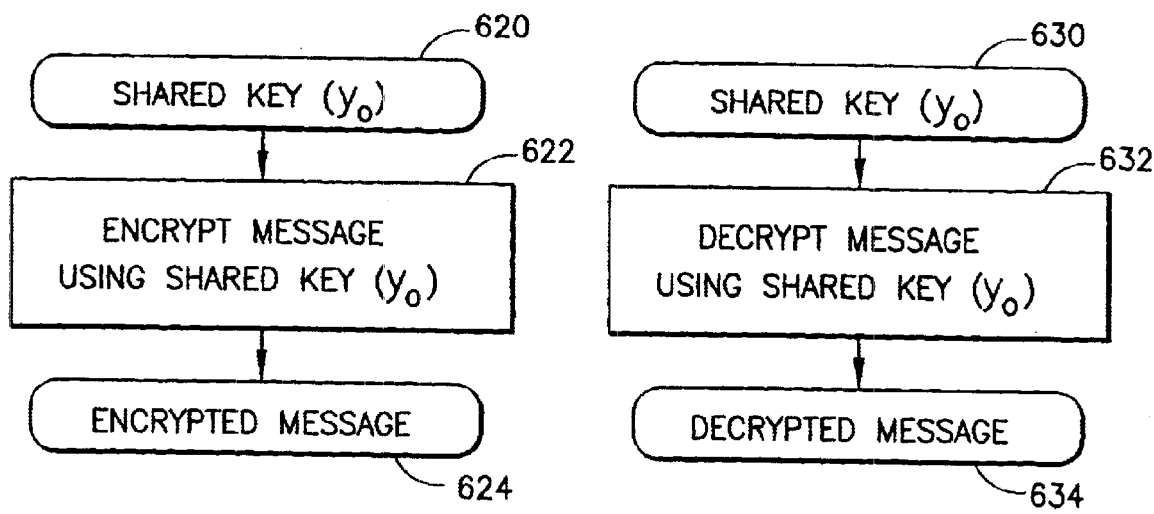
FIG.4F
FIG.4G

SIGNATURE GENERATION

| | "A" | "B" | "C" | "D" | "E" |
|---|---|---|---|---|---|
| | L = 512<br>B = 160 | L = 900<br>B = 220 | L = 960<br>B = 160 | L = 960<br>B = 315 | L = 1032<br>B = 307 |
| ELGAMAL | 0.18 | 0.84 | 1.05 | 1.05 | 1.24 |
| SCHNORR | 0.06 | 0.22 | 0.18 | 0.34 | 0.38 |
| DSA | 0.06 | 0.21 | 0.18 | 0.34 | 0.37 |
| CYCLOTOMIC | 0.02 | 0.07 | 0.07* | 0.13 | 0.14 |

*CYCLOTOMIC USED L = 953, B = 165

FIG.5A

SIGNATURE VERIFICATION

| | "A" | "B" | "C" | "D" | "E" |
|---|---|---|---|---|---|
| | L = 512<br>B = 160 | L = 900<br>B = 220 | L = 960<br>B = 160 | L = 960<br>B = 315 | L = 1032<br>B = 307 |
| ELGAMAL | 0.50 | 2.57 | 3.20 | 3.20 | 3.90 |
| SCHNORR | 0.11 | 0.42 | 0.35 | 0.68 | 0.77 |
| DSA | 0.11 | 0.42 | 0.36 | 0.68 | 0.77 |
| CYCLOTOMIC | 0.04 | 0.14 | 0.13 | 0.26 | 0.27 |

*CYCLOTOMIC USED L = 953, B = 165

FIG.5B

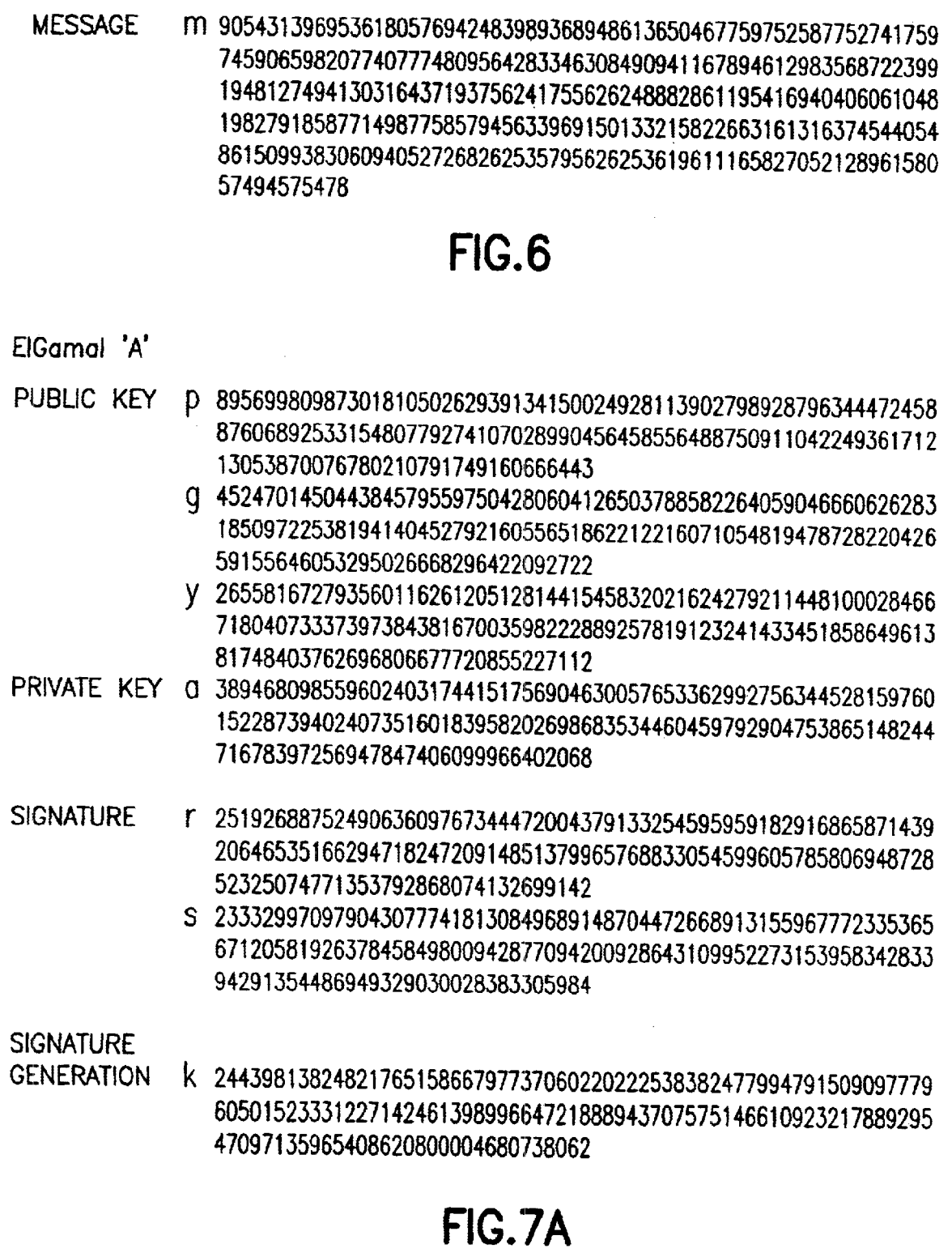

MESSAGE m 90543139695361805769424839893689486136504677597525877527417597459065982077407774809564283346308490941167894612983568722399194812749413031643719375624175562624888286119541694040606104819827918587714987758579456339691501332158226631613163745440548615099383060940527268262535795626253619611165827052128961580574945754778

FIG.6

ElGamal 'A'

PUBLIC KEY p 89569980987301810502629391341500249281139027989287963444724588760689253315480779274107028990456458556488750911042249361712130538700767802107917491606664443 g 45247014504438457955975042806041265037885822640590466606262831850972253819414045279216055651862212216071054819478728220426591556460532950266682964220927222 y 26558167279356011626120512814415458320216242792114481000284667180407333739738438167003598222889257819123241433451858649613817484037626968066777208552271112

PRIVATE KEY a 38946809855960240317441517569046300576533629927563445281597601522873940240735160183958202698683534460459792904753865148244716783972569478474060999664020688

SIGNATURE r 25192688752490636097673444720043791332545959591829168658714392064653516629471824720914851379965768833054599605785806948728523250747713537928680741326991422 s 23332997097904307774181308496891487044726689131559677723353656712058192637845849800942877094200928643109952273153958342833942913544869493290300283833059844

SIGNATURE GENERATION k 24439813824821765158667977370602202225383824779947915090977796050152333122714246139899664721888943707575146610923217889295470971359654086208000046807380622

FIG.7A

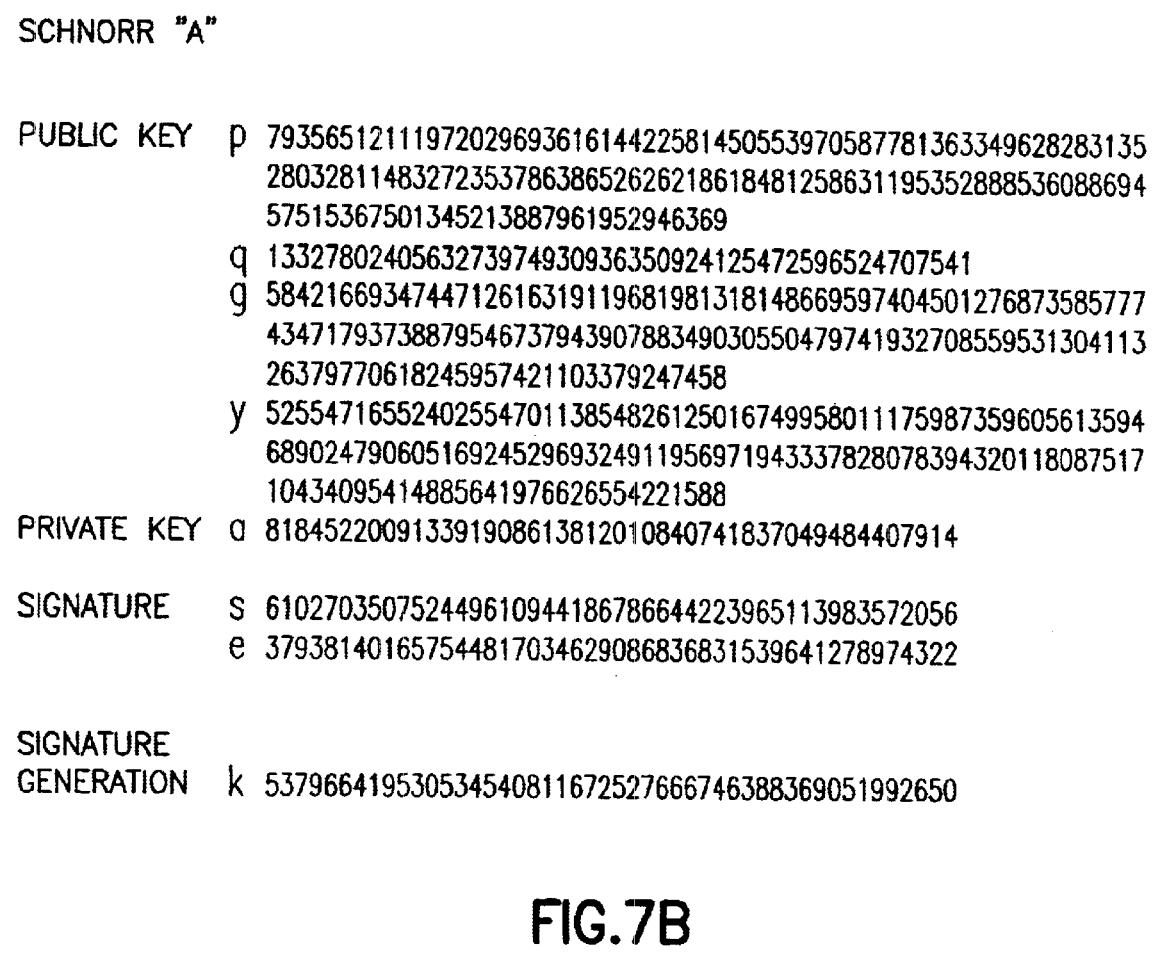

SCHNORR "A"

PUBLIC KEY p 7935651211197202969361614422581450553970587781363349628283135280328114832723537863865262621861848125863119535288853608869457515367501345213887961952946369 q 1332780240563273974930936350924125472596524707541 g 5842166934744712616319119681981318148669597404501276873585777434717937388795467379439078834903055047974193270855953130411326379770618245957421103379247458 y 5255471655240255470113854826125016749958011175987359605613594689024790605169245296932491195697194333782807839432011808751710434095414885641976626554221588

PRIVATE KEY a 818452200913391908613812010840741837049484407914

SIGNATURE s 610270350752449610944186786644223965113983572056 e 379381401657544817034629086836831539641278974322

SIGNATURE GENERATION k 537966419530534540811672527666746388369051992650

FIG.7B

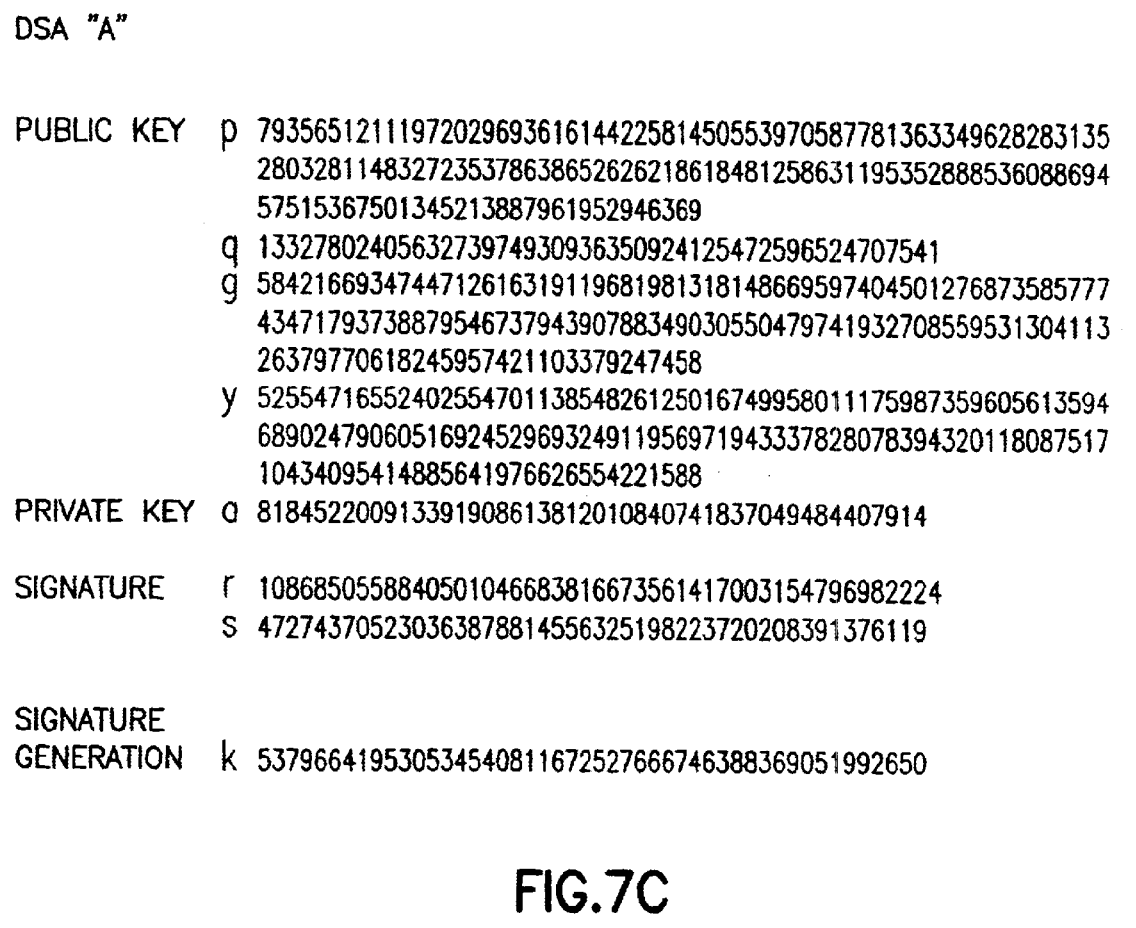

DSA "A"

PUBLIC KEY
p 793565121119720296936161442258145055397058778136334962828313528032811483272353786386526262186184812586311953528885360886945751536750134521388796195294 6369 q 1332780240563273974930936350924125472596524707541 g 584216693474471261631911968198131814866959740450127687358577743471793738879546737943907883490305504797419327085595313041132637977061824595742110337924 7458 y 525547165524025547011385482612501674995801117598735960561359468902479060516924529693249119569719433378280783943201180875171043409541488564197662655422 1588

PRIVATE KEY
a 8184522009133919086138120108407418370494844 07914

SIGNATURE
r 1086850558840501046683816673561417003154796982224
s 4727437052303638788145563251982237202083913761 19

SIGNATURE GENERATION
k 5379664195305345408116725276667463883690519 92650

FIG.7C

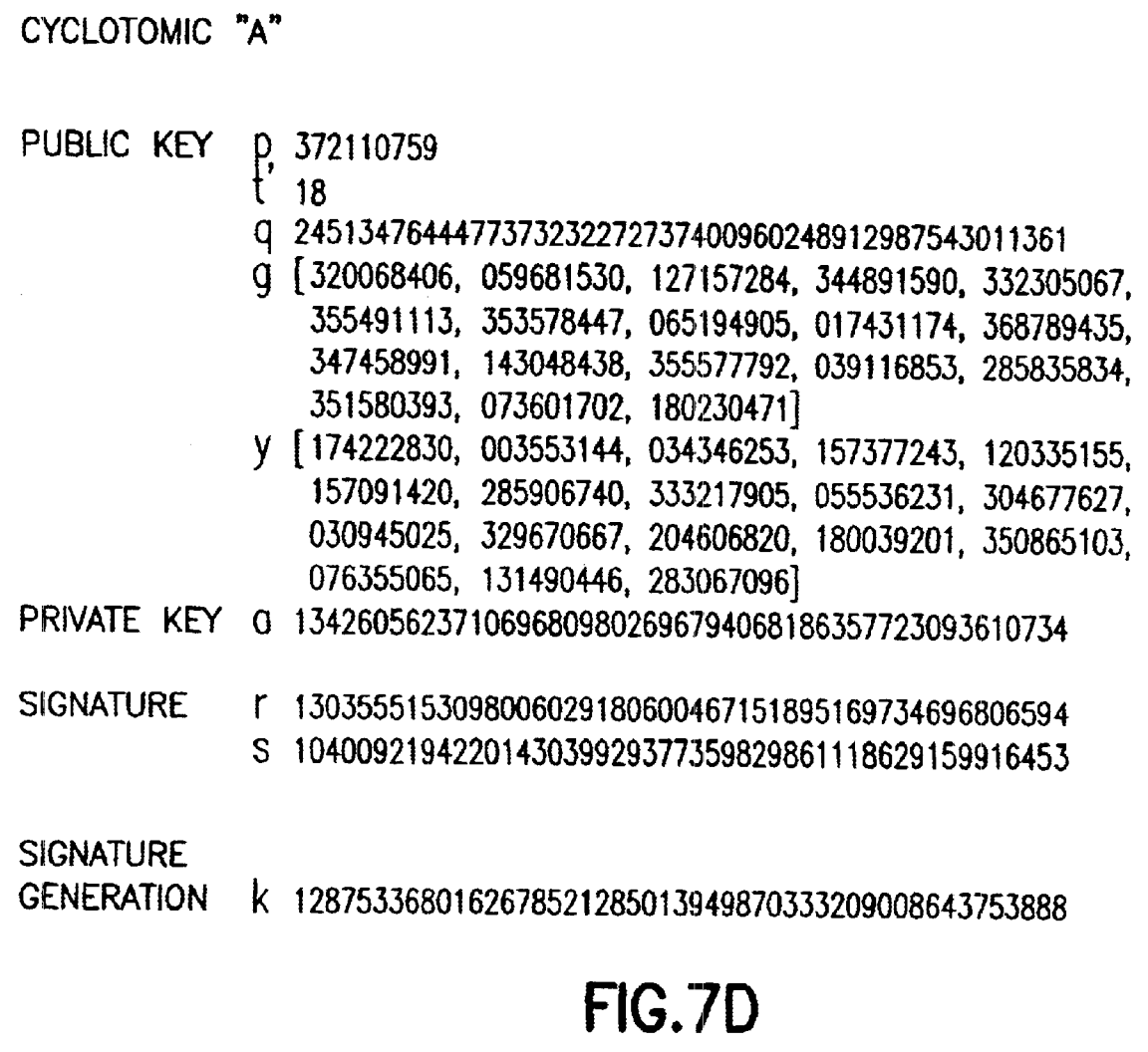

CYCLOTOMIC "A"

PUBLIC KEY
p, 372110759
t 18
q 2451347644477373232272737400960248912987543011361
g [320068406, 059681530, 127157284, 344891590, 332305067, 355491113, 353578447, 065194905, 017431174, 368789435, 347458991, 143048438, 355577792, 039116853, 285835834, 351580393, 073601702, 180230471]
y [174222830, 003553144, 034346253, 157377243, 120335155, 157091420, 285906740, 333217905, 055536231, 304677627, 030945025, 329670667, 204606820, 180039201, 350865103, 076355065, 131490446, 283067096]

PRIVATE KEY
a 1342605623710696809802696794068186357723093610734

SIGNATURE
r 1303555153098006029180600467151895169734696806594
s 1040092194220143039929377359829861118629159916453

SIGNATURE GENERATION
k 1287533680162678521285013949870333209008643753888

FIG.7D

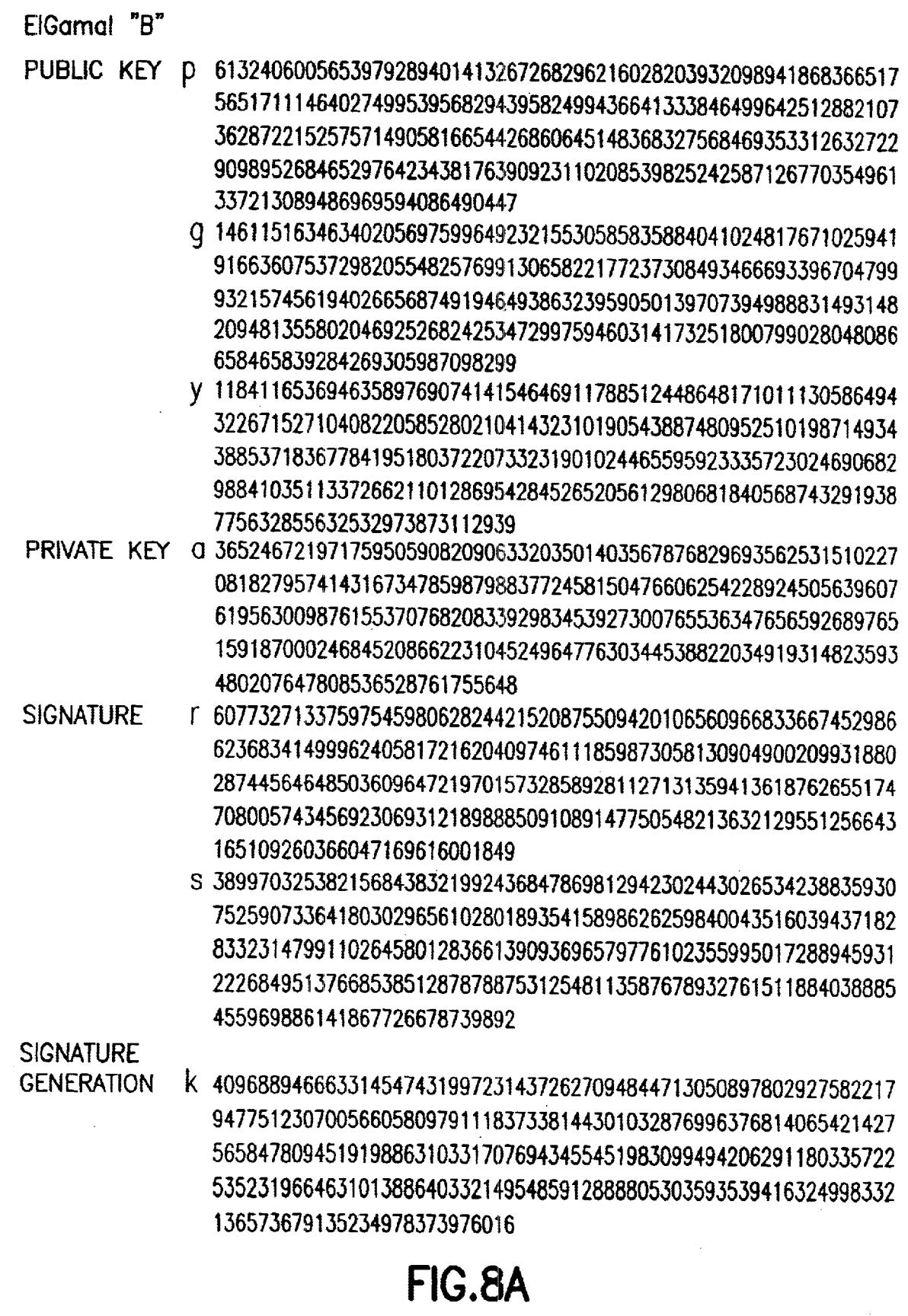

ElGamal "B"

PUBLIC KEY p 6132406005653979289401413267268296216028203932098941868366517565171114640274995395682943958249943664133384649964251288210736287221525757149058166544268606451483683275684693533126327229098952684652976423438176390923110208539825242587126770354961337213089486969594086490447 g 1461151634634020569759964923215530585835884041024817671025941916636075372982055482576991306582217723730849346669339670479993215745619402665687491946493863239590501397073949888314931482094813558020469252682425347299759460314173251800799028048086658465839284269305987098299 y 1184116536946358976907414154646911788512448648171011130586494322671527104082205852802104143231019054388748095251019871493438853718367784195180372207332319010244655959233357230246906829884103511337266211012869542845265205612980681840568743291938775632855632532973873112939

PRIVATE KEY a 3652467219717595059082090633203501403567876829693562531510227081827957414316734785987988377245815047660625422892450563960761956300987615537076820833929834539273007655363476565926897651591870002468452086622310452496477630344538822034919314823593480207647808536528761755648

SIGNATURE r 6077327133759754598062824421520875509420106560966833667452986623683414999624058172162040974611185987305813090490020993188028744564648503609647219701573285892811271313594136187626551747080057434569230693121898885091089147750548213632129551256643165109260366047169616001849 s 3899703253821568438321992436847869812942302443026534238835930752590733641803029656102801893541589862625984004351603943718283323147991102645801283661390936965797761023559950172889459312226849513766853851287878875312548113587678932761511884038885455969886141867726678739892

SIGNATURE GENERATION k 4096889466633145474319972314372627094844713050897802927582217947751230700566058097911183733814430103287699637681406542142756584780945191988631033170769434554519830994942062911803357225352319664631013886403321495485912888805303593539416324998332136573679135234978373976016

FIG.8A

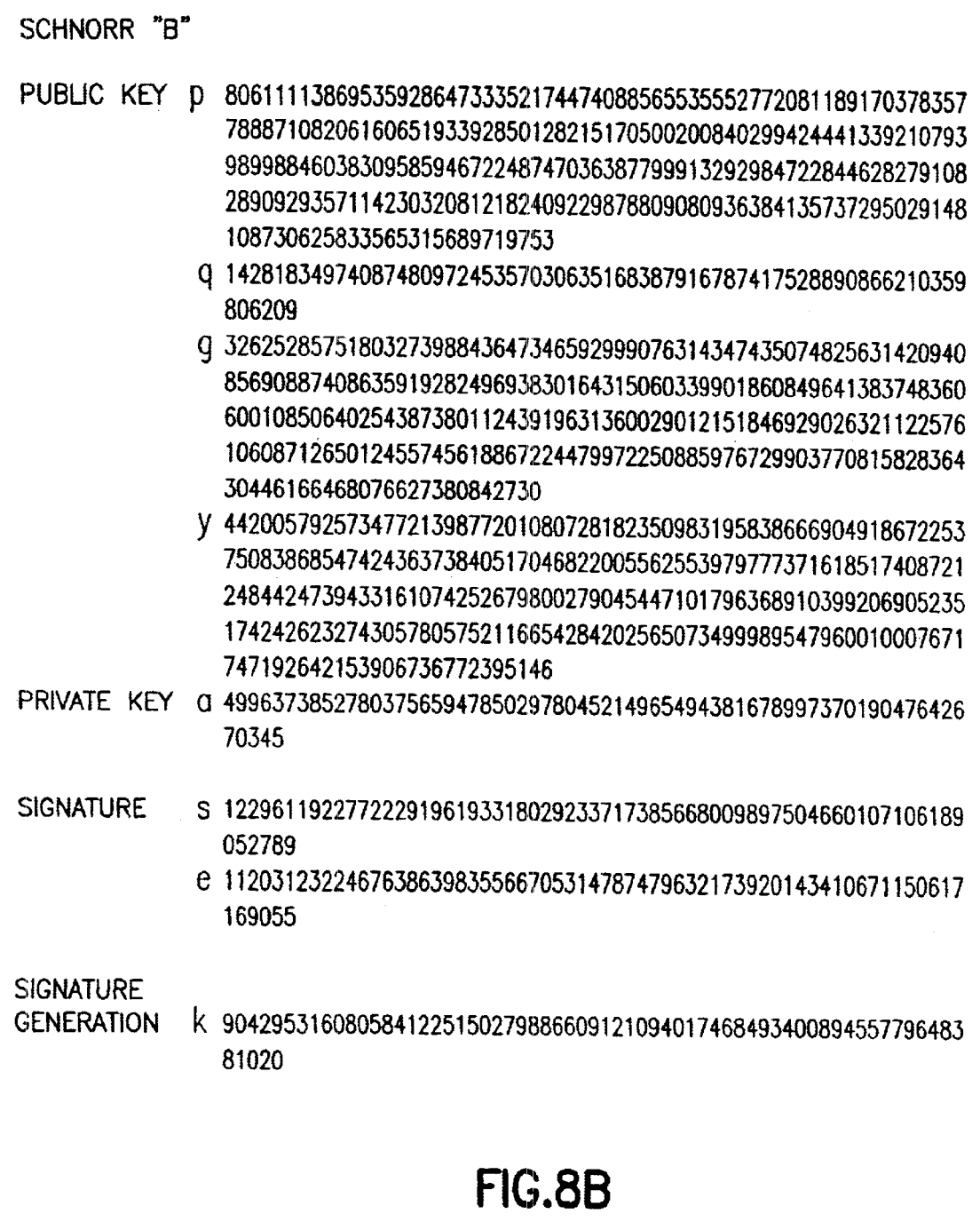

SCHNORR "B"

PUBLIC KEY p 8061111386953592864733352174474088565535552772081189170378357
7888710820616065193392850128215170500200840299424441339210793
9899884603830958594672248747036387799913292984722844628279108
2890929357114230320812182409229878809080936384135737295029148
108730625833565315689719753 q 1428183497408748097245357030635168387916787417528890866210359
806209 g 3262528575180327398843647346592999076314347435074825631420940
8569088740863591928249693830164315060339901860849641383748360
6001085064025438738011243919631360029012151846929026321122576
1060871265012455745618867224479972250885976729903770815828364
30446166468076627380842730 y 4420057925734772139877201080728182350983195838666904918672253
7508386854742436373840517046822005562553979777371618517408721
2484424739433161074252679800279045447101796368910399206905235
1742426232743057805752116654284202565073499989547960010007671
747192642153906736772395146

PRIVATE KEY a 4996373852780375659478502978045214965494381678997370190476426
70345

SIGNATURE s 1229611922772229196193318029233717385668009897504660107106189
052789 e 1120312322467638639835566705314787479632173920143410671150617
169055

SIGNATURE GENERATION k 9042953160805841225150279886609121094017468493400894557796483
81020

FIG.8B

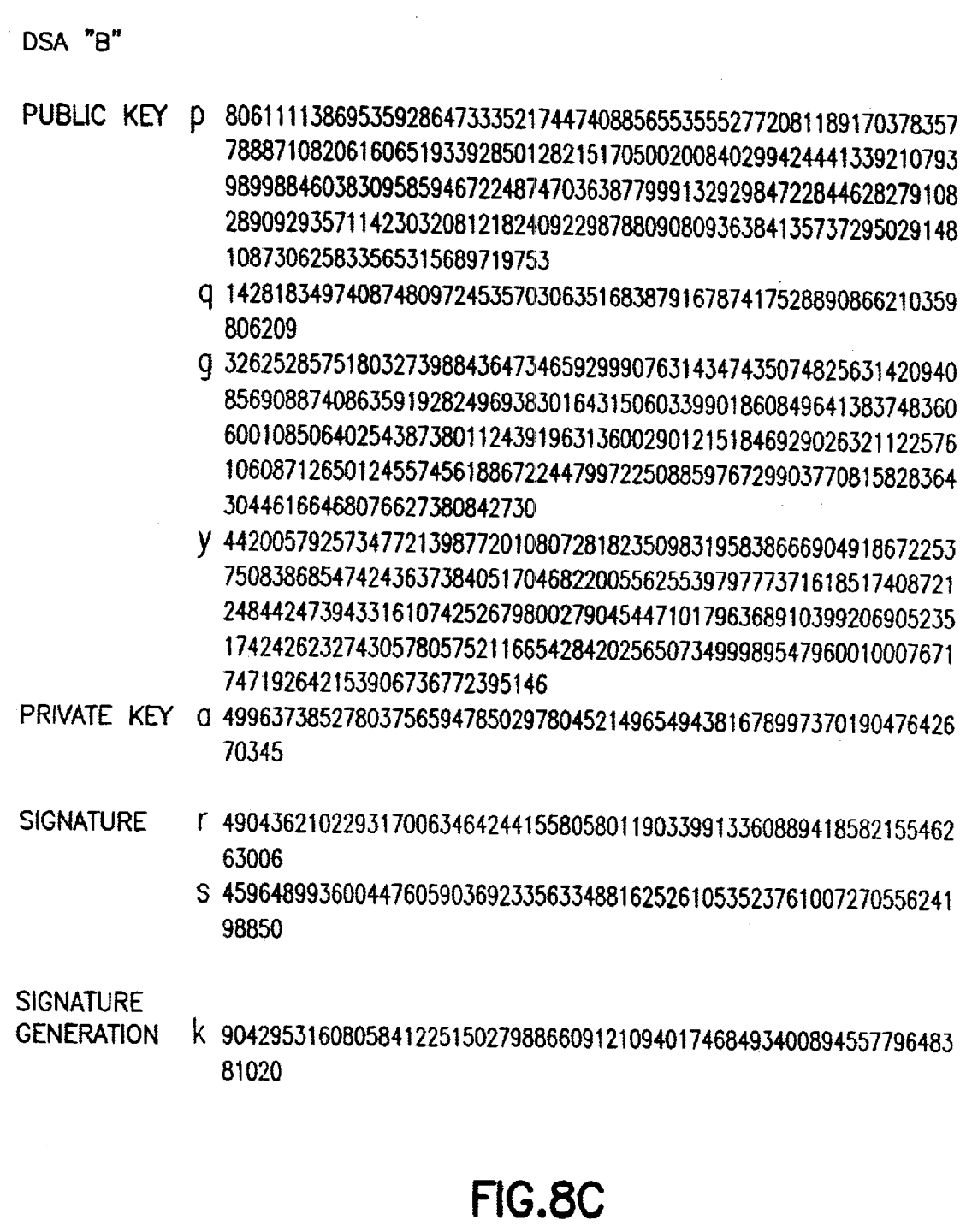

DSA "B"

PUBLIC KEY p 8061111386953592864733352174474088565535552772081189170378357788871082061606519339285012821517050020084029942444133921079398998846038309585946722487470363877999132929847228446282791082890929357114230320812182409229878809080936384135737295029148108730625833565315689719753 q 1428183497408748097245357030635168387916787417528890866210359806209 g 326252857518032739884364734659299907631434743507482563142094085690887408635919282496938301643150603399018608496413837483606001085064025438738011243919631360029012151846929026321122576106087126501245574561886722447997225088597672990377081582836430446166468076627380842730 y 4420057925734772139877201080728182350983195838666904918672253750838685474243637384051704682200556255397977737161851740872124844247394331610742526798002790454471017963689103992069052351742426232743057805752116654284202565073499989547960010007671747192642153906736772395146

PRIVATE KEY a 499637385278037565947850297804521496549438167899737019047642670345

SIGNATURE r 490436210229317006346424415580580119033991336088941858215546263006 s 459648993600447605903692335633488162526105352376100727055624198850

SIGNATURE GENERATION k 904295316080584122515027988660912109401746849340089455779648381020

FIG.8C

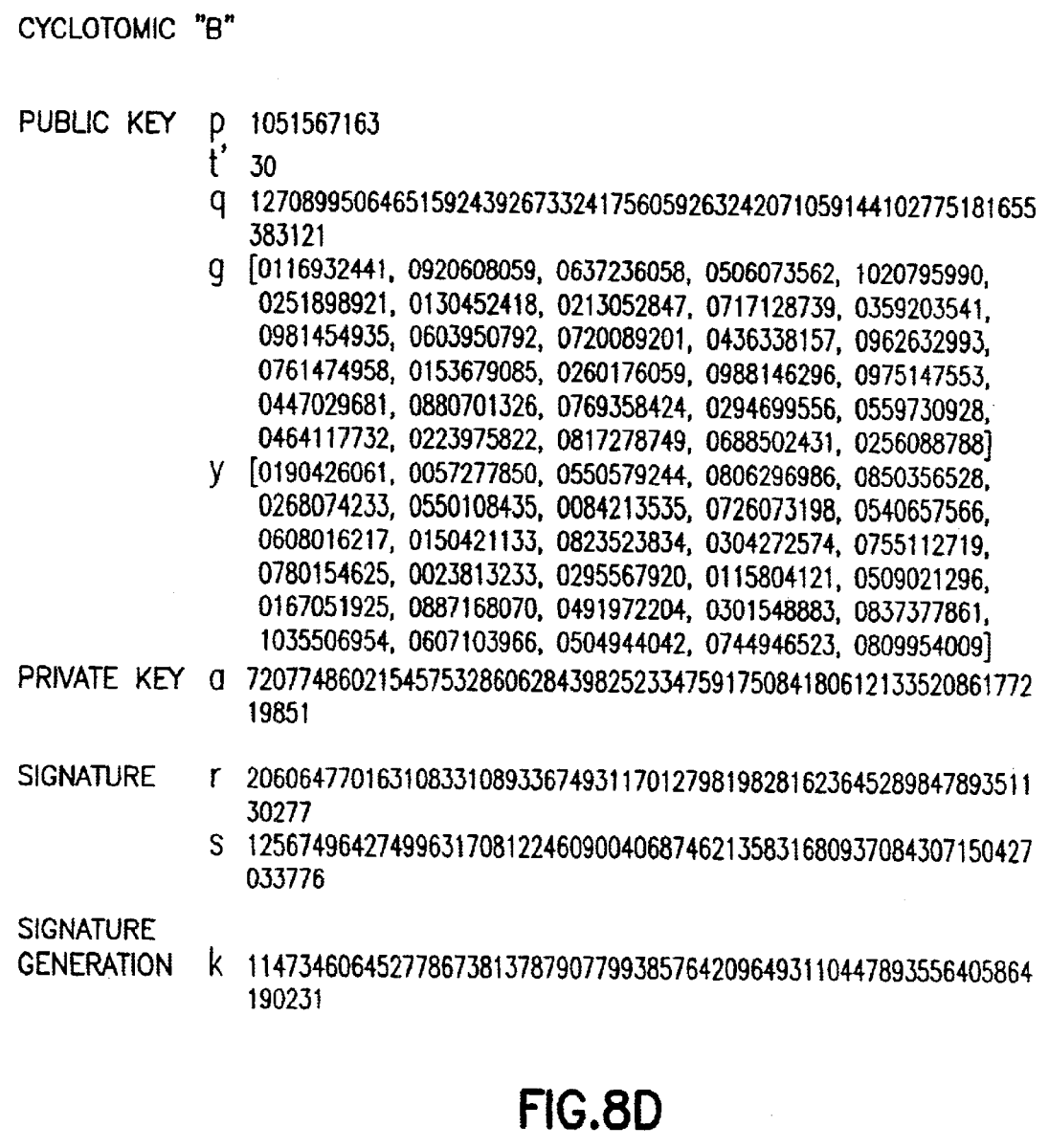

CYCLOTOMIC "B"

PUBLIC KEY
p 1051567163
t' 30
q 1270899506465159243926733241756059263242071059144102775181655383121
g [0116932441, 0920608059, 0637236058, 0506073562, 1020795990, 0251898921, 0130452418, 0213052847, 0717128739, 0359203541, 0981454935, 0603950792, 0720089201, 0436338157, 0962632993, 0761474958, 0153679085, 0260176059, 0988146296, 0975147553, 0447029681, 0880701326, 0769358424, 0294699556, 0559730928, 0464117732, 0223975822, 0817278749, 0688502431, 0256088788]
y [0190426061, 0057277850, 0550579244, 0806296986, 0850356528, 0268074233, 0550108435, 0084213535, 0726073198, 0540657566, 0608016217, 0150421133, 0823523834, 0304272574, 0755112719, 0780154625, 0023813233, 0295567920, 0115804121, 0509021296, 0167051925, 0887168070, 0491972204, 0301548883, 0837377861, 1035506954, 0607103966, 0504944042, 0744946523, 0809954009]

PRIVATE KEY
a 720774860215457532860628439825233475917508418061213352086177219851

SIGNATURE
r 206064770163108331089336749311701279819828162364528984789351130277
s 1256749642749963170812246090040687462135831680937084307150427033776

SIGNATURE GENERATION
k 1147346064527786738137879077993857642096493110447893556405864190231

FIG.8D

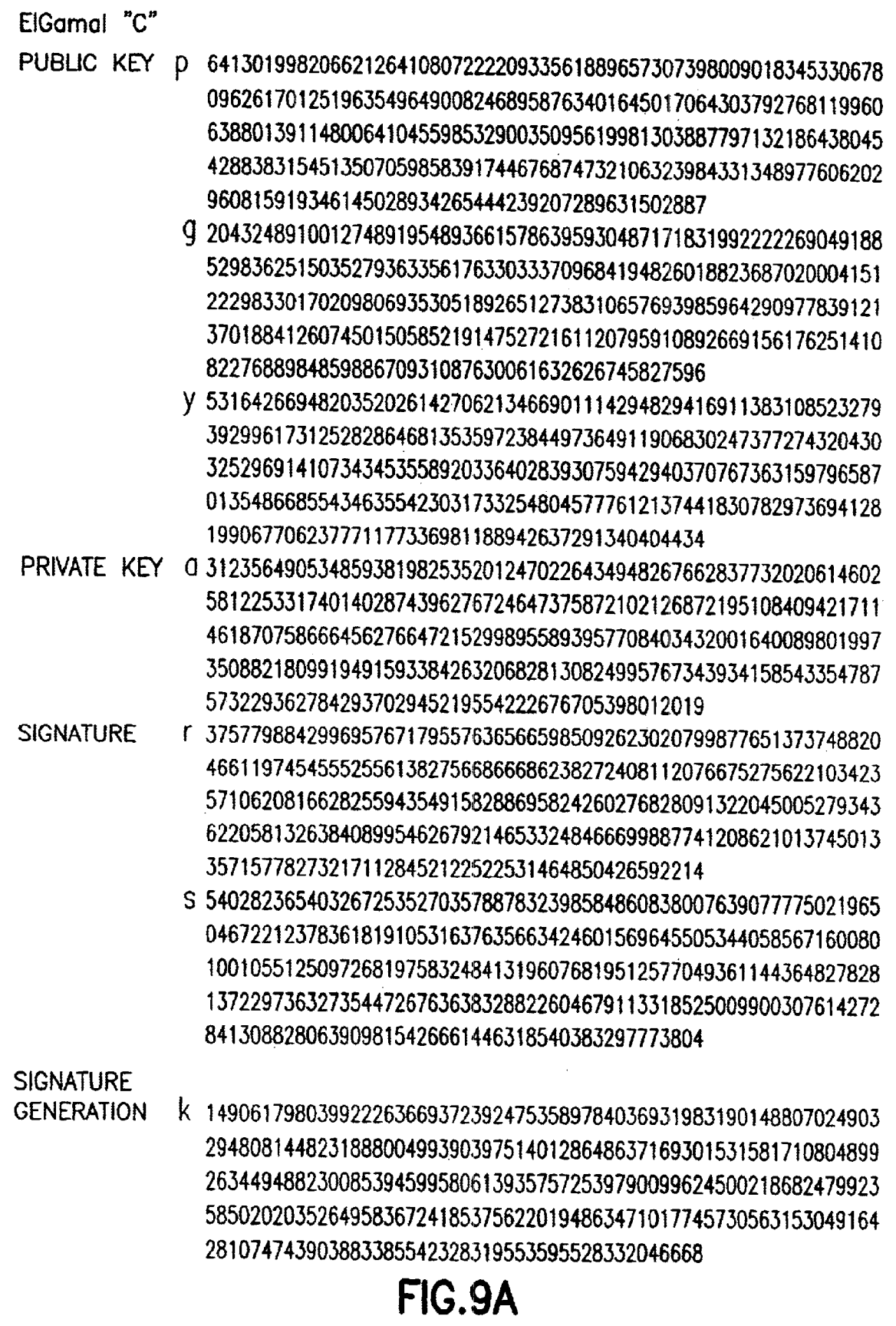

ElGamal "C"

PUBLIC KEY p 6413019982066212641080722220933561889657307398009018345330678
0962617012519635496490082468958763401645017064303792768119960
6388013911480064104559853290035095619981303887797132186438045
4288383154513507059858391744676874732106323984331348977606202
960815919346145028934265444239207289631502887 g 2043248910012748919548936615786395930487171831992222269049188
5298362515035279363356176330333709684194826018823687020004151
2229833017020980693530518926512738310657693985964290977839121
3701884126074501505852191475272161120795910892669156176251410
822768898485988670931087630061632626745827596 y 5316426694820352026142706213466901114294829416911383108523279
3929961731252828646813535972384497364911906830247377274320430
3252969141073434535589203364028393075942940370767363159796587
0135486685543463554230317332548045777612137441830782973694128
199067706237771177336981188942637291340404434

PRIVATE KEY a 3123564905348593819825352012470226434948267662837732020614602
5812253317401402874396276724647375872102126872195108409421711
4618707586664562766472152998955893957708403432001640089801997
3508821809919491593384263206828130824995767343934158543354787
573229362784293702945219554222676705398012019

SIGNATURE r 3757798842996957671795576365665985092623020799877651373748820
4661197454555255613827566866686238272408112076675275622103423
5710620816628255943549158288695824260276828091322045005279343
6220581326384089954626792146533248466699887741208621013745013
357157782732171128452122522531464850426592214 s 5402823654032672535270357887832398584860838007639077775021965
0467221237836181910531637635663424601569645505344058567160080
1001055125097268197583248413196076819512577049361144364827828
1372297363273544726763638328822604679113318525009900307614272
841308828063909815426661446318540383297773804

SIGNATURE GENERATION k 1490617980399222636693723924753589784036931983190148807024903
2948081448231888004993903975140128648637169301531581710804899
2634494882300853945995806139357572539790099624500218682479923
5850202035264958367241853756220194863471017745730563153049164
281074743903883385542328319553595528332046668

FIG.9A

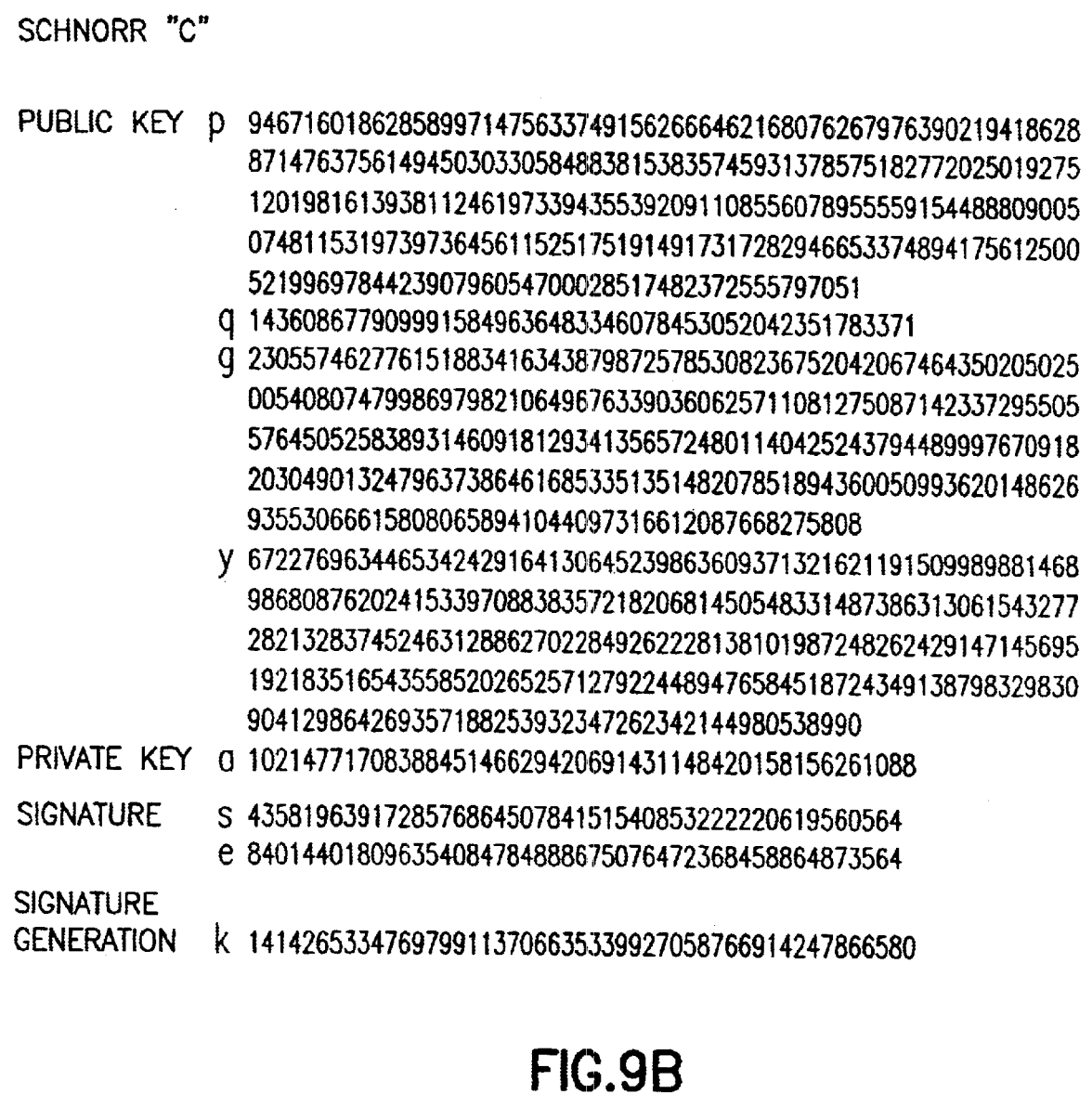

SCHNORR "C"

PUBLIC KEY p 9467160186285899714756337491562666462168076267976390219418628
8714763756149450303305848838153835745931378575182772025019275
1201981613938112461973394355392091108556078955559154488809005
0748115319739736456115251751914917317282946653374894175612500
52199697844239079605470002851748237255579 7051 q 143608677909991584963648334607845305204235 1783371 g 2305574627761518834163438798725785308236752042067464350205025
0054080747998697982106496763390360625711081275087142337295505
5764505258389314609181293413565724801140425243794489997670918
2030490132479637386461685335135148207851894360050993620148626
9355306661580806589410440973166120876682758 08 y 6722769634465342429164130645239863609371321621191509989881468
9868087620241533970883835721820681450548331487386313061543277
2821328374524631288627022849262228138101987248262429147145695
1921835165435585202652571279224489476584518724349138798329830
90412986426935718825393234726234214498053899 0

PRIVATE KEY a 102147717083884514662942069143114842015815626 1088

SIGNATURE s 435819639172857686450784151540853222220619560564
e 840144018096354084784888675076472368458864873564

SIGNATURE GENERATION k 141426533476979911370663533992705876691424786658 0

FIG.9B

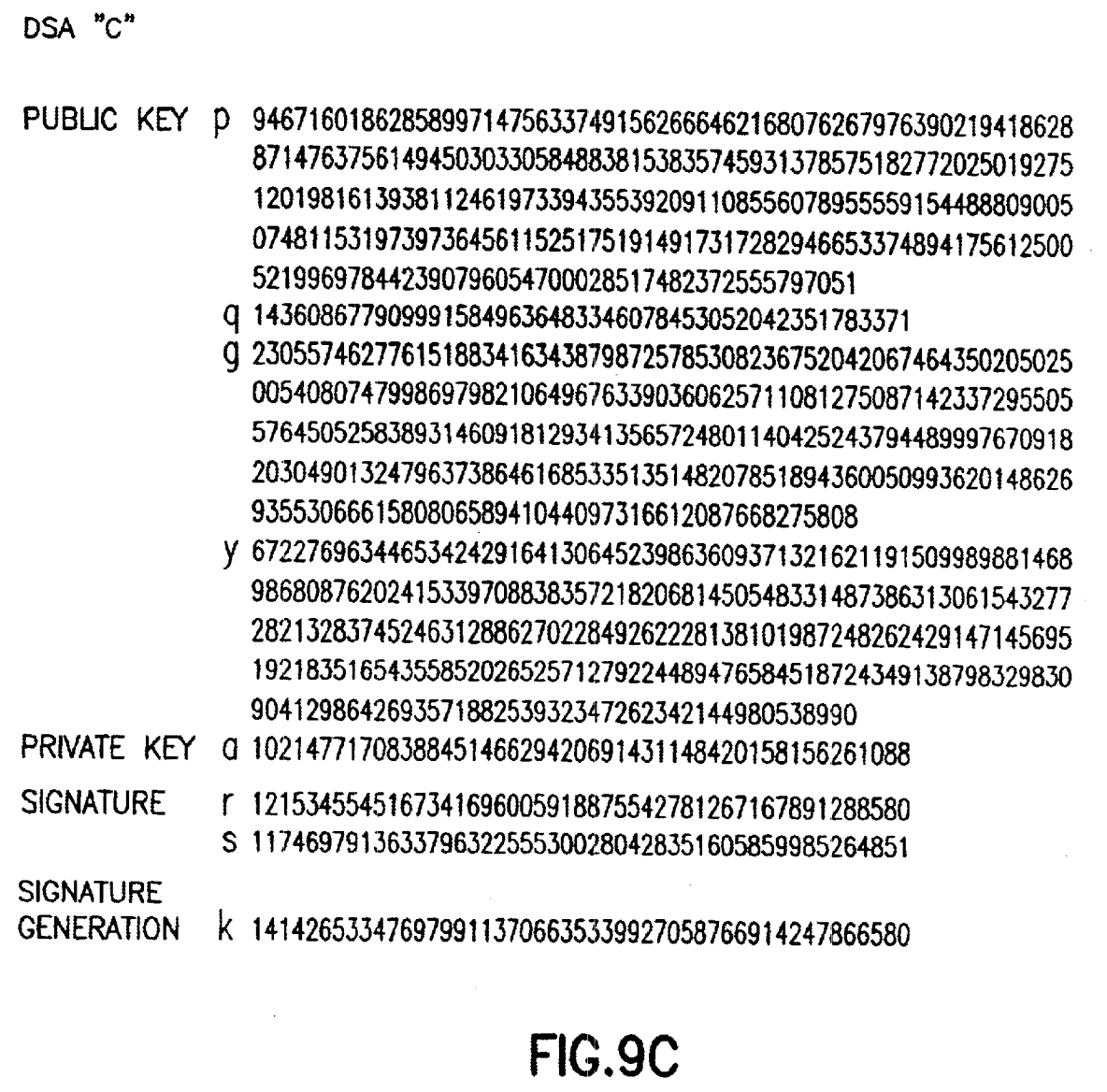

DSA "C"

PUBLIC KEY p 9467160186285899714756337491562666462168076267976390219418628
8714763756149450303305848838153835745931378575182772025019275
1201981613938112461973394355392091108556078955559154488809005
0748115319739736456115251751914917317282946653374894175612500
521996978442390796054700028517482372555797051 q 1436086779099915849636483346078453052042351783371 g 2305574627761518834163438798725785308236752042067464350205025
0054080747998697982106496763390360625711081275087142337295505
5764505258389314609181293413565724801140425243794489997670918
2030490132479637386461685335135148207851894360050993620148626
935530666158080658941044097316612087668275808 y 6722769634465342429164130645239863609371321621191509989881468
9868087620241533970883835721820681450548331487386313061543277
2821328374524631288627022849262228138101987248262429147145695
1921835165435585202652571279224489476584518724349138798329830
904129864269357188253932347262342144980538990

PRIVATE KEY a 1021477170838845146629420691431148420158156261088

SIGNATURE r 1215345545167341696005918875542781267167891288580
s 1174697913633796322555300280428351605859985264851

SIGNATURE GENERATION k 1414265334769799113706635339927058766914247866580

FIG.9C

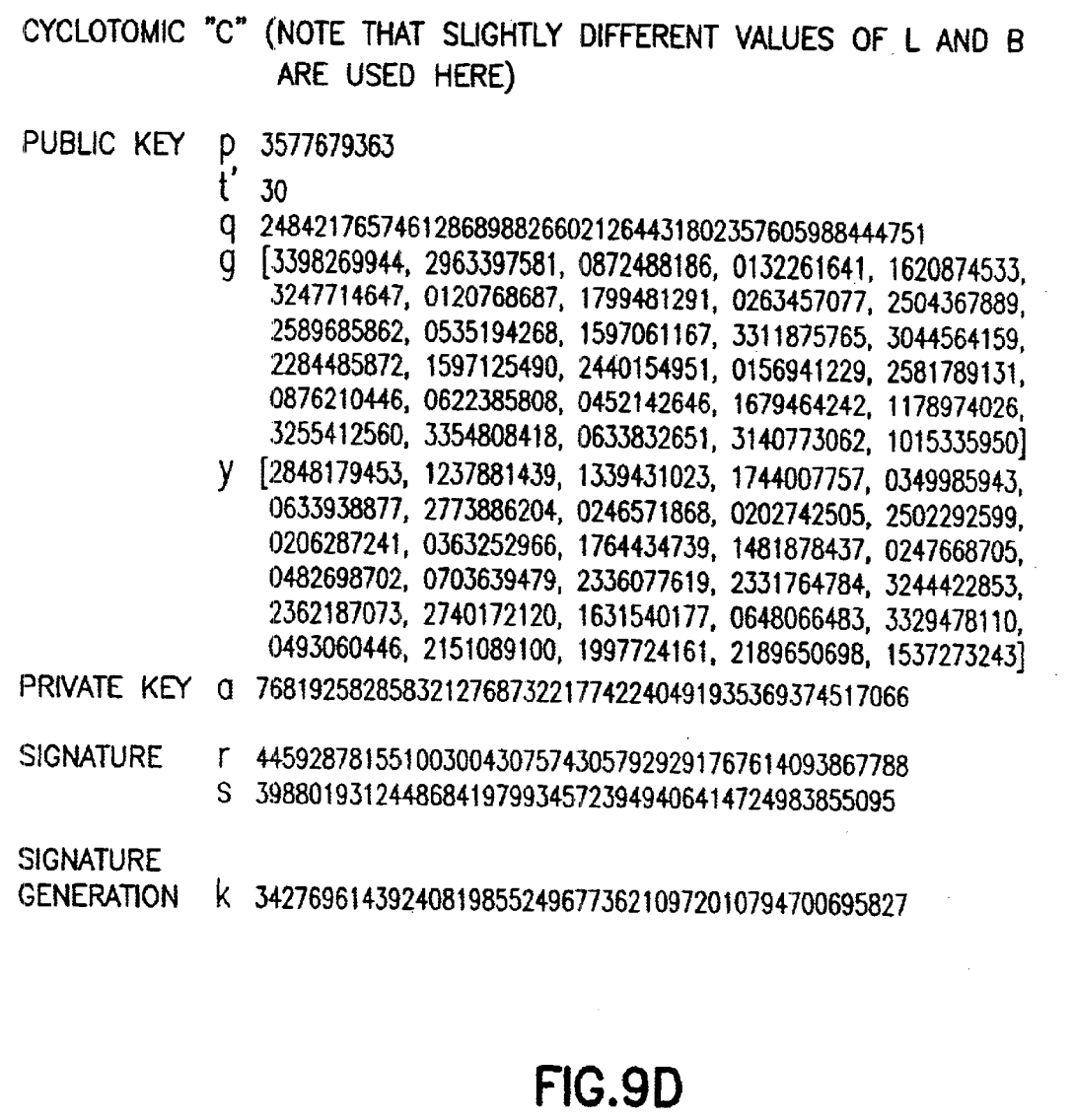

CYCLOTOMIC "C" (NOTE THAT SLIGHTLY DIFFERENT VALUES OF L AND B ARE USED HERE)

PUBLIC KEY
p 3577679363
t' 30
q 248421765746128689882660212644318023576059884447 51
g [3398269944, 2963397581, 0872488186, 0132261641, 1620874533, 3247714647, 0120768687, 1799481291, 0263457077, 2504367889, 2589685862, 0535194268, 1597061167, 3311875765, 3044564159, 2284485872, 1597125490, 2440154951, 0156941229, 2581789131, 0876210446, 0622385808, 0452142646, 1679464242, 1178974026, 3255412560, 3354808418, 0633832651, 3140773062, 1015335950]
y [2848179453, 1237881439, 1339431023, 1744007757, 0349985943, 0633938877, 2773886204, 0246571868, 0202742505, 2502292599, 0206287241, 0363252966, 1764434739, 1481878437, 0247668705, 0482698702, 0703639479, 2336077619, 2331764784, 3244422853, 2362187073, 2740172120, 1631540177, 0648066483, 3329478110, 0493060446, 2151089100, 1997724161, 2189650698, 1537273243]

PRIVATE KEY
a 768192582858321276873221774224049193536937451706 6

SIGNATURE
r 445928781551003004307574305792929176761409386778 8
s 398801931244868419799345723949406414724983855095

SIGNATURE GENERATION
k 342769614392408198552496773621097201079470069582 7

FIG.9D

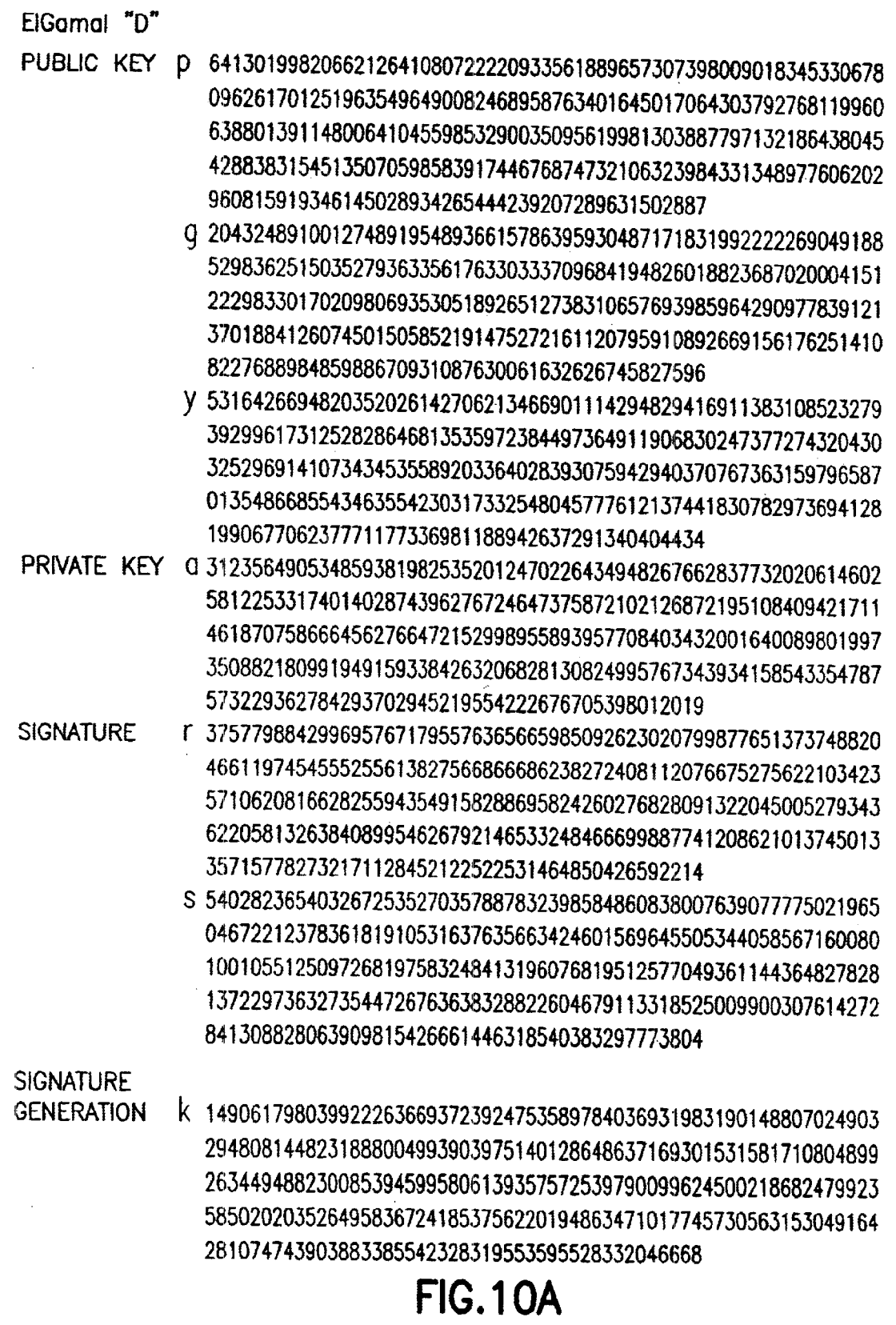

ElGamal "D"

PUBLIC KEY p 64130199820662126410807222209335618896573073980090183453306780962617012519635496490082468958763401645017064303792768119960638801391148006410455985329003509561998130388779713218643804542883831545135070598583917446768747321063239843313489776062029608159193461450289342654442392072896315028 87 g 204324891001274891954893661578639593048717183199222226904918852983625150352793633561763303337096841948260188236870200041512229833017020980693530518926512738310657693985964290977839121370188412607450150585219147527216112079591089266915617625141082276889848598867093108763006163262674582759 6 y 531642669482035202614270621346690111429482941691138310852327939299617312528286468135359723844973649119068302473772743204303252969141073434535589203364028393075942940370767363159796587013548668554346355423031733254804577761213744183078297369412819906770623777117733698118894263729134040443 4

PRIVATE KEY a 312356490534859381982535201247022643494826766283773202061460258122533174014028743962767246473758721021268721951084094217114618707586664562766472152998955893957708403432001640089801997350882180991949159338426320682813082499576734393415854335478757322936278429370294521955422267670539801201 9

SIGNATURE r 375779884299695767179557636566598509262302079987765137374882046611974545552556138275668666862382724081120766752756221034235710620816628255943549158288695824260276828091322045005279343622058132638408995462679214653324846669988774120862101374501335715778273217112845212252253146485042659221 4 s 540282365403267253527035788783239858486083800763907777502196504672212378361819105316376356634246015696455053440585671600801001055125097268197583248413196076819512577049361144364827828137229736327354472676363832882260467911331852500990030761427284130882806390981542666144631854038329777380 4

SIGNATURE GENERATION k 149061798039922263669372392475358978403693198319014880702490329480814482318880049939039751401286486371693015315817108048992634494882300853945995806139357572539790099624500218682479923585020203526495836724185375622019486347101774573056315304916428107474390388338554232831955359552833204666 8

FIG.10A

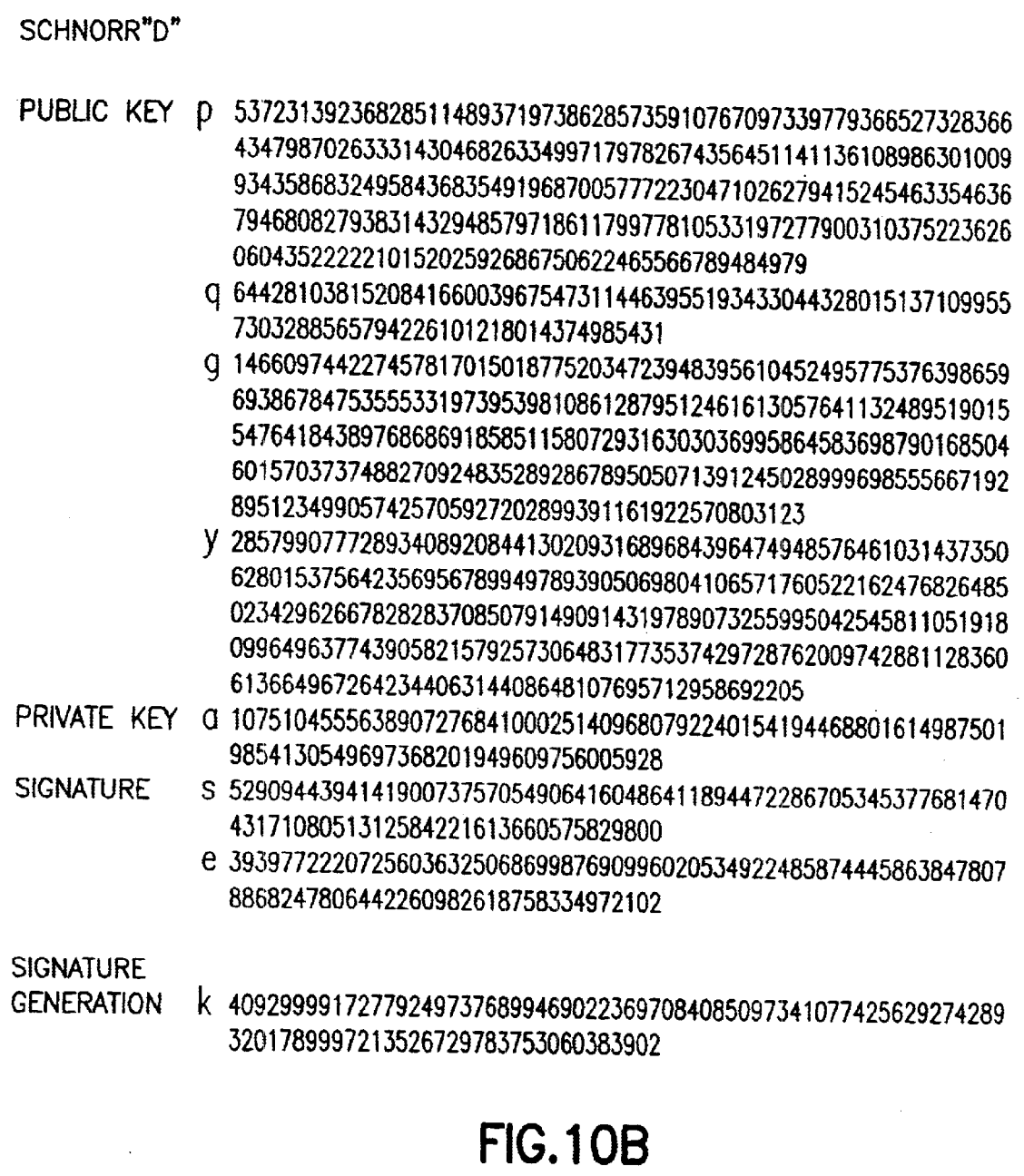

SCHNORR"D"

PUBLIC KEY p 5372313923682851148937197386285735910767097339779366527328366
4347987026333143046826334997179782674356451141136108986301009
9343586832495843683549196870057772230471026279415245463354636
7946808279383143294857971861179977810533197277900310375223626
060435222221015202592686750622465566789484979 q 6442810381520841660039675473114463955193433044328015137109955
7303288565794226101218014374985431 g 1466097442274578170150187752034723948395610452495775376398659
6938678475355533197395398108612879512461613057641132489519015
5476418438976868691858511580729316303036995864583698790168504
6015703737488270924835289286789505071391245028999698555667192
895123499057425705927202899391161922570803123 y 2857990777289340892084413020931689684396474948576461031437350
6280153756423569567899497893905069804106571760522162476826485
0234296266782828370850791490914319789073255995042545811051918
0996496377439058215792573064831773537429728762009742881128360
613664967264234406314408648107695712958692205

PRIVATE KEY a 1075104555638907276841000251409680792240154194468801614987501
9854130549697368201949609756005928

SIGNATURE s 5290944394141900737570549064160486411894472286705345377681470
4317108051312584221613660575829800 e 3939772220725603632506869987690996020534922485874445863847807
8868247806442260982618758334972102

SIGNATURE GENERATION k 4092999917277924973768994690223697084085097341077425629274289
3201789997213526729783753060383902

FIG. 10B

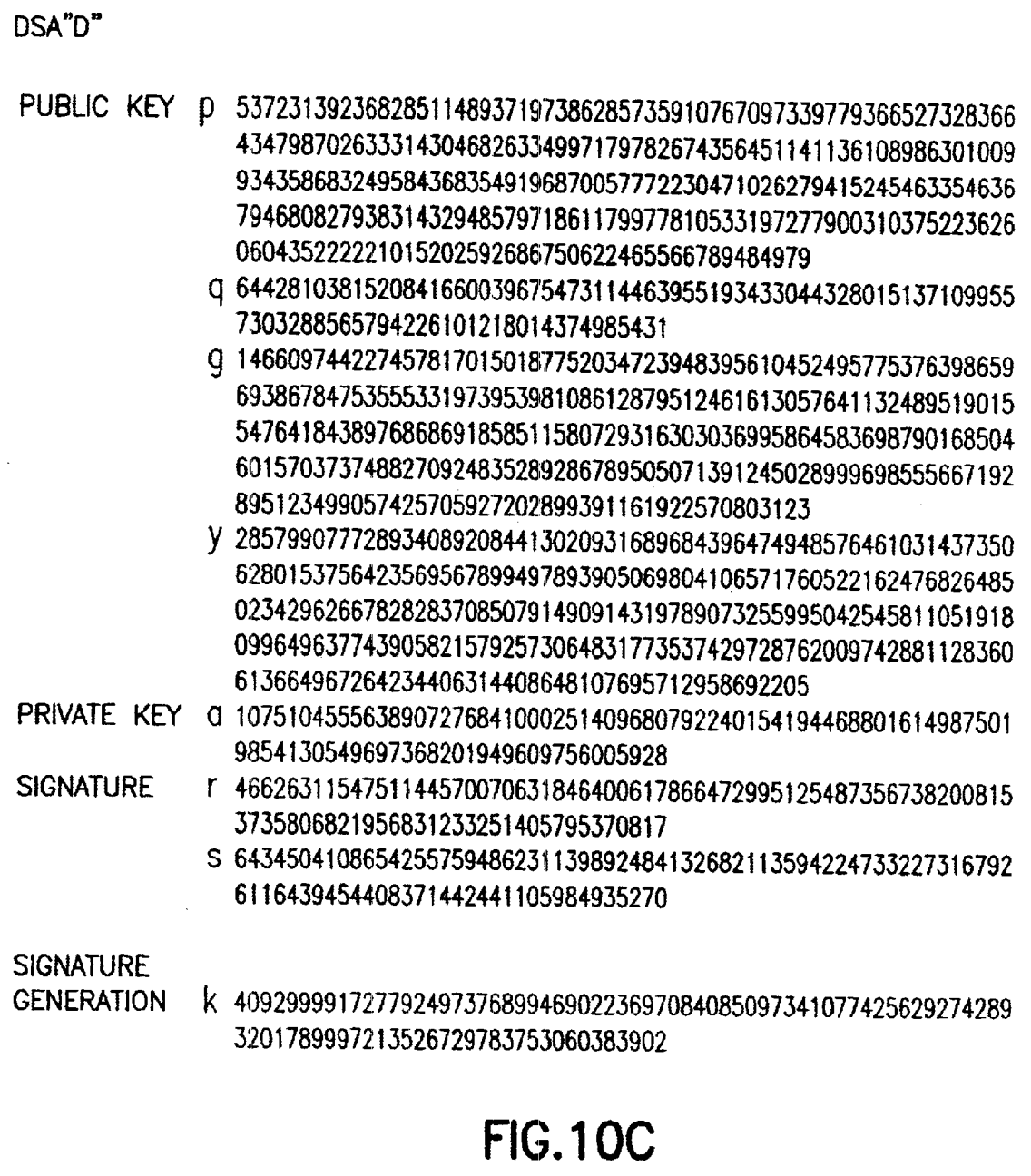

DSA"D"

PUBLIC KEY p 537231392368285114893719738628573591076709733977936652732836643479870263331430468263349971797826743564511411361089863010099343586832495843683549196870057772230471026279415245463354636794680827938314329485797186117997781053319727790031037522362606043522221015202592686750622465566789484979 q 64428103815208416600396754731144639551934330443280151371099557303288565794226101218014374985431 g 1466097442274578170150187752034723948395610452495775376398659693867847535553319739539810861287951246161305764113248951901554764184389768686918585115807293163030369958645836987901685046015703737488270924835289286789505071391245028999698555667192895123499057425705927202899391161922570803123 y 2857990777289340892084413020931689684396474948576461031437350628015375642356956789949789390506980410657176052216247682648502342962667828283708507914909143197890732559950425458110519180996496377439058215792573064831773537429728762009742881128360613664967264234406314408648107695712958692205

PRIVATE KEY a 10751045556389072768410002514096807922401541944688016149875019854130549697368201949609756005928

SIGNATURE r 46626311547511445700706318464006178664729951254873567382008153735806821956831233251405795370817 s 64345041086542557594862311398924841326821135942247332273167926116439454408371442441105984935270

SIGNATURE GENERATION k 40929999172779249737689946902236970840850973410774256292742893201789997213526729783753060383902

FIG. 10C

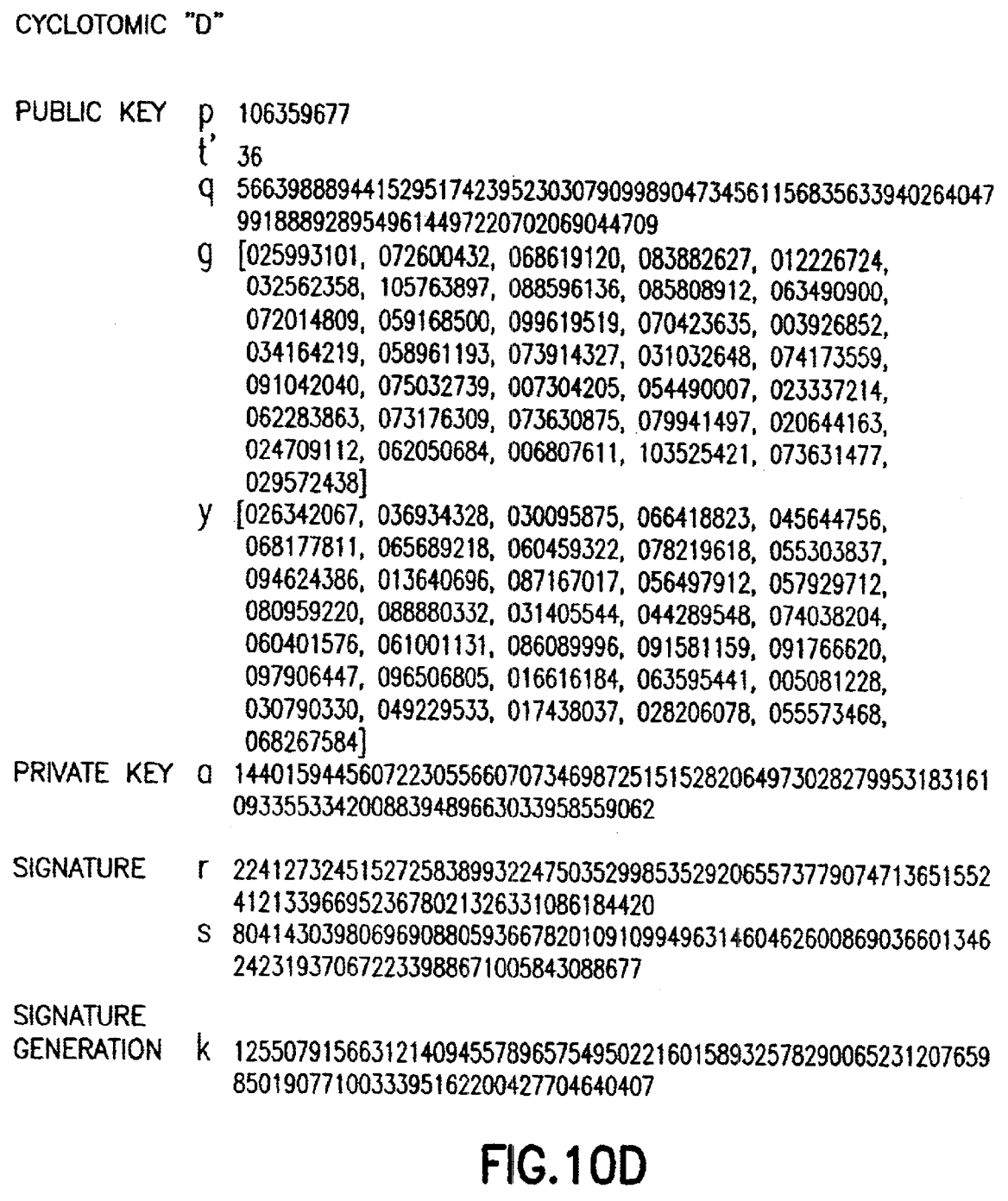

CYCLOTOMIC "D"

PUBLIC KEY
p 106359677
t' 36
q 5663988894415295174239523030790998904734561156835633940264047
9918889289549614497220702069044709
g [025993101, 072600432, 068619120, 083882627, 012226724,
032562358, 105763897, 088596136, 085808912, 063490900,
072014809, 059168500, 099619519, 070423635, 003926852,
034164219, 058961193, 073914327, 031032648, 074173559,
091042040, 075032739, 007304205, 054490007, 023337214,
062283863, 073176309, 073630875, 079941497, 020644163,
024709112, 062050684, 006807611, 103525421, 073631477,
029572438]
y [026342067, 036934328, 030095875, 066418823, 045644756,
068177811, 065689218, 060459322, 078219618, 055303837,
094624386, 013640696, 087167017, 056497912, 057929712,
080959220, 088880332, 031405544, 044289548, 074038204,
060401576, 061001131, 086089996, 091581159, 091766620,
097906447, 096506805, 016616184, 063595441, 005081228,
030790330, 049229533, 017438037, 028206078, 055573468,
068267584]

PRIVATE KEY
a 1440159445607223055660707346987251515282064973028279953183161
0933553342008839489663033958559062

SIGNATURE
r 2241273245152725838993224750352998535292065573779074713651552
4121339669523678021326331086184420
s 8041430398069690880593667820109109949631460462600869036601346
2423193706722339886710058430886 77

SIGNATURE GENERATION
k 1255079156631214094557896575495022160158932578290065231207659
8501907710033395162200427704640407

FIG.10D

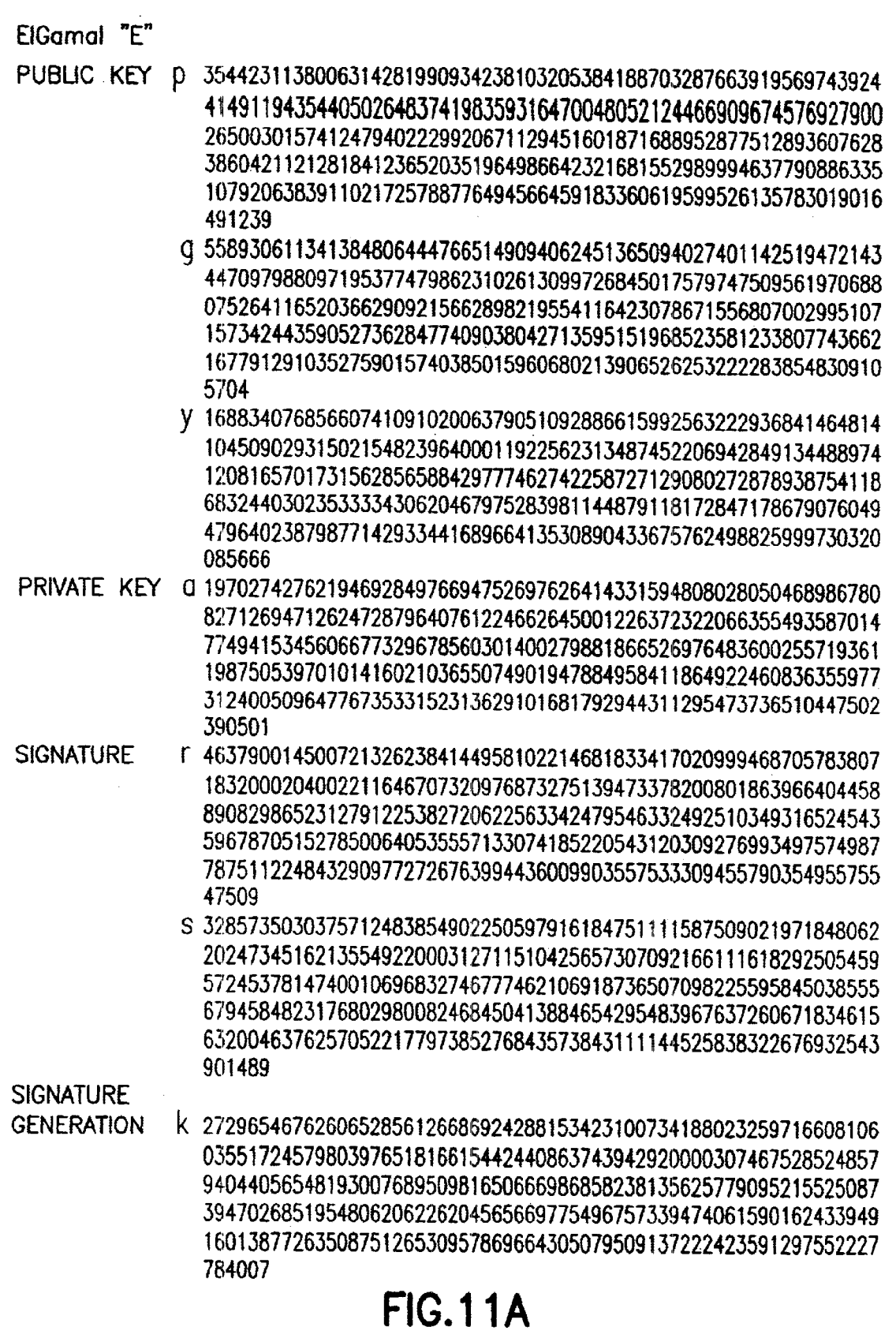

ElGamal "E"

PUBLIC KEY p 3544231138006314281990934238103205384188703287663919569743924
4149119435440502648374198359316470048052124466909674576927900
2650030157412479402229920671129451601871688952877512893607628
3860421121281841236520351964986642321681552989994637790886335
1079206383911021725788776494566459183360619599526135783019016
491239 g 5589306113413848064447665149094062451365094027401142519472143
4470979880971953774798623102613099726845017579747509561970688
0752641165203662909215662898219554116423078671556807002995107
1573424435905273628477409038042713595151968523581233807743662
1677912910352759015740385015960680213906526253222283854830910
5704 y 1688340768566074109102006379051092886615992563222936841464814
1045090293150215482396400011922562313487452206942849134488974
1208165701731562856588429777462742258727129080272878938754118
6832440302353333430620467975283981144879118172847178679076049
4796402387987714293344168966413530890433675762498825999730320
085666

PRIVATE KEY a 1970274276219469284976694752697626414331594808028050468986780
8271269471262472879640761224662645001226372322066355493587014
7749415345606677329678560301400279881866526976483600255719361
1987505397010141602103655074901947884958411864922460836355977
3124005096477673533152313629101681792944311295473736510447502
390501

SIGNATURE r 4637900145007213262384144958102214681833417020999468705783807
1832000204002211646707320976873275139473378200801863966404458
8908298652312791225382720622563342479546332492510349316524543
5967870515278500640535557133074185220543120309276993497574987
7875112248432909772726763994436009903557533309455790354955755
47509 s 3285735030375712483854902250597916184751111587509021971848062
2024734516213554922000312711510425657307092166111618292505459
5724537814740010696832746777462106918736507098225595845038555
6794584823176802980082468450413884654295483967637260671834615
6320046376257052217797385276843573843111144525838322676932543
901489

SIGNATURE GENERATION k 2729654676260652856126686924288153423100734188023259716608106
0355172457980397651816615442440863743942920000307467528524857
9404405654819300768950981650666986858238135625779095215525087
3947026851954806206226204565669775496757339474061590162433949
1601387726350875126530957869664305079509137222423591297552227
784007

FIG.11A

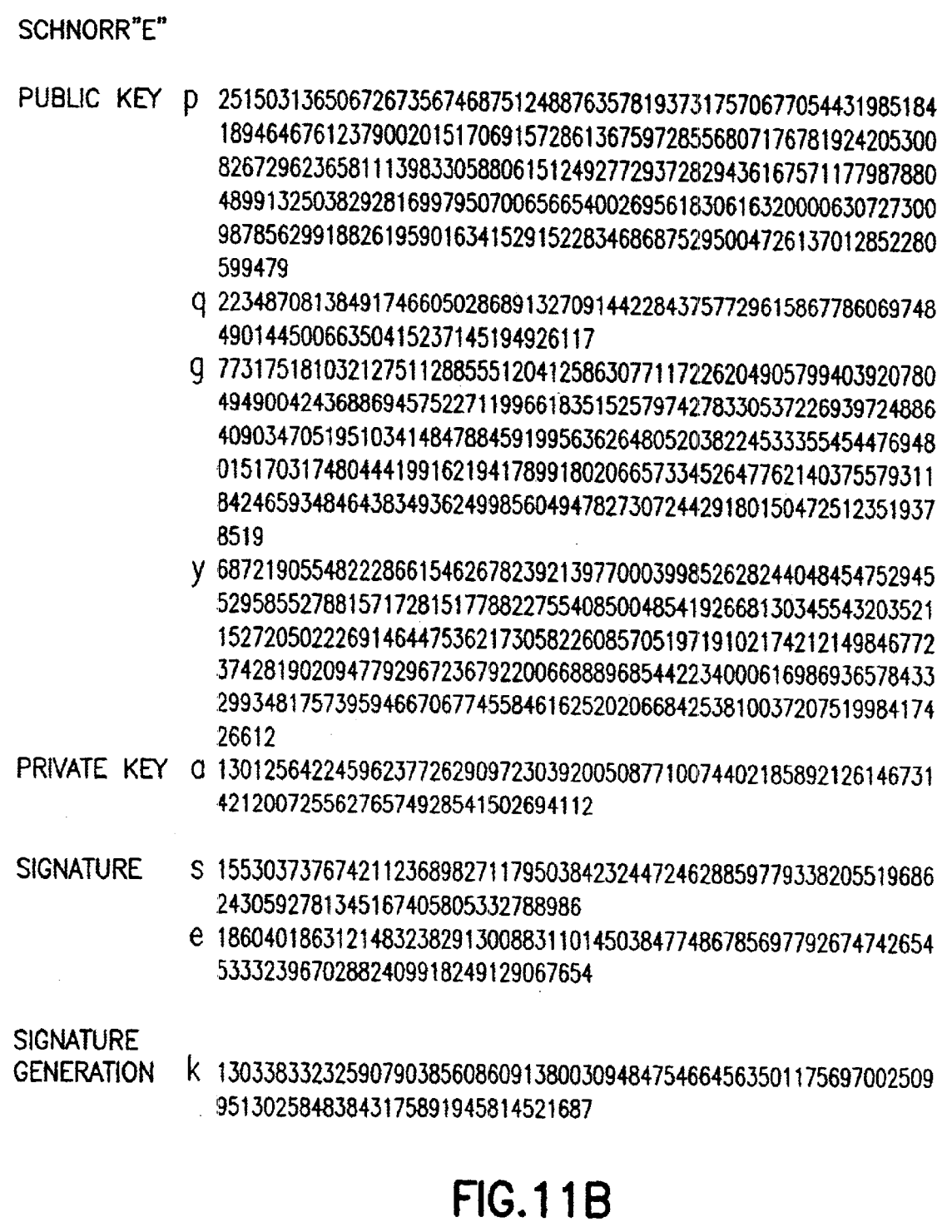

SCHNORR"E"

PUBLIC KEY p 25150313650672673567468751248876357819373175706770544319851841894646761237900201517069157286136759728556807176781924205300826729623658111398330588061512492772937282943616757117798788048991325038292816997950700656654002695618306163200006307273009878562991882619590163415291522834686875295004726137012852280599479 q 22348708138491746605028689132709144228437577296158677860697484901445006635041523714519492611 7 g 773175181032127511288555120412586307711722620490579940392078049490042436886945752271199661835152579742783305372269397248864090347051951034148478845919956362648052038224533355454476948015170317480444199162194178991802066573345264776214037557931184246593484643834936249985604947827307244291801504725123519378519 y 68721905548222866154626782392139770003998526282440484547529455295855278815717281517788227554085004854192668130345543203521152720502226914644753621730582260857051971910217421214984677237428190209477929672367922006688896854422340006169869365784332993481757395946670677455846162520206684253810037207519984174266 12

PRIVATE KEY a 130125642245962377262909723039200508771007440218589212614673142120072556276574928541502694112

SIGNATURE s 155303737674211236898271179503842324472462885977933820551968624305927813451674058053327889 86 e 186040186312148323829130088311014503847748678569779267474265453332396702882409918249129067654

SIGNATURE GENERATION k 130338332325907903856086091380030948475466456350117569700250995130258483843175891945814521687

FIG. 11B

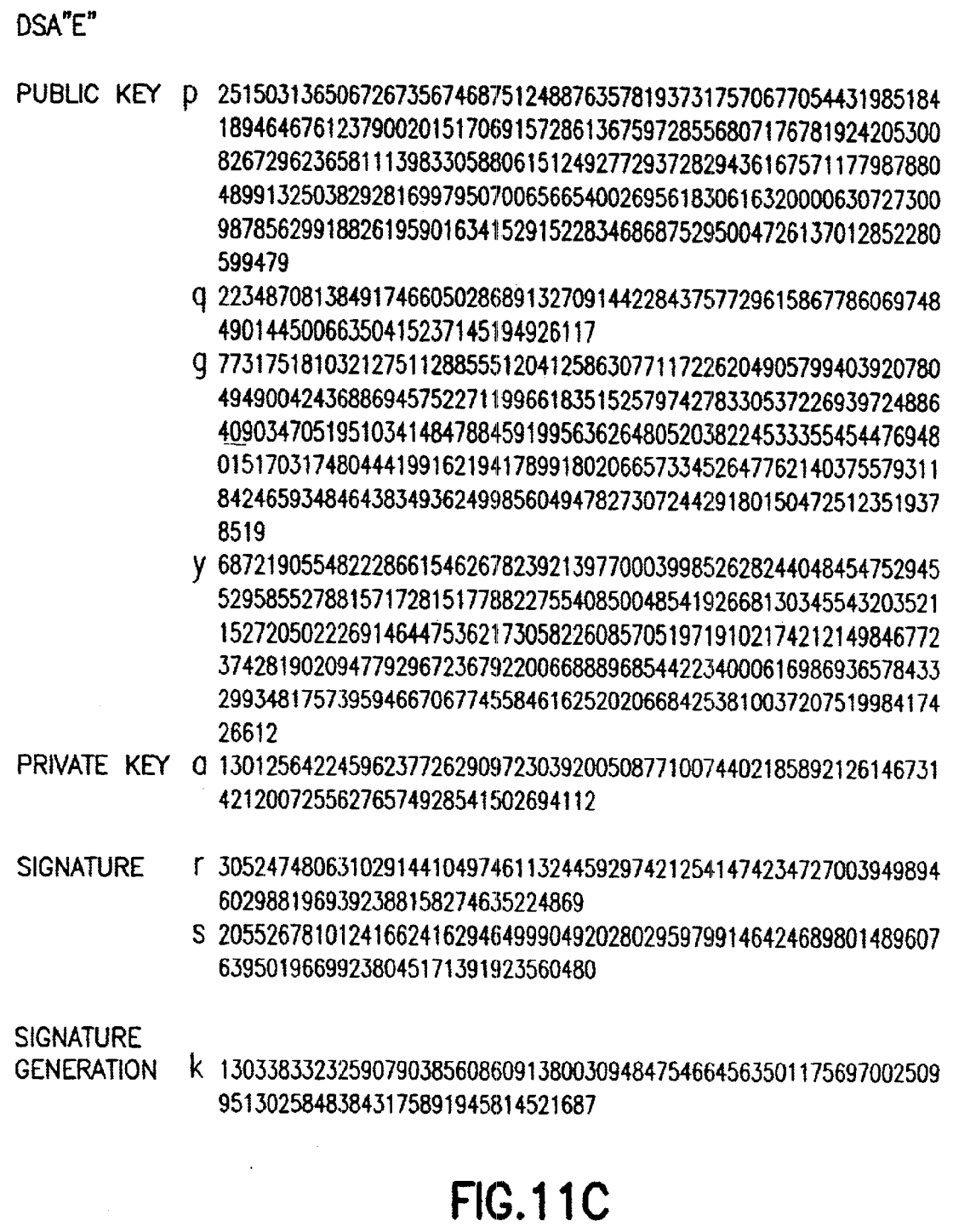

DSA"E"

PUBLIC KEY p 2515031365067267356746875124887635781937317570677054431985184
1894646761237900201517069157286136759728556807176781924205300
8267296236581113983305880615124927729372829436167571177987880
4899132503829281699795070065665400269561830616320000630727300
9878562991882619590163415291522834686875295004726137012852280
599479 q 2234870813849174660502868913270914422843757729615867786069748
490144500663504152371451949261 17 g 7731751810321275112885551204125863077117226204905799403920780
4949004243688694575227119966183515257974278330537226939724886
4090347051951034148478845919956362648052038224533355454476948
0151703174804441991621941789918020665733452647762140375579311
8424659348464383493624998560494782730724429180150472512351937
8519 y 6872190554822286615462678239213977000399852628244048454752945
5295855278815717281517788227554085004854192668130345543203521
1527205022269146447536217305822608570519719102174212149846772
3742819020947792967236792200668889685442234000616986936578433
2993481757395946670677455846162520206684253810037207519984174
26612

PRIVATE KEY a 1301256422459623772629097230392005087710074402185892126146731
42120072556276574928541502694112

SIGNATURE r 3052474806310291441049746113244592974212541474234727003949894
60298819693923881582746352224869 s 2055267810124166241629464999049202802959799146424689801489607
63950196699238045171391923560480

SIGNATURE GENERATION k 1303383323259079038560860913800309484754664563501175697002509
95130258483843175891945814521687

FIG.11C

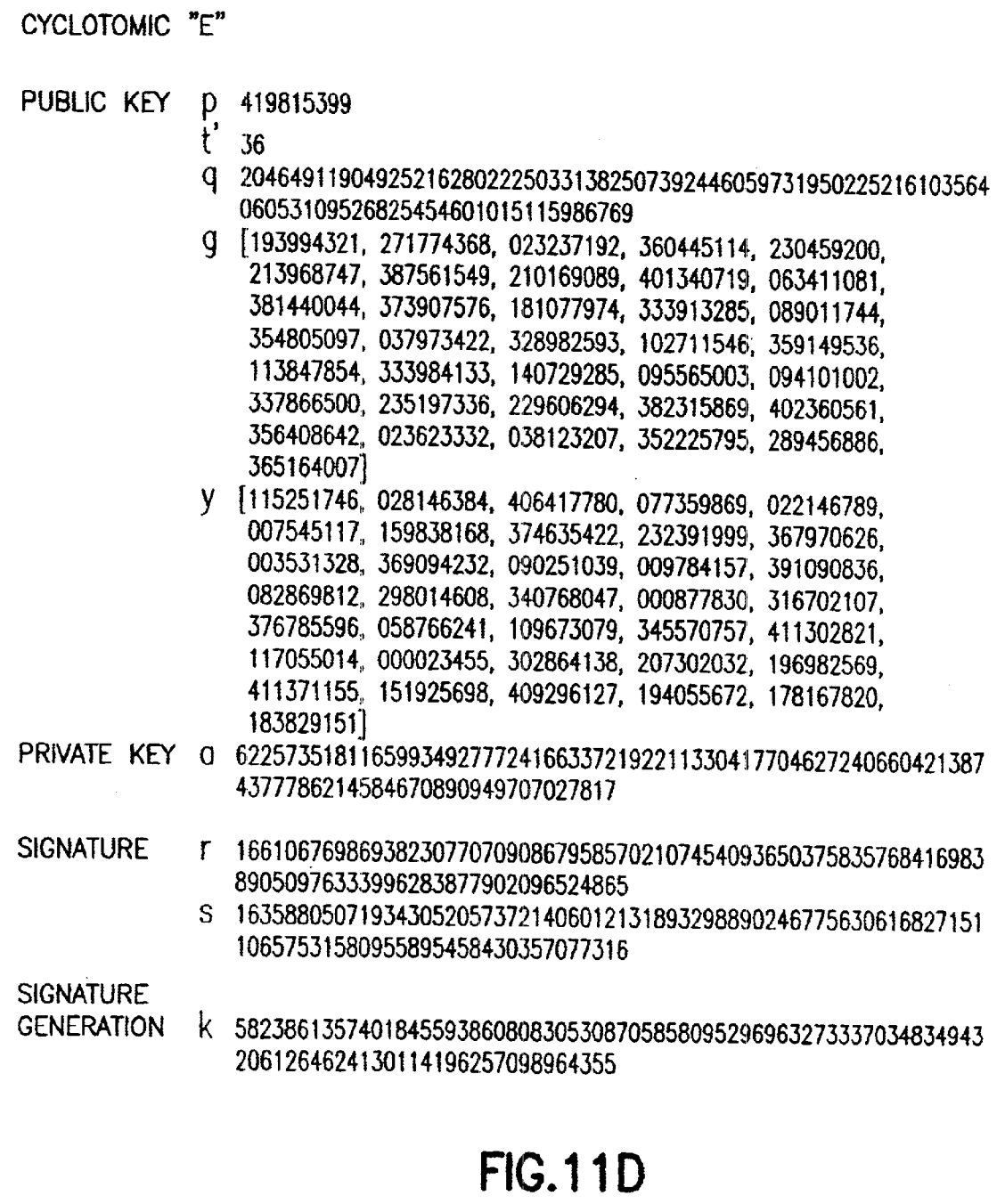

CYCLOTOMIC "E"

PUBLIC KEY
p 419815399
t' 36
q 204649119049252162802225033138250739244605973195022521610356406053109526825454601015115986769
g [193994321, 271774368, 023237192, 360445114, 230459200, 213968747, 387561549, 210169089, 401340719, 063411081, 381440044, 373907576, 181077974, 333913285, 089011744, 354805097, 037973422, 328982593, 102711546, 359149536, 113847854, 333984133, 140729285, 095565003, 094101002, 337866500, 235197336, 229606294, 382315869, 402360561, 356408642, 023623332, 038123207, 352225795, 289456886, 365164007]
y [115251746, 028146384, 406417780, 077359869, 022146789, 007545117, 159838168, 374635422, 232391999, 367970626, 003531328, 369094232, 090251039, 009784157, 391090836, 082869812, 298014608, 340768047, 000877830, 316702107, 376785596, 058766241, 109673079, 345570757, 411302821, 117055014, 000023455, 302864138, 207302032, 196982569, 411371155, 151925698, 409296127, 194055672, 178167820, 183829151]

PRIVATE KEY
a 62257351811659934927772416633721922113304177046272406604213874377786214584670890949707027817

SIGNATURE
r 166106769869382307707090867958570210745409365037583576841698389050976333996283877902096524865
s 163588050719343052057372140601213189329889024677563061682715110657531580955895458430357077316

SIGNATURE GENERATION
k 582386135740184559386080830530870585809529696327333703483494320612646241301141962257098964355

FIG.11D

CYCLOTOMIC POLYNOMIAL CONSTRUCTION OF DISCRETE LOGARITHM CRYPTOSYSTEMS OVER FINITE FIELDS

CROSS-REFERENCE TO RELATED APPLICATION

This is a continuation-in-part application under 37 C.F.R. 1.53(b) of U.S. patent application Ser. No. 08/800,669, filed on Feb. 14, 1997 now abandoned.

BACKGROUND OF THE INVENTION

The present invention relates to data security, encryption, and, generating and using electronic signatures to verify the identity of a communicating party.

Most public key cryptosystems involve either a factoring problem or a discrete logarithm (DL) problem. The factoring problem is, given a not-prime number, find its complete factorization into prime numbers. The DL problem is, given a group G generated by g and an element h in G, find an integer m such that $g^m=h$, that is, evaluate $\log_g h$. Several proposed schemes for public key cryptosystems rely on the computational difficulty of finding a DL in a multiplicative group of a finite field.

Public key cryptosystems encompass public key encryption schemes and digital signature schemes. Assume each user has a public key and a private key, which is not necessarily true for all schemes, and that party A wishes to send a secure message to party B. In a public key encryption scheme, party A uses party B's public key to encrypt, and then party B uses its own public and private keys to decrypt. In a digital signature scheme, party A uses its own public and private keys to prepare the message, and party B uses party A's public key to receive the message. That is, to prepare the message, in a public key encryption scheme, the sending party uses the receiving party's key information, whereas in a digital signature scheme, the sending party uses its own key information. To receive the message, in a public key encryption scheme, the receiving party uses its own key information, whereas in a digital signature scheme, the receiving party uses the sending party's key information.

In public key cryptosystems, all participants have a public key and a corresponding private key, as disclosed in U.S. Pat. No. 5,481,613 to Ford et al., entitled "Computer Network Cryptographic Key distribution System" which is incorporated herein by reference. A shared public key may refer to the portion of the public key common to multiple users, as disclosed in Scott A. Vanstone et al., "Short RSA Keys and Their Generation", 8 Journal of Cryptology, pp. 101–114 (1995) and, U.S. Pat. No. 5,231,668 to Kravitz, entitled "Digital Signature Algorithm", both of which are incorporated herein by reference.

For two participants to be able to communicate using a secret key cryptosystem, the participants must first agree on a secret key to use for their communication. A "shared" key in a secret key cryptosystem refers to the secret key agreed upon by the participants, as disclosed in U.S. Pat. No. 5,481,613 to Ford et al., entitled "Computer Network Cryptographic Key Distribution System".

Typical digital signature schemes have three steps: system setup, signature generation by a sending party, and signature verification by a receiving party.

System setup is assumed to occur well before signing or encryption of a message. Generally, during system setup of a DL based public key cryptosystem, a prime number is selected and used to obtain a generator for a group, then a random number is selected and used as an exponent for the generator to produce a resulting value in the finite field. Determining the random number when only the generator and resulting value are known is a DL problem.

The outcomes of system setup are a public key and a private key. A public key is assumed to be public knowledge and comprises the prime number, the generator, the resulting value and possibly other parameters. A private key is assumed to be known only to the sending party, and comprises the random number.

During signature generation of a DL based public key cryptosystem, a second random number is chosen and used as an exponent for the generator to produce a second resulting value in the finite field. Determining the second random number when only the generator and second resulting value are known is a DL problem. Then a third value based on the private key, on the message to be signed, and second resulting value is obtained. The outcome of signature generation is a digital signature including the third value and at least one other parameter.

During signature verification of a DL based public key cryptosystem, the public key and third value portion of the signature are exponentially combined to produce a fourth result. If the fourth result is equal to at least one other parameter of the signature, then the signature is considered valid.

The exponentiation portions of system setup, signature generation and signature verification are computationally expensive and time consuming. Techniques are sought which will reduce the computational burden to an authorized user, particularly during signature generation, while maintaining computational difficulty for an unauthorized user.

SUMMARY OF THE INVENTION

In accordance with an aspect of this invention, a method of and an apparatus for determining public and private keys for a public key cryptosystem comprises selecting a first prime number, obtaining a cyclotomic polynomial evaluated at the first prime number, obtaining a second prime number which is a factor of the cyclotomic polynomial evaluated at the first prime number, finding a generator of a subgroup of a multiplicative group of a finite field, the order of the subgroup being the second prime number, obtaining a public value based on the generator and a selected integer, forming the public key to include the first and second prime numbers, the generator and the public value, and forming the private key to include the selected integer.

In accordance with a further aspect of this invention, the finite field may be represented with an optimal normal basis.

In accordance with a different aspect of this invention, the second prime number q satisfies $(\log_2 q)+1 \approx B$, where B is a predetermined number of bits.

In accordance with another aspect of this invention, a control integer t' is selected, and the cyclotomic polynomial is the t'-th cyclotomic polynomial, and the public key includes the control integer t'.

In accordance with still another aspect of this invention, a method of generating a digital signature for a message additionally selects a second integer, obtains a first signature value based on the second integer and the generator, obtains a second signature value based on the first signature value and the message, and forms the digital signature to include the first and second signature values.

A method of verifying a thus-formed digital signature for a message finds an inverse integer which is the inverse of the second signature value, finds a first intermediate value based on the inverse integer and the message, finds a second intermediate value based on the inverse integer and the first signature value, finds a third intermediate value based on the generator, the public value, and the first and second intermediate values, and determines that the signature is valid when the third intermediate value is equal to the first signature value.

A method of determining a shared key for a public key cryptosystem selects a first prime number, obtains a cyclotomic polynomial evaluated at the first prime number, obtains a second prime number which is a factor of the cyclotomic polynomial evaluated at the first prime number, finds a generator of a subgroup of a multiplicative group of a finite field, the order of the subgroup being the second prime number, selects an integer, receives an intermediate value which is based on the generator, and forms the shared key as a function of the intermediate value and the integer.

A method for secure communication of a message selects a first prime number, obtains a cyclotomic polynomial evaluated at the first prime number, obtains a second prime number which is a factor of the cyclotomic polynomial evaluated at the first prime number, finds a generator of a subgroup of a multiplicative group of a finite field, the order of the subgroup being the second prime number, selects an integer, receives an intermediate value which is based on the generator, forms the shared key as a function of the intermediate value and the integer, and encrypts the message using the shared key.

A method for secure communication of a message receives an encrypted message which has been encrypted using a shared key formed as a function of an intermediate value and a selected integer, the intermediate value being based on a generator of a subgroup of a multiplicative group of a finite field, the order of the subgroup being a second prime number which is a factor of a cyclotomic polynomial evaluated at a first prime number, and decrypts the encrypted message using the shared key.

A method for secure communication of a message selects a first prime number, obtains a cyclotomic polynomial evaluated at the first prime number, obtains a second prime number which is a factor of the cyclotomic polynomial evaluated at the first prime number, finding a generator of a subgroup of a multiplicative group of a finite field, the order of the subgroup being the second prime number, obtains a public value based on the generator and a first integer, selects a second integer, finds a first encrypted value based on the generator and the second integer, finds a second encrypted value based on the message, the public value and the second integer, and forms an encrypted message from the first and second encrypted values.

A method for secure communication of a message receives an encrypted message formed of a first encrypted value and a second encrypted value, the first encrypted value being based on a first integer and a generator of a subgroup of a multiplicative group of a finite field, the order of the subgroup being a second prime number which is a factor of a cyclotomic polynomial evaluated at a first prime number, the second encrypted value being based on the message, the first integer and a public value based on the generator and a second integer, finds a first intermediate value based on the first encrypted value and a private key, the private key being based on the generator, and decrypts the encrypted message based on the second encrypted value and the first intermediate value.

It is not intended that the invention be summarized here in its entirety. Rather, further features, aspects and advantages of the invention are set forth in or are apparent from the following description and drawings.

BRIEF DESCRIPTION OF THE DRAWINGS

FIG. 4D is a table of cyclotomic polynomial coefficients;

FIG. 4E is a flowchart illustrating a DES system setup according to the present invention;

FIG. 4F is a flowchart illustrating encryption for the DES system setup according to the present invention;

FIG. 4G is a flowchart illustrating decryption for the DES system setup according to the present invention;

FIG. 5A is a table of results for comparing signature generation performance of schemes for public key cryptosystems;

FIG. 5B is a table of results for comparing signature verification performance of schemes for public key cryptosystems;

FIG. 6 is a chart showing the message encrypted and decrypted to obtain the performance results of FIGS. 5A and 5B;

FIGS. 7A–11D are charts showing the public key, private key, signature, and signature generation parameter k, for each of the public key cryptosystems in the examples used to obtain the performance results of FIGS. 5A and 5B.

DETAILED DESCRIPTION OF THE PREFERRED EMBODIMENTS

Cyclotomic polynomials are used to construct subgroups of multiplicative groups of finite fields that allow very efficient implementation of discrete logarithm based public key cryptosystems, including public key encryption schemes and digital signature schemes. A field is represented with an optimal normal basis, and a generator of a subgroup of the multiplicative group of the field is used to form a public key. Depending on the type of application and implementation, public key encryption according to the cyclotomic scheme may be up to three times faster than schemes using more conventional choices of subgroups or finite fields.

Proposed digital signature schemes include the ElGamal scheme, as set forth in T. ElGamal, "A public key cryptosystem and a signature scheme based on discrete logarithms", *IEEE Trans. Info. Tech.,* 31, 469–472, 1985; the Schnorr scheme, as set forth in C. P. Schnorr, "Efficient signature generation by smart cards", *J. Cryptology,* 4, 161–174, 1991; the digital signature algorithm (DSA) scheme, as set forth in U.S. Pat. No. 5,231,668 (Kravitz), "Digital signature algorithm", Jul. 27, 1993; and the elliptic curve digital signature algorithm (ECDSA) scheme, as set forth in Agnew et al., "An implementation for a fast public key cryptosystem", *J. Cryptology,* 3, 63–79, 1991. DSA is incorporated in the U.S. Government's Digital Signature Standard. These proposed schemes are discussed and compared with the present cyclotomic scheme as used in a digital signature scheme.

Terminology m a message to be signed, consisting of a binary string p a prime number q a prime factor of p−1

L the length in bits of p, practically, L determines the DL security level.

B the length in bits of q, practically, B determines the subgroup DL security level.

F(p) the field of p elements, represented by the set {0, 1, . . . , p−1} of least residues modulo p F(p)* multiplicative group of F(p)=F(p)−0

Figure 1A:
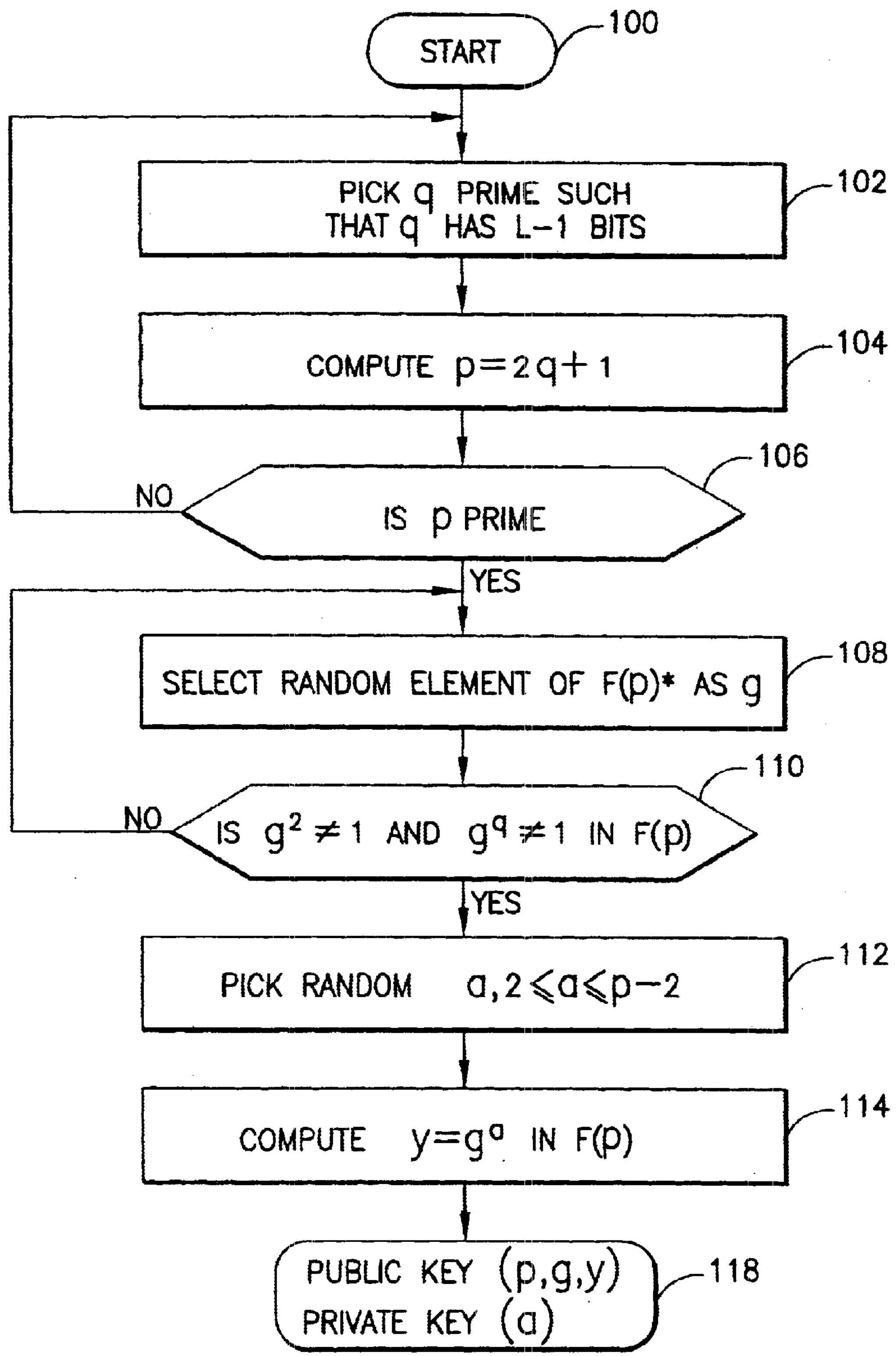
FIG. 1A is a flowchart illustrating system setup according to the ElGamal scheme.

H(.) a collision resistant cryptographic hash function which maps binary strings to non-negative integers of at most a predetermined number of bits, as defined in William J. Gilbert et al., "Classical Algebra", Third Edition, section 5.5.1 (University of Waterloo, 1993), which is incorporated herein by reference ElGamal System Setup FIG. 1A shows the steps performed for each user during setup of an electronic signature system according to the ElGamal scheme. This process is performed by a processor of a general purpose digital computer. Alternatively, this process may be performed by a special purpose printed circuit board used in conjunction with a general purpose computer, or by a "smart card", that is, a credit card sized portable device including a microprocessor.

At step 102, a prime number q having L−1 bits is chosen.

At step 104, a value p=2q+1 is computed.

At step 106, a test is made to determine whether p is prime. Since q has L−1 bits, p has L bits.

If p is not prime, the process returns to step 102 and selects another prime number.

If p is prime, the process proceeds to step 108, and randomly selects an element g of the multiplicative group F(p)* of the field F(p) of p elements.

At step 110, a test is made to determine whether $g^2 \neq 1$ and whether $g^q \neq 1$ in F(p). If either of these tests fails, the process returns to step 108 and selects another element of F(p)* as the element g.

If $g^2 \neq 1$ and $g^q \neq 1$ in F(p), then the element g is a generator for the multiplicative group F(p)* of the field F(p). Instead of the procedure depicted in steps 102–110, other procedures may be used to locate a field F(p) and a generator g.

After locating a generator g, the process proceeds to step 112, and randomly selects a value a in the range $2 \leqq a \leqq p-2$.

At step 114, the process finds $y=g^a$ in F(p).

The result of system setup is a public key (p,g,y) and a private key (a). The public key has length 3L bits. The private key has length L bits.

Finding the private key (a) from the public key (p,g,y) is a discrete logarithm (DL) problem in the field F(p), and is considered hard if p is big enough. Presently, suitable difficulty is presented when the length of p is L bits, L=1024, and when a prime factor of p−1 has at least 160 bits. As computational power becomes more available, these parameters will increase, to maintain the computational difficulty for an unauthorized user.

ElGamal Signature Generation

Figure 1B:
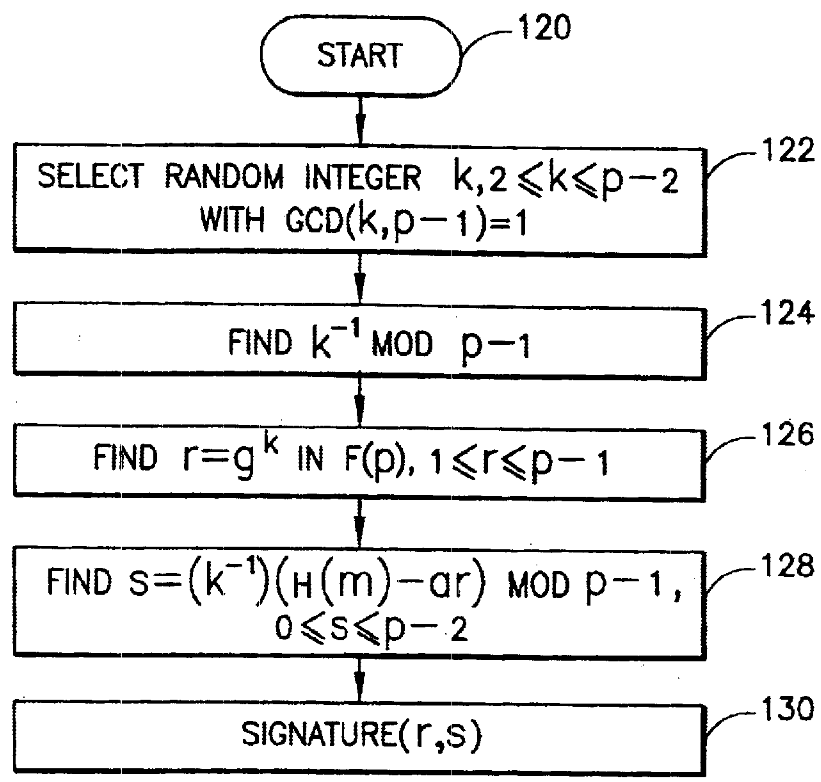
FIG. 1B is a flowchart illustrating signature generation according to the ElGamal scheme.

FIG. 1B shows the steps performed by a party generating an electronic signature for a particular document according to the ElGamal scheme. The document is considered to be a bit string m. In practice, the generating party is a processor of a general purpose digital computer. In some embodiments, the processor may be in a special purpose digital computer, such as a smart card.

At step 122, an integer k is randomly selected in the range $2 \leqq k \leqq p-2$, with the greatest common divisor (GCD) of k and p−1 being 1, that is, k is selected so that it is co-prime with p−1.

At step 124, $k^{-1}$ mod p−1 is found, that is, the value which satisfies $(k)(k^{-1})=1$ mod p−1.

At step 126, the value $r=g^k$ in F(p) is obtained, with r in the range $1 \leqq r \leqq p-1$.

At step 128, the value $s=k^{-1}(H(m)-ar)$ mod p−1 is computed, with s in the range $0 \leqq s \leqq p-2$. H(.) is a cryptographic hash function agreed upon by all users of the system. For example, a suitable standard cryptographic hash function is Secure Hash Algorithm SHA-1, as defined in FIPS 180-1, Apr. 17, 1995, available from the National Technical Information Service, Springfield, Va.

The result of signature generation is a digital signature (r,s). The signature has a length of 2L bits.

Only the possessor of the private key (a) can properly sign messages. The secrecy of the private key (a) is again protected by a DL problem: if k could be computed from r by computing the discrete logarithm $\log_g r$ in F(p), then $k^{-1}$ could be computed, which would make it possible to derive the private key (a) from s, m and $k^{-1}$. Consequently, it is important that a particular value for k be kept private, and not be reused.

ElGamal Signature Verification

Figure 1C:
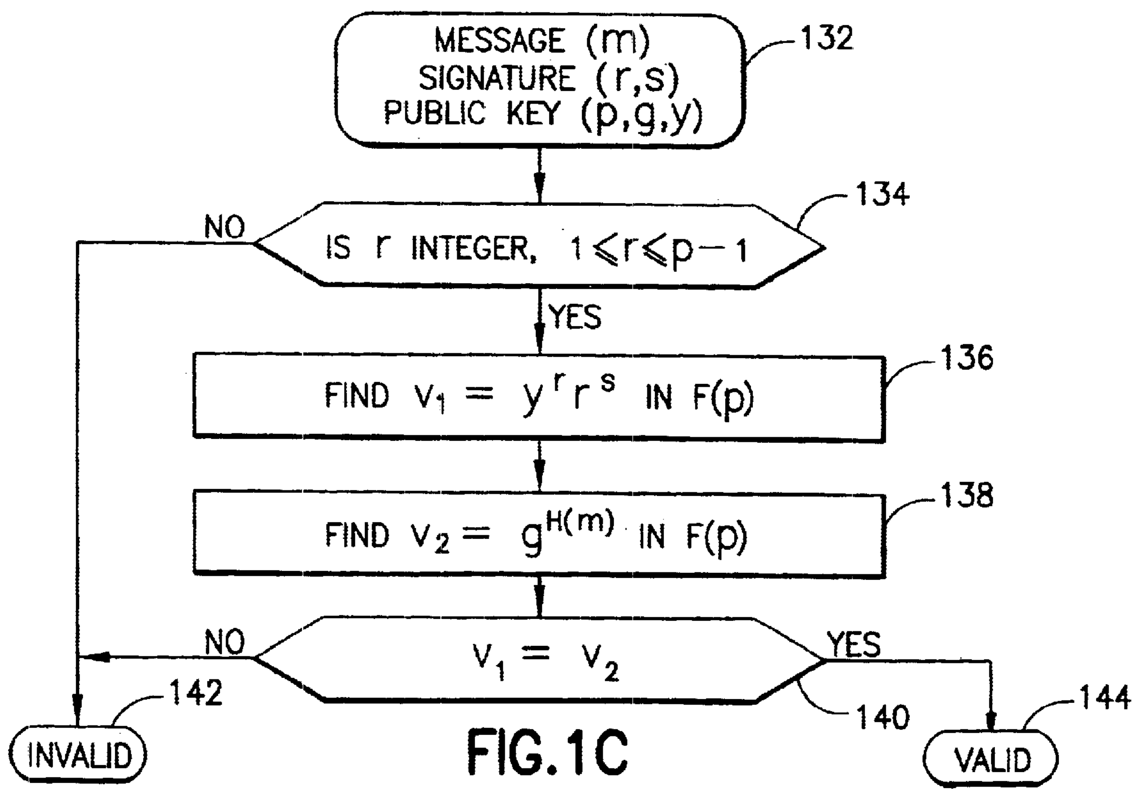
FIG. 1C is a flowchart illustrating signature verification according to the ElGamal scheme.

FIG. 1C shows the steps performed by a party receiving a document which has been electronically signed according to the ElGamal scheme to determine whether the signature is valid.

The receiving party is assumed to have a message (m) and a corresponding digital signature (r,s) which was obtained as in FIG. 1B, and a public key (p,g,y) which was obtained as in FIG. 1A and which was used to obtain the signature (r,s). In practice, the receiving party is a processor of a general purpose digital computer. In some embodiments, the processor may be in a special purpose digital computer, such as a smart card.

At step 134, the process determines whether the value r is in the range $1 \leqq r \leqq p-1$. If not, at step 142, the signature is determined to be invalid.

If r is in the appropriate range, then at step 136,the value $v_1=y^r r^s$ in F(p) is computed. Next, at step 138, the value $v_2=g^{H(m)}$ in F(p) is computed.

At step 140, a test is made to determine whether $v_1=v_2$. If not, at step 142, the signature is determined to be invalid. If so, at step 144, the signature is determined to be valid.

Schnorr/DSA System Setup

Figure 2A:
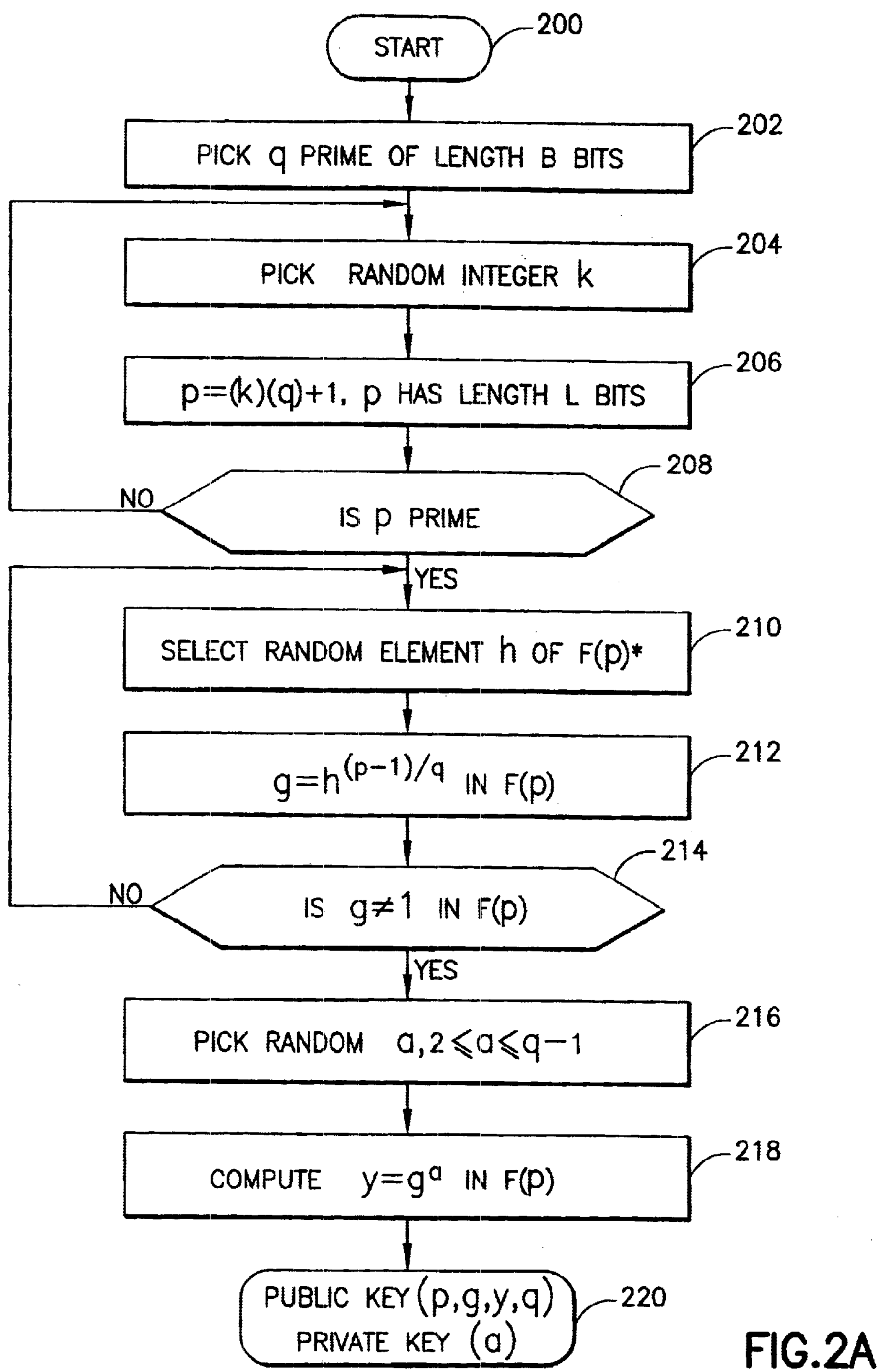
FIG. 2A is a flowchart illustrating system setup according to the Schnorr and DSA schemes.

FIG. 2A shows the steps which must be performed for each user during setup of an electronic signature system according to the Schnorr scheme.

Schnorr's scheme is directed to using a small subgroup of the multiplicative group of a prime field of large characteristic, in order to make the signature shorter and the exponentiation faster since short exponents are used. If the subgroup order is prime and sufficiently large, then use of the subgroup does not affect the security of the scheme.

System setup for the DSA scheme is identical to system setup for Schnorr's scheme, except that the DSA scheme specifies the values for the length of certain parameters (B and L), as explained below.

At step 202, a prime number q of length B bits is chosen. In the DSA scheme, B is specified to be 160.

At step 204, an integer k is randomly chosen. Preferably, k has a length of 750–864 bits to provide sufficient security against an unauthorized user, but this will increase as processing power increases.

At step 206, a value p=kq+1 of length L bits is computed. In the DSA scheme, L is specified to be 512+i*64 for $0 \leqq i \leqq 8$ with i being an integer.

At step 208,a test is made to determine whether p is prime. If p is not prime, the process returns to step 204 and selects another integer k.

If p is prime, the process proceeds to step 210, and randomly selects an element h of F(p)*.

At step 212, a value $g=h^{(p-1)/q}$ in F(p) is obtained.

At step 214, a test is made to determine whether g≠1 in F(p). If the test fails, that is, g=1, the process returns to step 210 and selects another element of F(p)* as the value h.

If g≠1 in F(p), then a generator g for a small subgroup G of the multiplicative group of a prime field F(p) of large characteristic has been located. The generator g is of the order q, since g≠1 in F(p), $g^q=1$. Instead of the procedure depicted in steps 202–214, other procedures may be used to locate a generator g.

After locating a generator g, the process proceeds to step 216, and randomly selects a value a in the range $2 \leqq a \leqq q-1$. It will be appreciated that this range is smaller than the corresponding range in step 112 of FIG. 1A for the ElGamal scheme.

At step 218, the process finds $y=g^a$ in F(p). Finding the value a, given y and g, is a discrete logarithm (DL) problem, as discussed above.

The result of system setup is a public key (p,g,y,q) and a private key (a). The public key has length 3L+B bits. The private key has length B bits.

To find the private key (a) from the public key (p,g,y,q), it is necessary to solve either a DL problem in the field F(p) or a DL problem in the subgroup G of F(p)* generated by g.

The DL problem in the field F(p), having cardinality p, where p is a prime number having length L bits and q is a prime factor of p−1 having length of at least B bits, is currently believed to be infeasible.

The DL problem in the subgroup G of F(p)*, the subgroup G having order q, with q having length of at least B bits, is currently believed to be infeasible.

Schnorr Signature Generation

Figure 2B:
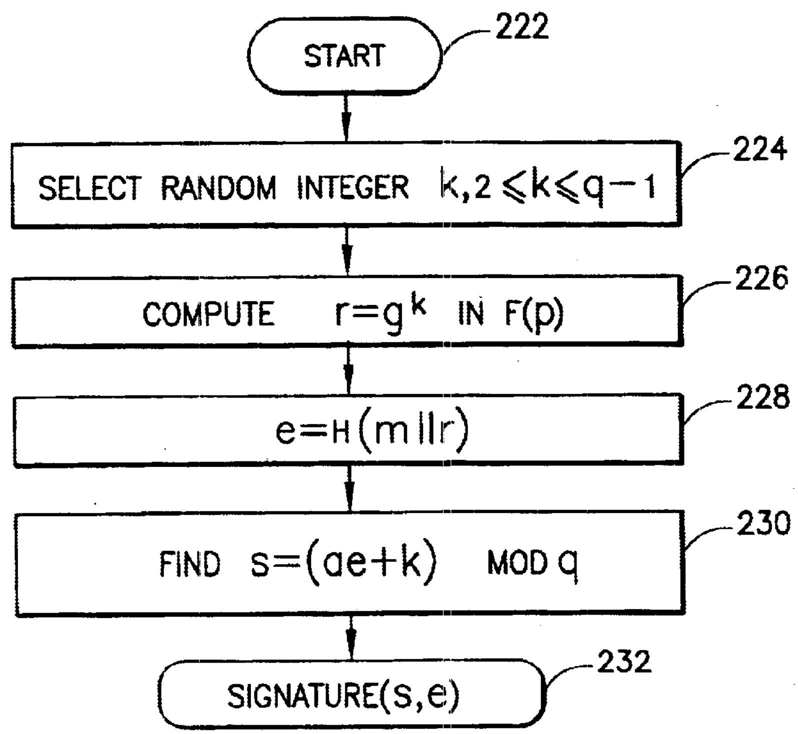
FIG. 2B is a flowchart illustrating signature generation according to the Schnorr scheme.

FIG. 2B shows the steps performed by a party generating an electronic signature for a particular document according to the Schnorr scheme. In practice, the generating party is a processor of a general purpose digital computer. In some embodiments, the processor may be in a special purpose digital computer, such as a smart card.

At step 224, an integer k is randomly selected in the range $2 \leqq k \leqq q-1$. The corresponding step for the ElGamal scheme, step 122 of FIG. 1B, uses an upper limit of p−2 for the range of k. Since p>>q, a public key cryptosystem according to Schnorr will have smaller elements than a public key cryptosystem according to ElGamal. For example, when q has a length of 160 bits, p has a length of about 1024 bits.

At step 226, the value $r=g^k$ in F(p) is obtained, with r in the range $1 \leqq r \leqq p-1$. Since p>>q, the computation in step 226 is much faster than the corresponding computation in step 126 of FIG. 1B, that is, a public key cryptosystem according to ElGamal.

At step 228, the value e=H(m||r), that is, the hash function applied to the concatenation of the message m and the signature element r, is obtained. The cryptographic hash function H(.) is assumed to yield values of length at most B bits.

At step 230, the value s=(ae+k) mod q is computed, with s in the range $0 \leqq s \leqq q-1$.

The result of signature generation is a digital signature (s,e). The signature has a length of 2B bits.

Schnorr Signature Verification

Figure 2C:
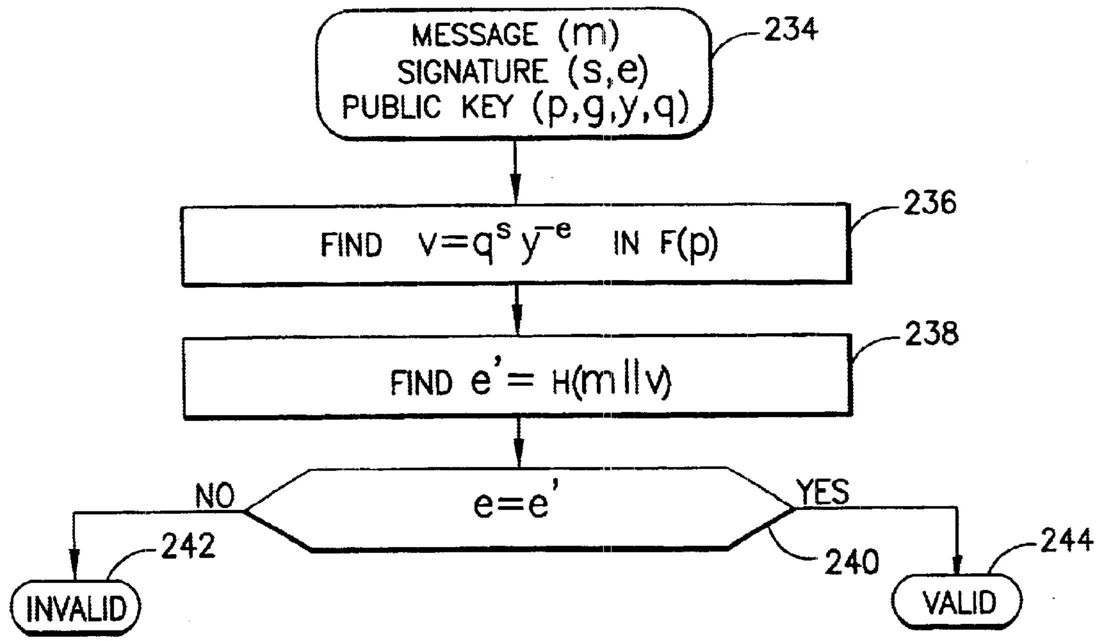
FIG. 2C is a flowchart illustrating signature verification according to the Schnorr scheme.

FIG. 2C shows the steps performed by a party receiving a document which has been electronically signed according to the Schnorr scheme to determine whether the signature is valid.

The receiving party is assumed to have a message (m) and a corresponding digital signature (s,e) which was obtained as in FIG. 2B, and a public key (p,g,y,q) which was obtained as in FIG. 2A and which was used to obtain the signature (s,e). In practice, the receiving party is a processor of a general purpose digital computer. In some embodiments, the processor may be in a special purpose digital computer, such as a smart card.

At step 236, the value $v=g^s y^{-e}$ in F(p) is computed. Next, at step 238, the value e'=H(m||v) is computed.

At step 240, a test is made to determine whether e=e'. If not, at step 242, the signature is determined to be invalid. If so, at step 244, the signature is determined to be valid.

DSA Signature Generation

Figure 2D:
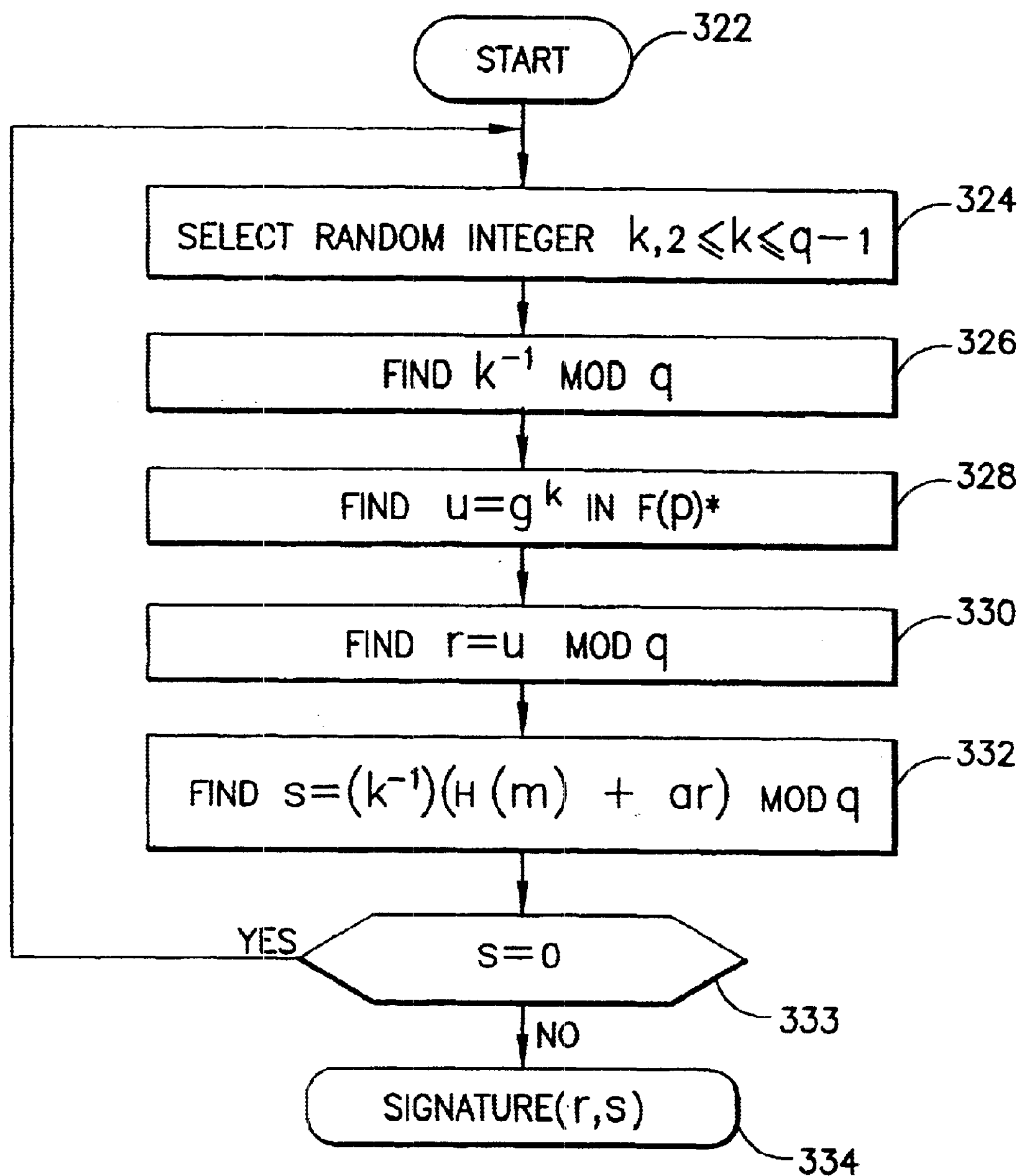
FIG. 2D is a flowchart illustrating signature generation according to the DSA scheme.

FIG. 2D shows the steps performed by a party generating an electronic signature for a particular document according to the DSA scheme. In practice, the generating party is a processor of a general purpose digital computer. In some embodiments, the processor may be in a special purpose digital computer, such as a smart card.

At step 324, an integer k is randomly selected in the range $2 \leqq k \leqq q-1$.

At step 326, $k^{-1}$ mod q is found, that is, the value which satisfies $(k)(k^{-1})=1$ mod q.

At step 328, the value $u=g^k$ in the subgroup G, generated by g, of F(p)* is obtained, with u in the range $1 \leqq u \leqq p-1$.

At step 330, the value r=u mod q is computed.

At step 332, the value $s=k^{-1}(H(m)+ar)$ mod q is computed, with s in the range $0 \leqq s \leqq q-1$.

At step 333, a test is made to determine whether s=0. If so, then processing returns to step 324 to select a new value for the integer k. If s≠0, then the procedure proceeds to step 334 and is complete.

The result of signature generation is a digital signature (r,s). The signature has a length of 2B bits.

DSA Signature Verification

Figure 2E:
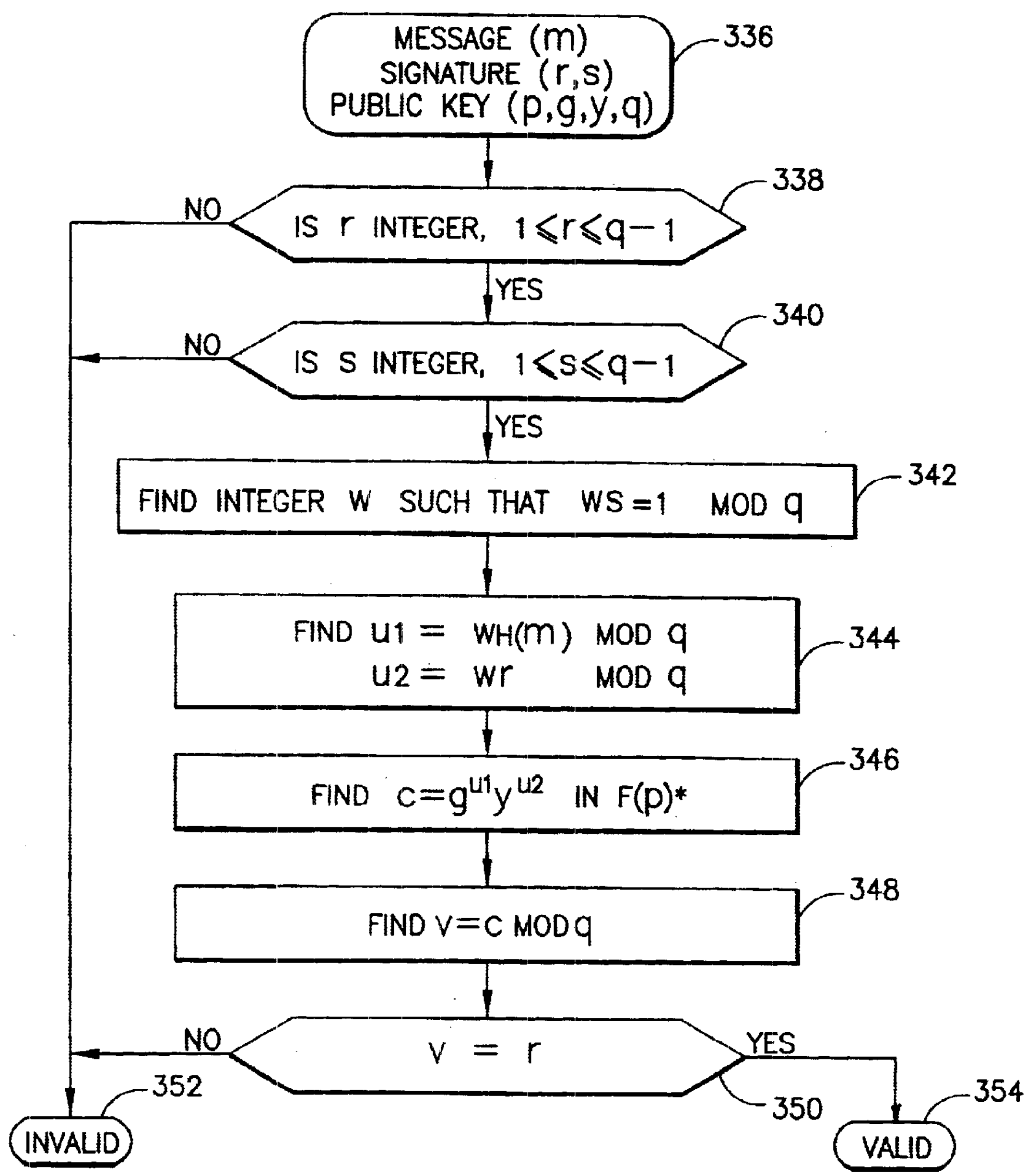
FIG. 2E is a flowchart illustrating signature verification according to the DSA scheme.

FIG. 2E shows the steps performed by a party receiving a document which has been electronically signed according to the DSA scheme to determine whether the signature is valid.

The receiving party is assumed to have a message (m) and a corresponding digital signature (r,s) which was obtained as in FIG. 2D, and a public key (p,g,y,q) which was obtained as in FIG. 2A and which was used to generate the signature (r,s). In practice, the receiving party is a processor of a general purpose digital computer. In some embodiments, the processor may be in a special purpose digital computer, such as a smart card.

At step 238, the process determines whether the value r is an integer in the range $1 \leqq r \leqq q-1$. If not, at step 352, the signature is determined to be invalid.

If r is in the appropriate range, then at step 340, the process determines whether the value s is an integer in the range $1 \leqq s \leqq q-1$. If not, at step 352, the signature is determined to be invalid.

If s is in the appropriate range, then at step 342, an integer w which is the inverse of s, that is, ws=1 mod q, is obtained.

At step 344, the value u1=wH(m) mod q is computed, and the value u2=wr mod q is computed. At step 346, the value $c=g^{u1}y^{u2}$ in the subgroup G, generated by g, of F(p)* is obtained, with c in the range $1 \leqq c \leqq p-1$.

At step 348, the value v=c mod q is computed.

At step 350, a test is made to determine whether v=r. If not, at step 352, the signature is determined to be invalid. If so, at step 354, the signature is determined to be valid.

ECDSA System Setup

Figure 3A:
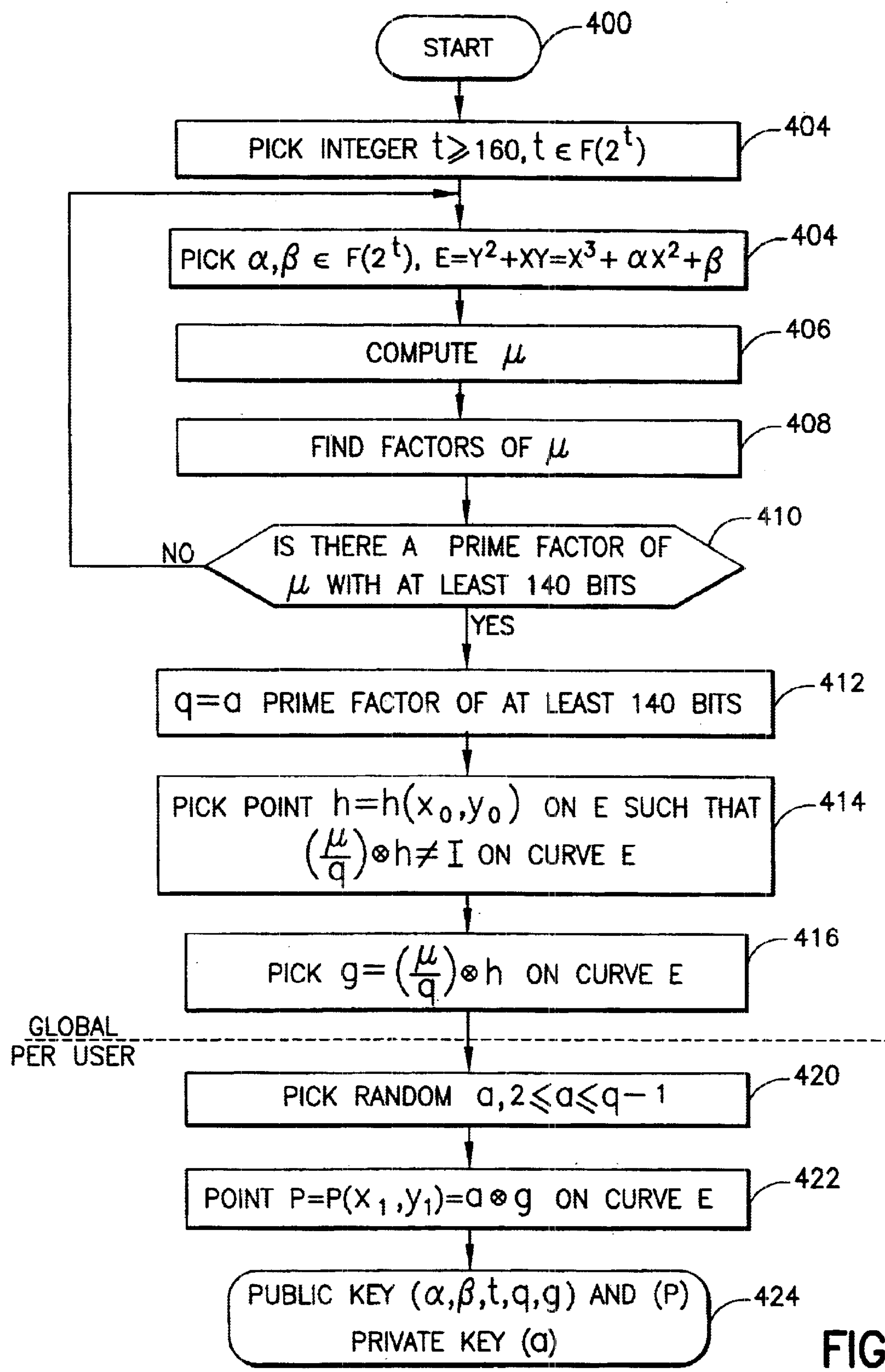
FIG. 3A is a flowchart illustrating system setup according to the ECDSA scheme.

FIG. 3A shows the steps which must be performed during setup of an electronic signature system according to the ECDSA scheme. Steps 402–416 are performed globally, that is, for all users, and thus need be performed only once. Steps 420–424 are performed by each user.

The ECDSA system is directed to using a large extension of the field of two elements. With an optimal normal basis representation of the extension field (as defined in R. C. Mullin et al., "Optimal normal bases in GF ($p^n$)", Discrete Applied Mathematics, vol. 22, no. 2, pp. 149–161 (February 1988), which is incorporated herein by reference), multiplication is very fast and squaring is performed by circular shifting, so exponentiation is efficiently performed. However, a hardware implementation is required. Further, fields of characteristic two are thought to be more vulnerable to attacks than other fields of comparable sizes.

At step 402, an integer $t \geqq 160$ is selected with $t \in F(2^t)$, that is, t in the range $160 \leqq t \leqq 250$. The ECDSA scheme uses a system-wide finite field $F(2^t)$ of $2^t$ elements, where it is assumed that t=B.

At step 404, the coefficients $\alpha, \beta \in F(2^t)$ for the curve $E=Y^2+XY=X^3+\alpha X^2+\beta$ are selected. The ECDSA scheme assumes use of an optimal normal basis to represent the elements of $F(2^t)$ over a subfield of $F(2^t)$. Using the curve E means using this optimal normal basis.

At step 406, $\mu$ is computed. The value $\mu$ is one plus the number of different pairs (x, y) satisfying E, where x, $y \in F(2^t)$. That is, the group of E has order $\mu$. Another way of saying this is that $\mu$ is the cardinality of the curve group.

At step 408, the factors of $\mu$ are obtained.

At step 410, a test is made to determine whether there is a prime factor of $\mu$ having at least 140 bits. If not, then processing returns to step 404 and picks a new elliptic curve E.

If there is a prime factor of $\mu$ having at least 140 bits, then at step 412, q is set equal to this prime factor. It will be appreciated that q is a prime divisor of the order of the group of the elliptic curve E. Preferably, q has length of at least 140 bits, At step 414, a point h on the curve E, that is, $h(x_0, y_0)$, is selected such that $(\mu/q) \otimes h \neq I$, where I is the identity element on the curve E. The symbol $\otimes$ indicates scalar multiplication on the curve E. The group of E has order $\mu$, and q divides $\mu$.

At step 416 the point g on the curve E is chosen as $g=(\mu/q) \otimes h$ on the curve E. The point g on the curve E is of order q. The point g on the curve E generates the group G, which is a subgroup of the curve group.

The result of steps 402–416 is a global public key ($\alpha$, $\beta$, t, q, g). The length of the global public key is not so important, as it is known to all, and does not vary by individual encrypting or decrypting party.

For each user, at step 420, a value a in the range $2 \leqq a \leqq q-1$ is randomly selected.

At step 422, a point P on the curve E, that is, $P(x_1, y_1)$, is selected such that $P=a \otimes g$ on the curve E.

The result of steps 420–422 is a user specific public key (P) of length B+1 bits, and a private key (a) of length at most B bits. Although keys are small in the ECDSA scheme, this scheme is computationally expensive.

To find the private key (a) from the user specific public key (P), it is necessary to solve either a DL problem in the group associated with the curve E or a DL problem in the subgroup G of the group associated with the curve E.

The DL problem in a curve group over a field of cardinality $2^t$, where $t \leqq 160$, is currently believed to be infeasible by supporters of elliptic curve cryptosystems.

The DL problem in the subgroup G of order q in the curve group, where q has at least 140 bits, is currently believed to be infeasible by supporters of elliptic curve cryptosystems.

ECDSA Signature Generation

Figure 3B:
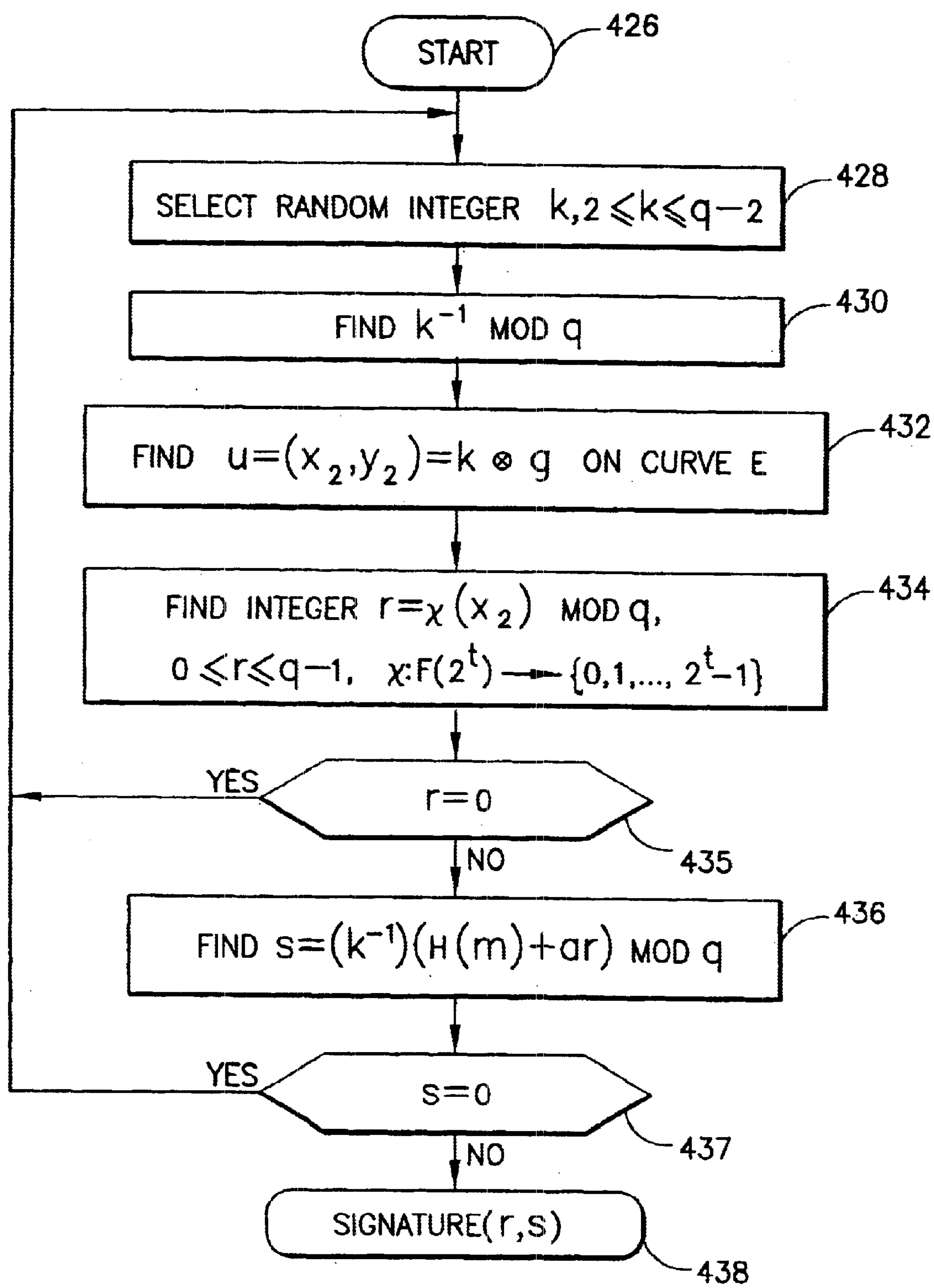
FIG. 3B is a flowchart illustrating signature generation according to the ECDSA scheme.

FIG. 3B shows the steps performed by a party generating an electronic signature for a particular document according to the ECDSA scheme. In practice, the generating party is a processor of a general purpose digital computer. In some embodiments, the processor may be in a special purpose digital computer, such as a smart card.

At step 428, an integer k is randomly selected in the range $2 \leqq k \leqq q-2$.

At step 430, $k^{-1}$ mod q is found, that is, the value which satisfies $(k)(k^{-1})=1$ mod q.

At step 432, the point u on the curve E, that is, $u(x_2, y_2)$, is found such that $u=k \otimes g$ on the curve E.

At step 434, an integer $r=X(x_2)$ mod q is obtained, with r in the range $0 \leqq r \leqq q-1$. The function $\chi(\cdot)$ is a fixed and efficiently computable bijection between the finite field $F(2^t)$ and the set $\{0, 1, \ldots, 2^t-1\}$ of integers. This bijection is known to all users of the system.

At step 435 a test is made to determine whether r=0. If so, then processing returns to step 428 to select a new value for the integer k. If $r \neq 0$, then the procedure proceeds to step 436.

At step 436, the value $s=k^{-1}(H(m)+ar)$ mod q is computed, with s in the range $0 \leqq s \leqq q-1$.

At step 437, a test is made to determine whether s=0. If so, then processing returns to step 428 to select a new value for the integer k. If $s \neq 0$, then the procedure proceeds to step 438 and is complete.

The result of signature generation is a digital signature (r,s). The signature has a length of at most 2B bits.

ECDSA Signature Verification

Figure 3C:
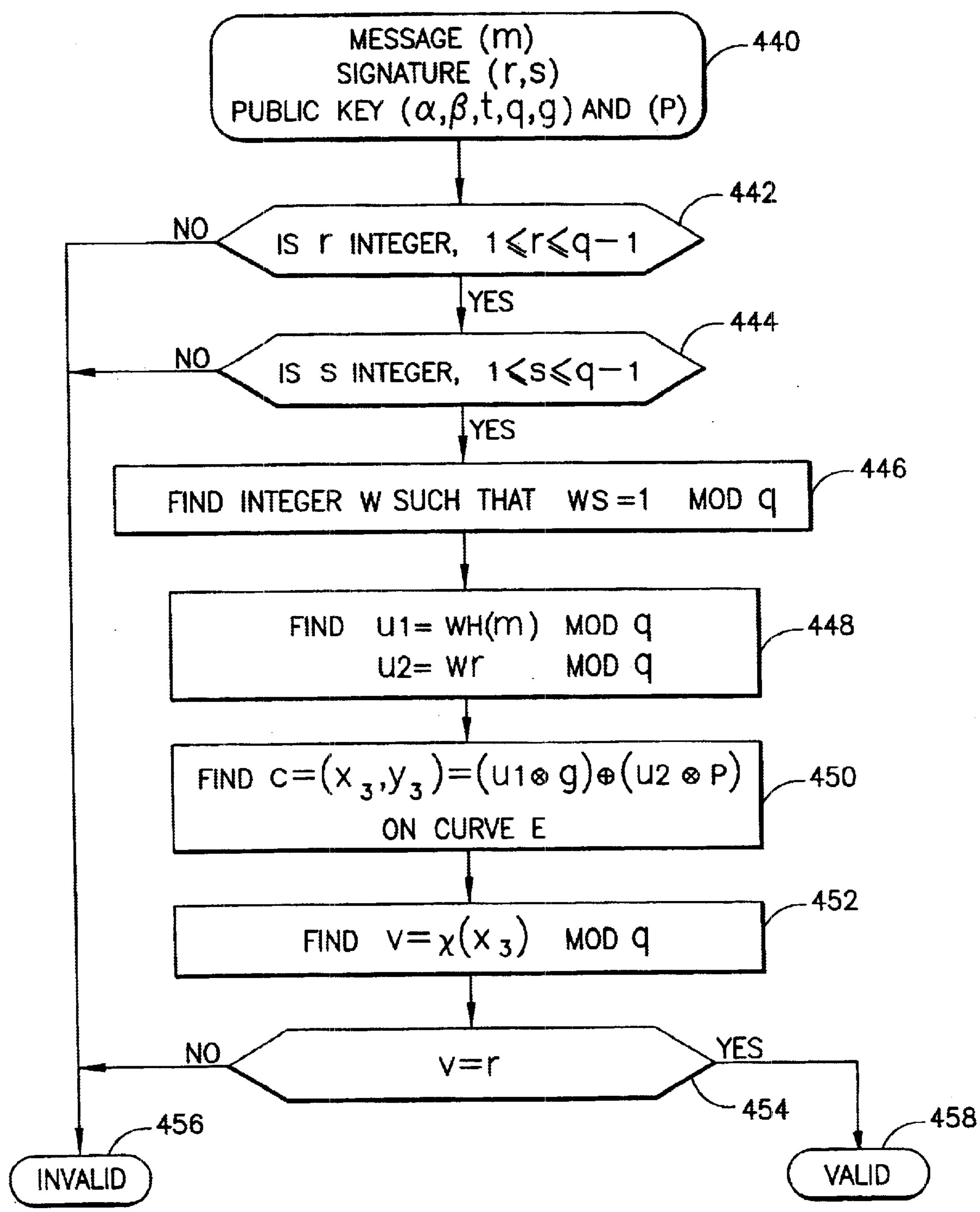
FIG. 3C is a flowchart illustrating signature verification according to the ECDSA scheme.

FIG. 3C shows the steps performed by a party receiving a document which has been electronically signed according to the ECDSA scheme to determine whether the signature is valid.

The receiving party is assumed to have a message (m) and a corresponding digital signature (r,s) which was obtained as in FIG. 3B, and a public key comprising ($\alpha$, $\beta$, t, q, g) and (P) which was obtained as in FIG. 3A and which was used to obtain the signature (r,s). In practice, the receiving party is a processor of a general purpose digital computer. In some embodiments, the processor may be in a special purpose digital computer, such as a smart card.

At step 442, the process determines whether the value r is an integer in the range $1 \leqq r \leqq q-1$. If not, at step 456, the signature is determined to be invalid.

If r is in the appropriate range, then at step 444, the process determines whether the value s is an integer in the range $1 \leqq s \leqq q-1$. If not, at step 456, the signature is determined to be invalid.

If s is in the appropriate range, then at step 446, an integer w which is the inverse of s, that is, ws=1 mod q, is obtained.

At step 448, the value u1=wH(m) mod q is computed, and the value u2=wr mod q is computed. At step 450, the point c on the curve E, that is $C(x_3, y_3)=(u1 \otimes g) \oplus (u2 \otimes P)$ on the curve E is obtained. The symbol $\oplus$ indicates addition on the curve E.

At step 452, the value $v=\chi(x_3)$ mod q is computed, with v in the range $0 \leqq v \leqq q-1$.

At step 454, a test is made to determine whether v=r. If not, at step 456, the signature is determined to be invalid. If so, at step 458, the signature is determined to be valid.

Cyclotomic System Setup

Figures 1, 4A:
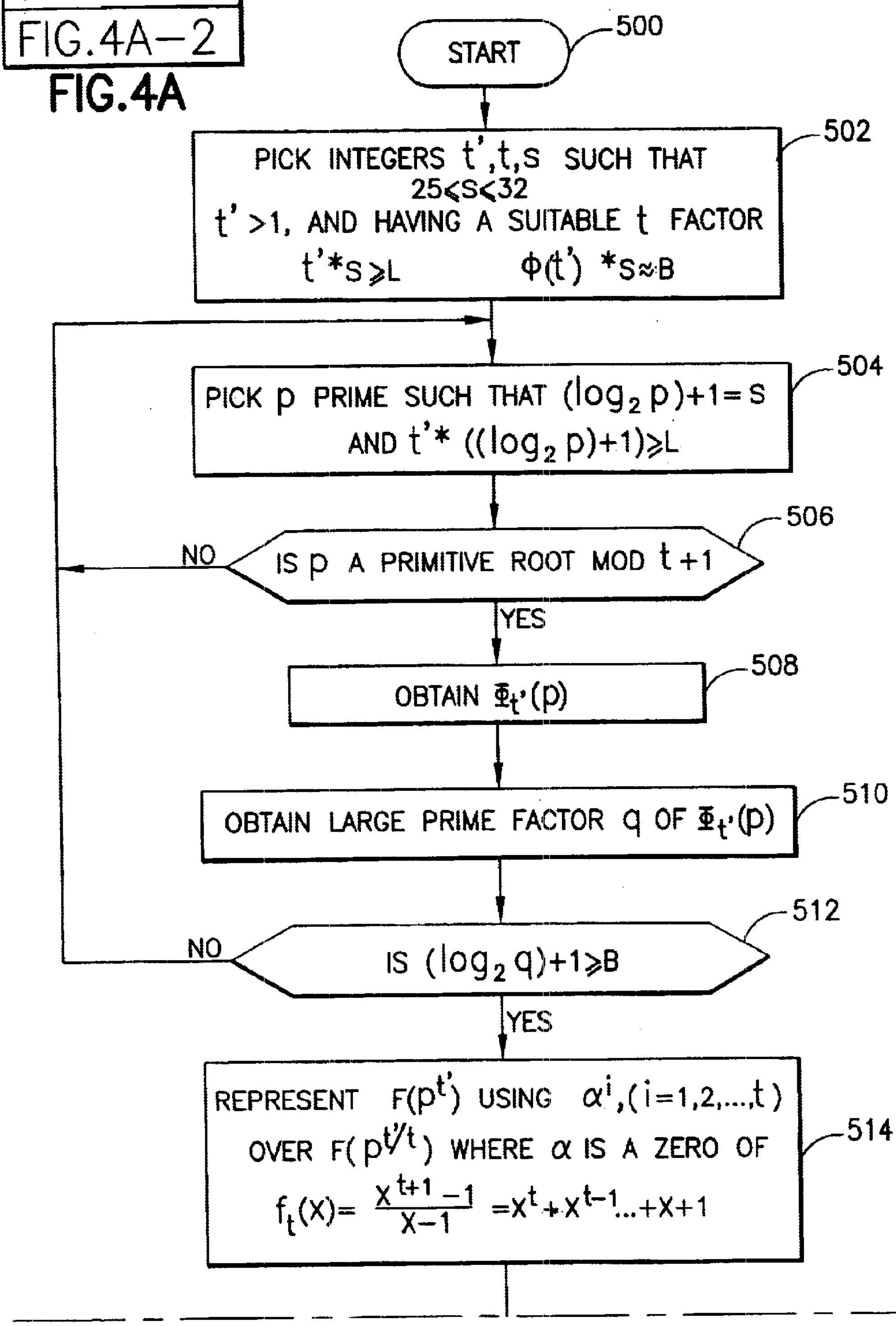
FIG. 4A is a flowchart illustrating system setup according to the present invention.
Figures 2, 4A:
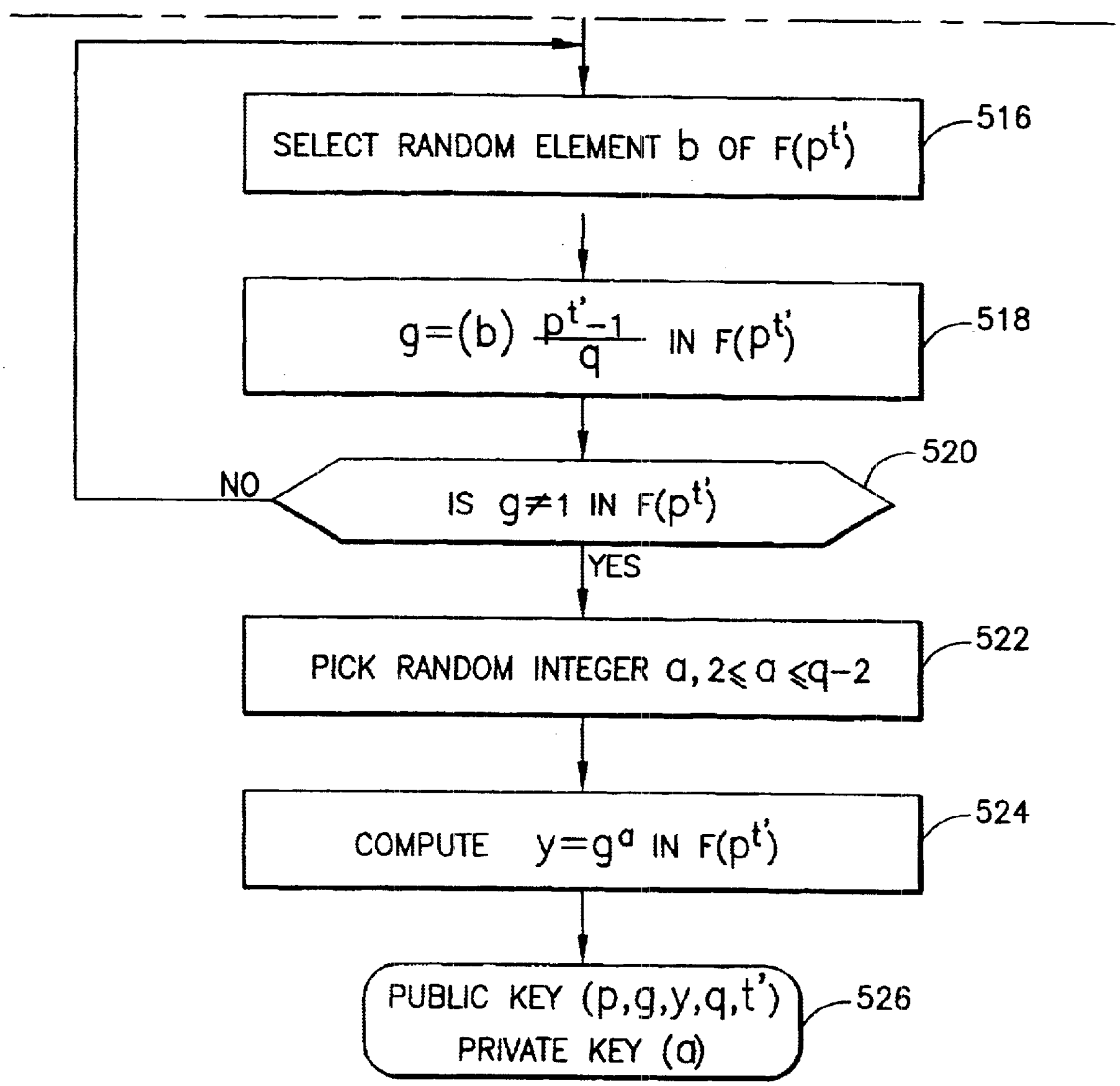

FIG. 4A shows the steps which must be performed for each user during setup of an electronic signature system according to the present cyclotomic scheme. A purpose of the processing depicted in FIG. 4A is to find a generator g of a subgroup of the multiplicative group $F(p^{t'})^*$ of the finite field $F(p^{t'})$ such that g satisfies both a desired Discrete Logarithm Security Level, which determines the choice of L, a desired Subgroup Discrete Logarithm Security Level, which determines the choice of B, and such that there is an optimal normal basis for $F(p^{t'})$ over F(p).

The cyclotomic scheme uses subgroups, as does the Schnorr scheme, and also uses optimal normal bases, as does the ECDSA scheme. Use of subgroups results in short signatures and short exponents. Use of optimal normal bases results in efficient exponentiation. Consequently, a software implementation of the cyclotomic scheme is substantially faster than a software implementation of the Schnorr scheme.

Let R be a radix size. The value of R is machine dependent, and is chosen so that it is small enough for computation mod p to proceed rapidly, yet large enough so that exponentiation can proceed rapidly. Larger values of p result in smaller values of t', and since $(t')^2$ operations per multiplication in the field $F(p^{t'})$ are required, small values of t' are desirable. Also, larger values of p expand the choices of cryptosystems that can be constructed. For presently available 32-bit architecture general purpose computers, R=32 is a suitable value. For newer 64-bit architectures, R=64 is a suitable value. In other embodiments, other values of R are suitable, and are not necessarily equal to the word length (in bits) of a computer which practices the present inventive technique.

At step 502, a control integer t' and integers t, s are chosen such that:

(i) s is at most R, and s is not much smaller than R, such as, $0.8R \leqq s \leqq R$. Larger s leads to higher efficiency. The integer s is used to restrict the size of a prime number p (see below). For example, $25 \leqq s \leqq 32$;

(ii) t'>1, preferably such that t' has a factor t>1 for which t+1 is a prime number and t'/t is small, e.g., t'/t<5. Use of the control integer t' allows a wider variety of choices for the number of bits in the prime number p as relates to the desired Discrete Logarithm Security Level which is reflected in L. More particularly, the value of the prime number p depends on the value of R, which is machine dependent, as explained above. The control integer t' is approximately equal to L divided by the number of bits in the prime number p. As noted, t+1 must be a prime number. Ideally, t'=t. However, a value for t' can be used such that t'+1 is not a prime number, as long as t' has a factor t>1 for which t+1 is a prime number and t'/t is small. That is, use of t', in addition to t, provides more flexibility.

(iii) t'*s is close to L; and (iv) $\phi(t')$*s is at least B but not too much bigger than B so that the prime factor q (see step 510) is sufficiently easy to find, that is, $\phi(t')*s \approx B$. The function $\phi(t)$ is Euler's phi function or totient, namely, the number of positive integers $\leqq t$ that are co-prime to t.

At step 504, an odd prime number p is selected such that $(\log_2 p)+1=s$, and $t'*((\log_2 p)+1) \geqq L$.

At step 506, a test is made to determine whether p is a primitive root mod t+1 of $F(t+1)^*$, that is, whether p mod t+1 generates $F(t+1)^*$. Specifically, this test can be performed by computing $p^i$ mod t+1 for each integer i, $1 \leqq i \leqq t$, and checking that different numbers are obtained. If not, then processing returns to step 504 to select another prime number p.

If p is a primitive root mod t+1, then at step 508, the t'-th cyclotomic polynomial evaluated at p, $\Phi_{t'}(p)$, is obtained.

The irreducible factorization of $X^t-1$ in Z[X] is given by $$X^t-1=\pi_{d|t}\Phi_d(X)$$

where $\Phi_d(X)$ is the d-th cyclotomic polynomial, as explained in H. Riesel, *Prime Numbers and Computer Methods for Factorization,* Birkhauser, 1985, which is hereby incorporated by reference. The factor $\Phi_t(X)$ is the only irreducible factor of $X^t-1$ that does not appear in the factorization of $X^s-1$ for divisors s of t, with $s \leqq t$.

One way of obtaining $\Phi_t(X)$ is by using the factorization identity set forth above. Another way of obtaining $\Phi_t(X)$ is by looking up the coefficients $c_i$, $0 \leqq i \leqq t-1$, of $\Phi_t(X)=c_{t-1}X^{t-1}+c_{t-2}X^{t-2}+ \ldots +c_1X+c_0$ in a table of cyclotomic polynomial coefficients, such as the table in FIG. 4D. Using the table in FIG. 4D, it will be seen that, for example, $\Phi_{18}(X)=X^6-X^3+1$, and that $\Phi_{54}(X)=X^{18}-X^{19}+1$.

At step 510, a large prime factor q of $\Phi_{t'}(p)$ is obtained. Because the subgroup used in the cyclotomic scheme, and constructed as described below, has order q, and q is a divisor of $\Phi_{t'}(p)$, the corresponding DL computation is difficult for an unauthorized person.

At step 512, a test is made to determine whether $(\log_2 q)+1 \geqq B$. This condition ensures that it is possible to construct a large enough subgroup of the multiplicative group $F(p^{t'})^*$ of $F(p^{t'})$ that cannot be embedded in a true subfield of $F(^{t'})$. In other words, to solve the DL problem, that is, to find a value a, given y and g, it is necessary to solve a DL problem in the entire field $F(p^{t'})$ or in the subgroup generated by g; but, the DL problem cannot be reduced to a DL problem in a true subfield of $F(p^{t'})$, so that computational difficulty is not reduced for an unauthorized party.

Also, combining the condition of step 502 that $\Phi(t')*s \approx B$ with the condition of step 512 that $(\log_2 q)+1 \geqq B$, results in a situation in which $(\log_2 q)+1 \approx B$.

It is an important aspect of the present invention that q is a divisor of $\Phi_{t'}(p)$ and that $(\log_2 q)+1 \geqq B$. If $(\log_2 q)+1<B$, processing returns to step 504 to select another prime number p.

If $(\log_2 q)+1 \geqq B$, then at step 514, an optimal normal basis $\alpha^i$, $i=\{1, 2, \ldots t\}$, over $F(p^{t'/t})$ is obtained, with each $\alpha^i$ being a zero of $f_t(X)=(X^{t+1}-1)/(X-1)=X^t+X^{t-1}+ \ldots +X+1$.

Case 1: If t exists and t'=t, then $F(p^{t'/t})$ is represented by the integers mod p, and p-th powering in $F(p^{t'})$ does not require any operations in $F(p^{t'})$, rather p-th powering is simply a permutation of the basis elements $\alpha^i$, and thus is computationally inexpensive. Thus, multiplication and squaring in $F(p^{t'})$ can be carried out very efficiently.

Case 2: If t exists and t'≠t, then the elements of $F(p^{t'/t})$ are represented using a convenient basis over F(p). In this case, p-th powering requires only a very small number of operations in $F(p^{t'})$, and multiplication and squaring in $F(p^{t'})$ can be carried out efficiently. If t'/t is small, then the difference in efficiency of arithmetic in $F(p^{t'})$ in cryptosystem implementations is negligible as between case 1 and case 2.

Case 3: If t does not exist, then $F(p^{t'})$ is represented in any convenient way, preferably using a sparse minimal polynomial to make multiplication and squaring in $F(p^{t'})$ fast.

At step 516, an element b of $F(p^{t'})$ is randomly selected.

At step 518, a value $$g = b^{\left(\frac{p^{t'}-1}{q}\right)} \text{ in } F\left(p^{t'}\right)$$

is obtained. Computing g is very efficient since an optimal normal basis is used to represent $F(p^{t'})$.

At step 520, a test is made to determine whether g≠1 in $F(p^{t'})$. If not, that is, g=1, then processing returns to step 516 to select another element b.

If g≠1, then g is the generator of the subgroup G of the multiplicative group $F(p^{t'})^*$ of the finite field $F(p^{t'})$. The subgroup G is of order q. At step 522, a value a is randomly selected in the range 2≦a≦q−2.

At step 524, a value $y=g^a$ in $F(p^{t'})$ is computed. Finding a value a, given y and g, is a DL problem.

The result of system setup is a public key (p,g,y,q,t') and a private key (a). The parameters g and y are represented using optimal normal bases. The public key has length 2L +B+64 bits. The private key has length B bits.

Security is assured as in the Schnorr scheme, and by the fact that the subgroup G has order q, where q is a prime factor having a length of at least B bits of the t'-th cyclotomic polynomial evaluated at p, so that G cannot be effectively embedded in a proper subfield of $F(p^{t'})$.

As explained above, in the cyclotomic scheme, p-th powering is computationally easy, since it involves only rearranging the elements of the optimal normal basis. This is an important computational advantage of the cyclotomic scheme.

Computation in the cyclotomic scheme involves short rows of length ($\log_2$ p) bits, which is suitable for a software implementation, whereas the ECDSA scheme involves long rows of length 1 bit, which is more suitable to a hardware implementation. That is, the cyclotomic ground field F(p) has elements of length ($\log_2$ p) bits, whereas the ECDSA ground field F(2) has elements of length 1 bit.

Cyclotomic Signature Generation

Figure 4B:
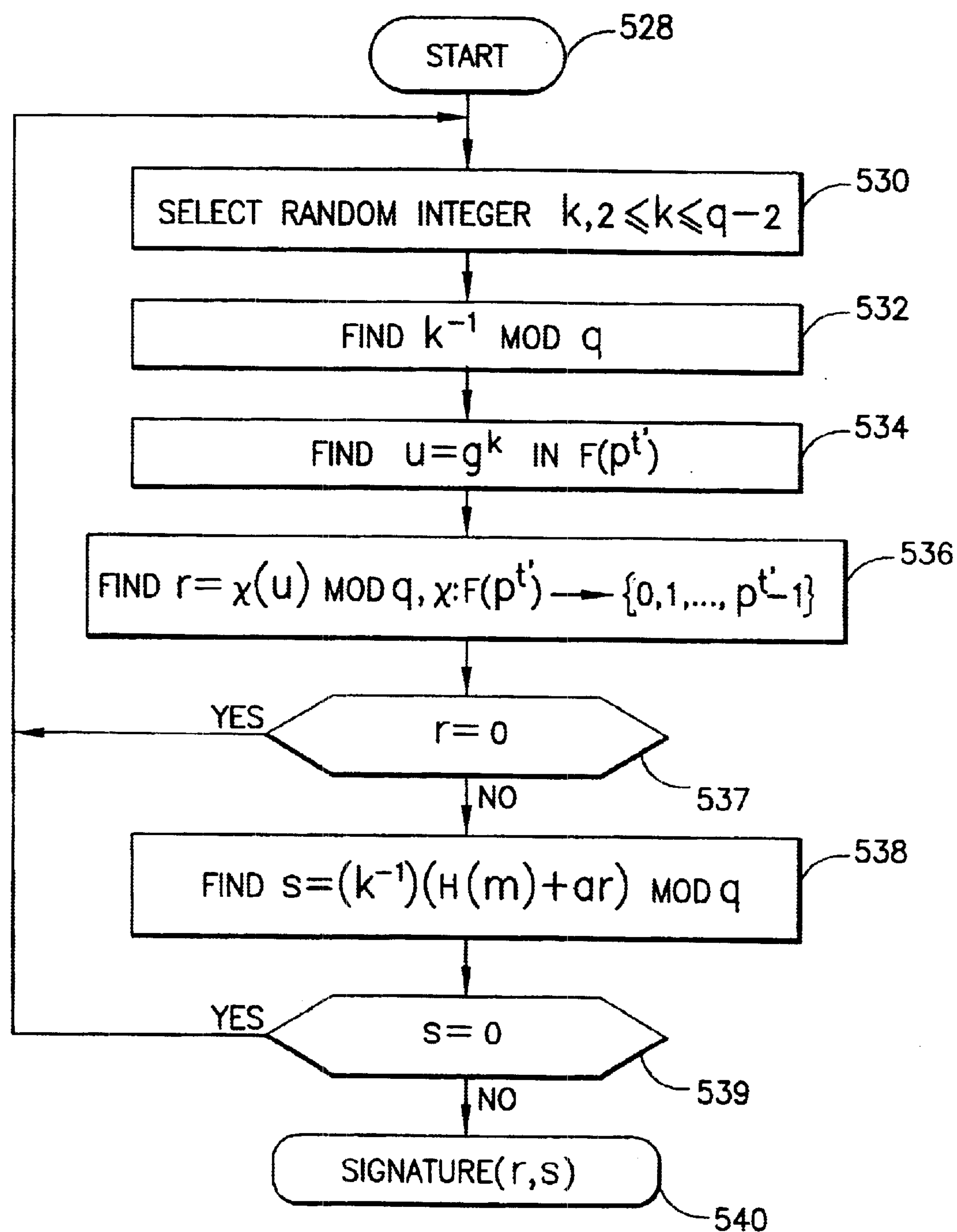
FIG. 4B is a flowchart illustrating signature generation according to the present invention.

FIG. 4B shows the steps performed by a party generating an electronic signature for a particular document according to the cyclotomic scheme. In practice, the generating party is a processor of a general purpose digital computer. In some embodiments, the processor may be in a special purpose digital computer, such as a smart card.

At step 530, an integer k is randomly selected in the range 2≦k≦q−2.

At step 532, $k^{-1}$ mod q is found, that is, the value which satisfies $(k)(k^{-1})=1$ mod q.

At step 534, a value $u=g^k$ in $F(p^{t'})$ is found.

At step 536, an integer r=χ(u) mod q is obtained, with r in the range 0≦r≦q−1. The function χ(.) is a fixed and efficiently computable bijection between the finite field $F(p^{t'})$ and the set $\{0, 1, \ldots, p^{t'}-1\}$ of integers. This bijection is known to all users of the system. This is a different bijection than used in step 434 of FIG. 3B for the ECDSA scheme.

At step 537, a test is made to determine whether r=0. If so, then processing returns to step 530 to select a new value for the integer k. If r≠0, then the procedure proceeds to step 538.

At step 538, the value $s=k^{-1}(H(m)+ar)$ mod q is computed, with s in the range 0≦s≦q−1.

At step 539, a test is made to determine whether s=0. If so, then processing returns to step 530 to select a new value for the integer k. If s≠0, then the procedure proceeds to step 540 and is complete.

The result of signature generation is a digital signature (r,s). The signature has a length of 2B bits.

Cyclotomic Signature Verification

Figure 4C:
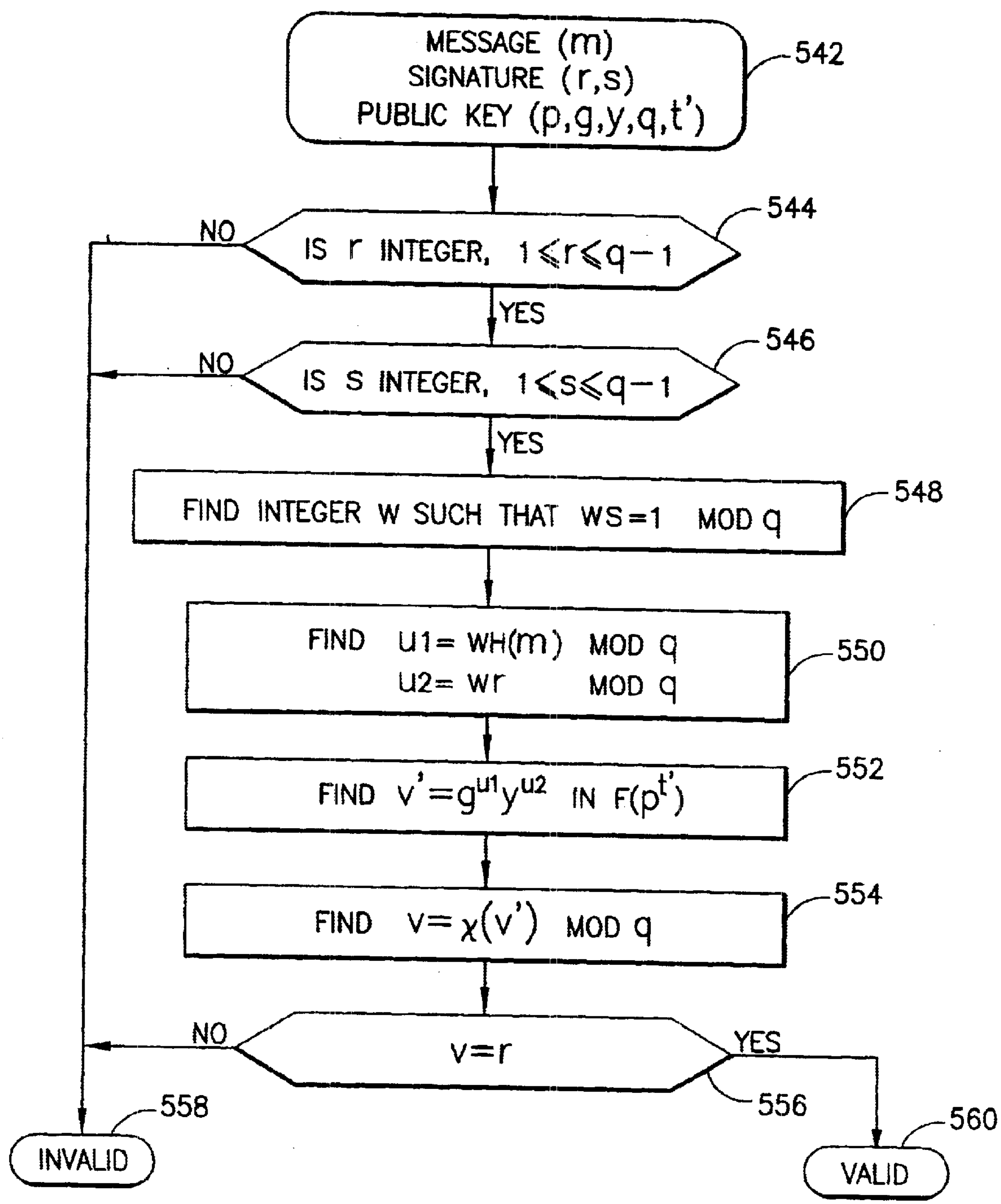
FIG. 4C is a flowchart illustrating signature verification according to the present invention.

FIG. 4C shows the steps performed by a party receiving a document which has been electronically signed according to the cyclotomic scheme to determine whether the signature is valid.

The receiving party is assumed to have a message (m) and a corresponding digital signature (r,s) which was obtained as in FIG. 4B, and a public key (p, g, y, q, t') which was obtained as in FIG. 4A and which was used to generate the signature (r,s). In practice, the receiving party is a processor of a general purpose digital computer. In some embodiments, the processor may be in a special purpose digital computer, such as a smart card.

At step 544, the process determines whether the value r is an integer in the range 1≦r≦q−1. If not, at step 558, the signature is determined to be invalid.

If r is in the appropriate range, then at step 546, the process determines whether the value s is an integer in the range 1≦s≦q−1. If not, at step 558, the signature is determined to be invalid.

If s is in the appropriate range, then at step 548, an integer w which is the inverse of s, that is, ws=1 mod q, is obtained.

At step 550, the value u1=wH(m) mod q is computed, and the value u2=wr mod q is computed. At step 552, the value $v'=g^{u1}y^{u2}$ in $F(p^{t'})$ is computed. At step 554, the value v=χ(v') mod q is found.

At step 556, a test is made to determine whether v=r. If not, at step 558, the signature is determined to be invalid. If so, at step 560, the signature is determined to be valid.

Cyclotomic Alternatives

Applicability of the cyclotomic scheme is not limited to an electronic signature system, as described above. The cyclotomic scheme can be used in any public key cryptosystem that relies for its security on the difficulty of the DL problem, for example, a Diffie-Hellman key exchange scheme, an ElGamal public key encryption scheme, or digital signature generation and verification schemes as in the ElGamal, Schnorr and DSA schemes. Proposed Key exchange schemes may be used in conjunction with the Data Encryption Standard (DES), as set forth in FIPS 46-2, 1993, available from the National Technical Information Service, Springfield, Va.; and proposed encryption schemes include the ElGamal Scheme, as set forth in T. ElGamal, "A public key cryptosystem and a signature scheme based on discrete logarithms", *IEEE Trans. Info. Tech.,* 31, 469–472, 1985. Application of the cyclotomic scheme to these proposed schemes is discussed below.

The users practicing the techniques described below are assumed to have a general purpose digital computer programmed to perform these techniques. Alternatively, these techniques may be performed by a special purpose printed circuit board used in conjunction with a general purpose computer, or by a "smart card", that is, a credit card sized portable device including a microprocessor.

FIG. 4E is a flowchart illustrating a DES system setup according to the present invention. In particular, FIG. 4E shows a Diffie-Hellman key exchange scheme modified by application of a cyclotomic scheme.

At step 600, all users are assumed to possess a globally shared public key (p, g, q, t'), obtained according to steps 500–520 of FIG. 4A. In contrast, in the ElGamal, Schnorr, DSA and cyclotomic digital signature schemes discussed above, each user is associated with a public key and a private key; that is, there is no globally shared public key.

When parties Δ and θ wish to communicate, they must initially exchange information to establish a shared key. As illustrated in FIG. 4E, at step 602, party Δ randomly selects a value $a_\Delta$ in the range $2 \leqq a_\Delta \leqq q-2$, and at step 604, finds $$y_\Delta = g^{a_\Delta} \text{ in } F(p^{t'})$$

At step 606, party Δ sends $y_\Delta$ to party θ. At step 608, party Δ receives $y_\theta$ from party θ. At step 610, party Δ computes $$y_0 = \chi(y_\theta^{a_\Delta}) \text{ in } F(p^{t'})$$

The function χ(.) is the fixed and efficiently computable bijection between the finite field $F(p^{t'})$ and the set $\{0, 1, \ldots, p^{t'}-1\}$ of integers which was used in step 536 of FIG. 4B. While it is not absolutely necessary to apply the function χ(.), it is preferred, so as to convert a element represented in an optimal normal basis of a finite field to an ordinary integer.

Similarly, at step 603, party θ randomly selects a value $a_\theta$ in the range $2 \leqq a_\theta \leqq q-2$, and at step 605, finds $$y_\theta = g^{a_\theta} \text{ in } F(p^{t'})$$

At step 607, party θ sends $y_\theta$ to party Δ. At step 609, party θ receives $y_\Delta$ from party Δ. At step 611, party θ computes $$y_\theta = \chi(y_\Delta^{a_\theta}) \text{ in } F(p^{t'})$$

At step 612, parties Δ and θ have established a shared key ($y_0$). Computations have taken place in the subgroup generated by g. It will be appreciated that an unauthorized party needs to solve a DL problem to decrypt a communication between parties Δ and θ.

FIG. 4F is a flowchart illustrating encryption for the DES system setup according to the present invention. Essentially, at step 622, one of parties Δ and θ uses their shared key ($y_0$) to encrypt a message.

FIG. 4G is a flowchart illustrating decryption for the DES system setup according to the present invention. Essentially, at step 632, the other of parties Δ and θ uses their shared key ($y_0$) to decrypt the message that was encrypted in step 622.

For an ElGamal public key encryption scheme, which is different than the ElGamal digital signature scheme discussed above, let it be assumed that steps 500–526 shown in FIG. 4A have been performed, to obtain a public key (p, g, y, q, t') and a private key (a) for each user. It will be appreciated that an unauthorized user would need to determine the private key (a) to decrypt an encrypted message, which requires solving a DL problem.

Figure 4H:
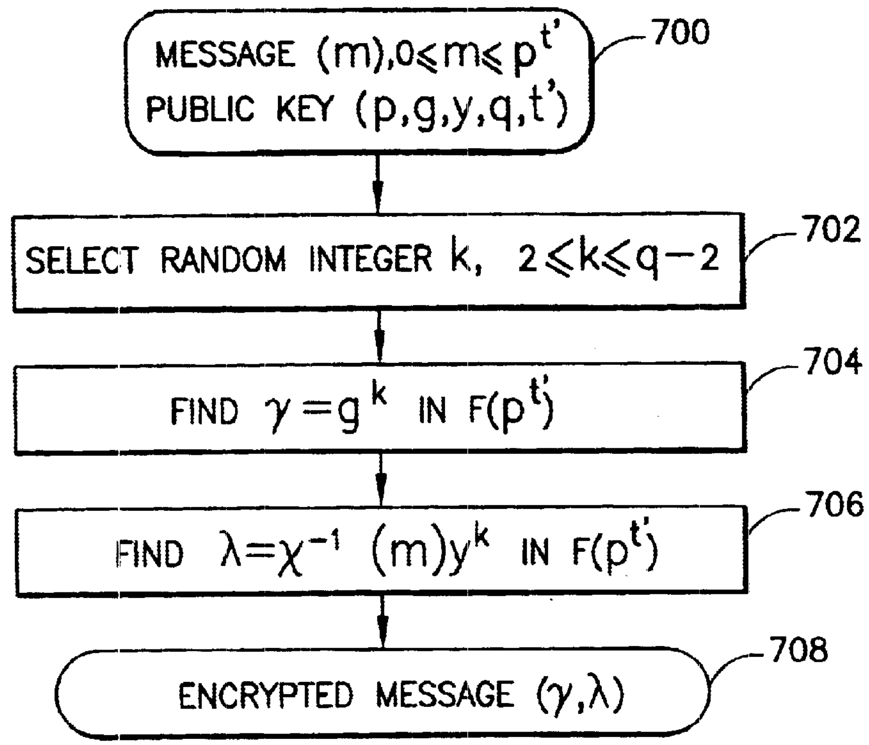
FIG. 4H is a flowchart illustrating encryption for the ElGamal system setup according to the present invention.

FIG. 4H is a flowchart illustrating encryption for the ElGamal system setup according to a cyclotomic scheme. At step 702, a party wishing to encrypt a message randomly selects an integer k in the range $2 \leqq k \leqq q-2$. At step 704, a value $\gamma = g^k$ in $F(p^{t'})$ is obtained. At step 706, a value $\lambda = \chi^{-1}(m) * y^k$ in $F(p^{t'})$ is obtained. The function $\chi^{-1}(.)$ is the inverse of the function χ(.) which was used in step 536 of FIG. 4B. The outcome, at step 708, is an encrypted message (γ, λ).

Figure 4J:
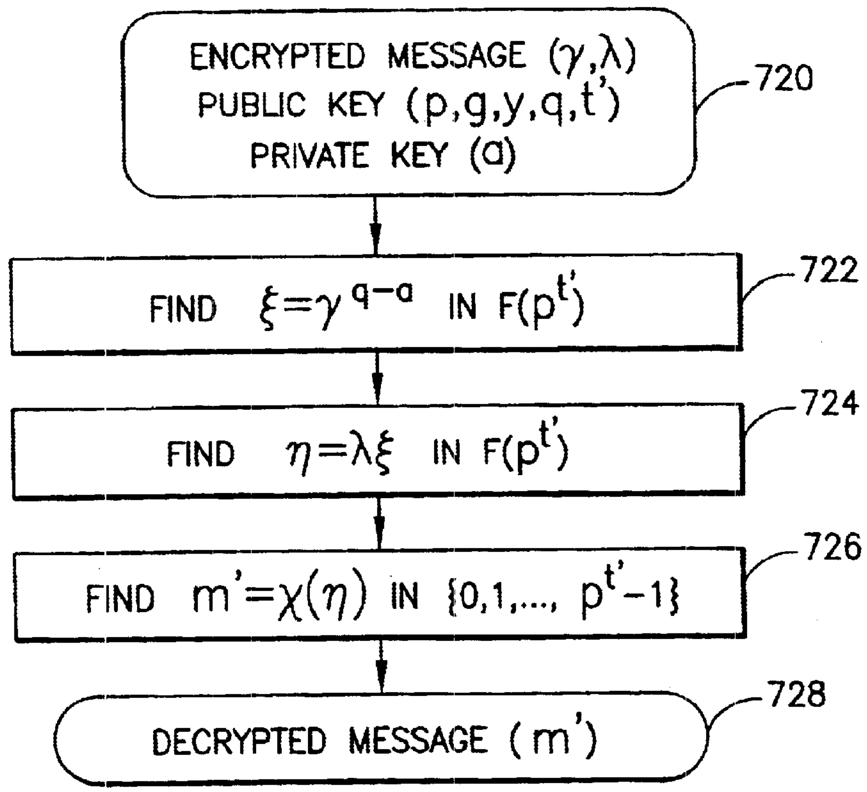
FIG. 4J is a flowchart illustrating decryption for the ElGamal system setup according to the present invention.

FIG. 4J is a flowchart illustrating decryption for the ElGamal system setup according to a cyclotomic scheme. At step 722, a party wishing to decrypt the encrypted message (γ, λ) finds a value $\zeta = \gamma^{q-a}$ in $F(p^{t'})$, and at step 724, finds a value $\eta = \lambda\zeta$ in $F(p^{t'})$. At step 726, a decrypted message m' is obtained as $m' = \chi(\eta)$ in $\{0, 1, \ldots, p^{t'}-1\}$. All exponentiation takes place in the subgroup generated by g.

Performance Comparison

FIG. 5A is a table of results for comparing signature generation performance of schemes for public key cryptosystems. The schemes compared were ElGamal, Schnorr, DSA and cyclotomic using software implementations. The ECDSA scheme was not evaluated as it requires a hardware implementation to be effective.

Since the parameter B is not relevant for the ElGamal scheme, cases "C" and "D" are identical for the ElGamal scheme. As a practical matter, the DSA scheme allows only B=160 and L=512+i*64 for $0 \leqq i \leqq 8$, which corresponds to only cases "A" and "C".

In the examples, only integer messages were used, and were taken mod p−1 for ElGamal, and mod q for others. Hashing was not used. Since the computation time for hashing is negligible, omission of hashing does not distort the performance results.

In particular, FIG. 5A shows runtimes in seconds on a Pentium 166 MHz processor, using a software implementation for each scheme.

A performance improvement due to the use of subgroups is seen when going from the ElGamal scheme to the Schnorr scheme. The performance of the DSA scheme is almost identical to the performance of the Schnorr scheme.

An additional performance improvement due to the use of optimal normal bases is seen when going from the Schnorr scheme to the cyclotomic scheme. In particular, for the examples in FIG. 5A, the cyclotomic scheme results in performance which is approximately three times faster than the performance of the Schnorr scheme.

FIG. 5B is a table of results for comparing signature verification performance of schemes for public key cryptosystems for the examples reported in the table of FIG. 5A. As with signature generation, the cyclotomic scheme results in performance which is approximately three times faster than the performance of the Schnorr scheme.

FIG. 6 is a chart showing the message signed and signature verified to obtain the performance results of FIGS. 5A and 5B.

FIGS. 7A–11D are charts showing the public key, private key, signature, and signature generation parameter k, for each of the public key cryptosystems in the examples used to obtain the performance results of FIGS. 5A and 5B. The timing results were generated by averaging the outcomes for ten different representative messages. In practice, the signature generation parameter is not exchanged between parties; here, it is included so that results may be conveniently reproduced.

For the cyclotomic scheme, the values of g and y are given in the basis $\alpha^i$, $1 \leqq i \leqq t'$, over F(p). For all other schemes, the values are in decimal representation.

By comparing the examples, it will be seen that the ElGamal scheme (FIGS. 7A, 8A, 9A, 10A, 11A) uses the longest values, while the cyclotomic scheme (FIGS. 7D, 8D, 9D, 10D, 11D) uses the shortest values. Further, as data security increases going from case "A" to case "E" in FIGS. 5A and 5B, the length of the values in all schemes increases.

Figure 12:
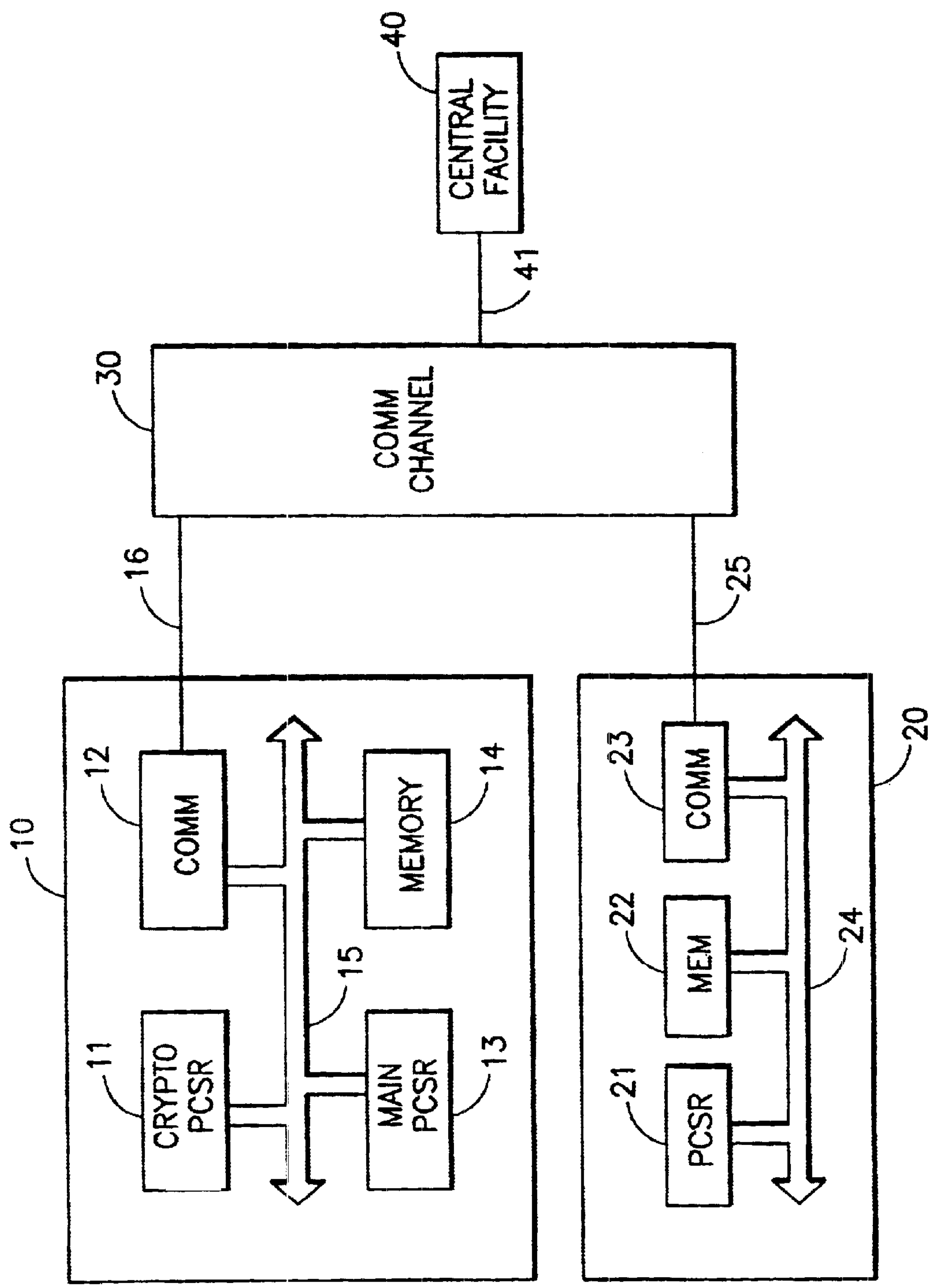
FIG. 12 is a block diagram of an environment in which the present invention may be implemented.

FIG. 12 is a block diagram of an environment in which the cyclotomic scheme may be implemented. General purpose computer 10 includes cryptographic processor 11, communications interface 12, main processor 13, memory 14, communications bus 15 and communication line 16. Memory 14 may include RAM, ROM, magnetic disk, optical disk or any other memory medium. Communication line 16 may be a wireline, an RF wireless line, an optical line, or any other communication medium. Smart card 20 includes processor 21, memory 22, communications interface 23, communications bus 24 and communication line 25. General purpose computer 10 and smart card 20 are coupled to communication channel 30. Central facility 40 is also coupled, via communication line 41, to communication channel 30. Central facility 40 includes appropriate processing hardware and software to practice the cyclotomic scheme, as will be appreciated with reference to general purpose computer 10 and smart card 20.

General purpose computer 10 executes software stored in memory 14 which includes calls that are directed by main processor 13 to cryptographic processor 11, which includes sufficient memory to operate in accordance with the cyclotomic scheme.

Smart card 20 executes software stored in memory 22 in accordance with the cyclotomic scheme.

Central facility 40 functions to generate global information and distribute it to all parties using the cyclotomic scheme. An example of global information is the global public key depicted in step 600 of FIG. 4E.

Although an illustrative embodiment of the present invention, and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as defined in the appended claims.

What is claimed is:

1. A method of determining a shared public key for a public key cryptosystem, comprising the steps of:

obtaining a public value t with t>1, selecting a first prime number p, obtaining the t-th cyclotomic polynomial evaluated at the first prime number p, obtaining a second prime number q which is a factor of the t-th cyclotomic polynomial evaluated at the first prime number p, finding a generator g of a subgroup of a multiplicative group of a finite field, the order of the subgroup being the second prime number q, and forming the shared public key (p, g, q, t).

2. The method of claim 1, further comprising the step of representing the finite field with an optimal normal basis.

3. The method of claim 1, wherein the second prime number q satisfies $(\log_2 q)+1\approx B$, where B is a predetermined number of bits.

4. The method of claim 1, further comprising the step of selecting a control integer t', and wherein the cyclotomic polynomial is the t'-th cyclotomic polynomial, and the public key includes the control integer t'.

5. A method of generating a digital signature for a message wherein a shared public key is determined according to the method of claim 1, and the public value is also based on a first integer, comprising the steps of:

selecting a second integer, obtaining a first signature value based on the second integer and the generator, obtaining a second signature value based on the first signature value and the message, and forming the digital signature to include the first and second signature values.

6. The method of claim 5, further comprising the step of representing the finite field with an optimal normal basis.

7. The method of claim 5, wherein the second prime number q satisfies $(\log_2 q)+1\approx B$, where B is a predetermined number of bits.

8. The method of claim 5, further comprising the step of selecting a control integer t', and wherein the cyclotomic polynomial is the t'-th cyclotomic polynomial.

9. The method of claim 5, wherein the first signature value is based on a bijection of the generator raised to the power of the second integer.

10. The method of claim 5, wherein the second signature value is based on combining the first signature value with a cryptographic hashing of the message.

11. A method of verifying a digital signature for a message, the digital signature being formed according to the method of claim 5, comprising the steps of:

finding an inverse integer which is the inverse of the second signature value, finding a first intermediate value based on the inverse integer and the message, finding a second intermediate value based on the inverse integer and the first signature value, finding a third intermediate value based on the generator, the public value, and the first and second intermediate values, determining that the signature is valid when the third intermediate value is equal to the first signature value.

12. The method of claim 11, wherein the third intermediate value is a bijection of the generator raised to the power of the first intermediate value multiplied by the public value raised to the power of the second intermediate value.

13. A method of determining a shared key for a secret key cryptosystem wherein a shared public key is determined according to the method of claim 1, comprising the steps of:

selecting an integer, receiving an intermediate value which is based on the generator, and forming the shared key as a function of the intermediate value and the integer.

14. The method of claim 13, further comprising the step of representing the finite field with an optimal normal basis.

15. The method of claim 13, further comprising the steps of finding a second intermediate value which is based on the generator and the integer, and sending the second intermediate value to a party who is to share the shared key.

16. A method for secure communication of a message wherein a shared public key is determined according to the method of claim 1, comprising the steps of:

selecting an integer, receiving an intermediate value which is based on the generator, forming a shared key as a function of the intermediate value and the integer, and encrypting the message using the shared key.

17. The method of claim 16, further comprising the step of representing the finite field with an optimal normal basis.

18. A method for secure communication of a message, comprising the steps of:

receiving an encrypted message which has been encrypted using a shared key for a secret key cryptosystem, the shared key being formed as a function of an intermediate value and a selected integer, the intermediate value being based on a generator of a subgroup of a multiplicative group of a finite field, the order of the subgroup being a second prime number which is a factor of a cyclotomic polynomial other than the first cyclotomic polynomial evaluated at a first prime number, and decrypting the encrypted message using the shared key.

19. A method for secure communication of a message wherein a shared public key is determined according to the method of claim 1, and the public value is also based on a first integer, comprising the steps of:

selecting a second integer, finding a first encrypted value based on the generator and the second integer, finding a second encrypted value based on the message, the public value and the second integer, and forming an encrypted message from the first and second encrypted values.

20. The method of claim 19, further comprising the step of representing the finite field with an optimal normal basis.

21. A method for secure communication of a message, comprising the steps of:

receiving an encrypted message formed of a first encrypted value and a second encrypted value, the first encrypted value being based on a first integer and a generator of a subgroup of a multiplicative group of a finite field, the order of the subgroup being a second prime number which is a factor of a cyclotomic polynomial other than the first cyclotomic polynomial evaluated at a first prime number, the second encrypted value being based on the message, the first integer and a public value based on the generator and a second integer, finding a first intermediate value based on the first encrypted value and a private key, the private key being based on the generator, and decrypting the encrypted message based on the second encrypted value and the first intermediate value.

22. An apparatus for determining a shared public key for a public key cryptosystem, comprising:

means for selecting a first prime number p, means for obtaining a cyclotomic polynomial other than the first cyclotomic polynomial evaluated at the first prime number p, means for obtaining a second prime number q which is a factor of the cyclotomic polynomial evaluated at the first prime number p, means for finding a generator g of a subgroup of a multiplicative group of a finite field, the order of the subgroup being the second prime number q, means for obtaining a public value t based on the generator g, and means for forming the shared public key (p, g, q, t).

23. The apparatus of claim 22, further comprising means for representing the finite field with an optimal normal basis.

24. The apparatus of claim 22, wherein the second prime number q satisfies $(\log_{2\ q})+1\approx B$, where B is a predetermined number of bits.

25. The apparatus of claim 22, further comprising means for selecting a control integer t', and wherein the cyclotomic polynomial is the t'-th cyclotomic polynomial, and the public key includes the control integer t'.

26. A method of determining a private key for the public key cryptosystem of claim 1, wherein the public key is also based on a selected integer, comprising the step of forming the private key to include the selected integer.

* * * * *